(12) United States Patent
Sasaki

(10) Patent No.: US 10,721,456 B2
(45) Date of Patent: Jul. 21, 2020

(54) IMAGE GENERATION APPARATUS AND IMAGE GENERATION METHOD

(71) Applicant: Sony Interactive Entertainment Inc., Tokyo (JP)

(72) Inventor: Nobuo Sasaki, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/301,828

(22) PCT Filed: Mar. 7, 2017

(86) PCT No.: PCT/JP2017/009099
§ 371 (c)(1),
(2) Date: Nov. 15, 2018

(87) PCT Pub. No.: WO2017/212720
PCT Pub. Date: Dec. 14, 2017

(65) Prior Publication Data
US 2019/0158809 A1 May 23, 2019

(30) Foreign Application Priority Data

Jun. 8, 2016 (JP) ................................ 2016-114753
Aug. 4, 2016 (JP) ................................ 2016-153971

(51) Int. Cl.
*G06K 9/00* (2006.01)
*G06T 15/10* (2011.01)
(Continued)

(52) U.S. Cl.
CPC ......... *H04N 13/221* (2018.05); *H04N 13/111* (2018.05); *H04N 13/117* (2018.05);
(Continued)

(58) Field of Classification Search
CPC .... H04N 13/111; H04N 13/117; H04N 13/15; H04N 13/221; H04N 13/344; H04N 13/366; H04N 13/376
See application file for complete search history.

(56) References Cited

U.S. PATENT DOCUMENTS 6,215,496 B1 * 4/2001 Szeliski .................. G06T 15/04
345/419
6,271,876 B1 * 8/2001 McIntyre ............... G03B 35/10
348/46

(Continued)

FOREIGN PATENT DOCUMENTS

EP    0707287 A2    4/1996
JP    08279661 A    10/1996
(Continued)

OTHER PUBLICATIONS

Nelson L. Chang and Avideh Zakhor "View generation for three-dimensional scenes from video sequences", 1997, IEEE Transactions on Image Processing, vol. 6, p. 584-598 (Year: 1997).*

(Continued)

*Primary Examiner* — Alison Slater
(74) *Attorney, Agent, or Firm* — Matthew B. Dernier, Esq.

(57) ABSTRACT

A position and posture acquisition unit acquires viewpoint position information of a user. A viewscreen setting unit sets a viewscreen for the user. An original image operation unit calculates a correction amount for a pixel of the image from a parallax value of each pixel of an original image and an amount of movement of the viewpoint such that the object looks fixed, and generates, for each of left and right viewpoint, an image reference vector map. The image reference vector map includes an image reference vector that refers to the position of the object before correction from coordinates of each pixel after correction. A display image generation (Continued)

unit refers to the original image on the basis of the image reference vector corresponding to each pixel of the viewscreen to determine a color value.

10 Claims, 76 Drawing Sheets

(51) Int. Cl.
    *H04N 13/00*     (2018.01)
    *B60R 1/00*     (2006.01)
    *H04N 13/221*     (2018.01)
    *H04N 13/117*     (2018.01)
    *H04N 13/366*     (2018.01)
    *H04N 13/376*     (2018.01)
    *H04N 13/344*     (2018.01)
    *H04N 13/15*     (2018.01)
    *H04N 13/111*     (2018.01)

(52) U.S. Cl.
    CPC ........... *H04N 13/15* (2018.05); *H04N 13/344* (2018.05); *H04N 13/366* (2018.05); *H04N 13/376* (2018.05)

(56) References Cited

U.S. PATENT DOCUMENTS

| | | | |
|---|---|---|---|
| 7,161,616 B1 | 1/2007 | Okamoto | |
| 2006/0078180 A1* | 4/2006 | Berretty | H04N 13/261 382/128 |
| 2011/0096832 A1* | 4/2011 | Zhang | G06T 7/579 375/240.08 |
| 2012/0099005 A1 | 4/2012 | Kali | |
| 2012/0105473 A1* | 5/2012 | Bar-Zeev | G06F 3/0304 345/633 |
| 2012/0162396 A1* | 6/2012 | Huang | H04N 13/264 348/51 |
| 2013/0147931 A1* | 6/2013 | Ohba | G02B 27/2214 348/54 |
| 2013/0187910 A1* | 7/2013 | Raymond | G09G 5/14 345/419 |
| 2014/0063038 A1* | 3/2014 | Kikuta | G06F 17/5018 345/582 |
| 2015/0009416 A1* | 1/2015 | Tamayama | H04N 5/64 348/746 |
| 2016/0070356 A1 | 3/2016 | Aguirre | |
| 2017/0096106 A1* | 4/2017 | Higuchi | H04N 5/23293 |
| 2017/0359562 A1* | 12/2017 | Schneider | G01B 11/245 |
| 2018/0307310 A1* | 10/2018 | McCombe | H04N 13/239 |
| 2019/0158809 A1* | 5/2019 | Sasaki | H04N 13/111 |

FOREIGN PATENT DOCUMENTS

| | | |
|---|---|---|
| JP | 2002222488 A | 8/2002 |
| JP | 2009152966 A | 7/2009 |
| JP | 2011049735 A | 3/2011 |
| JP | 2011165068 A | 8/2011 |
| JP | 2012523783 A | 10/2012 |
| JP | 6584664 B2 | 10/2019 |
| WO | 2000064175 A1 | 10/2000 |
| WO | 03030535 A1 | 4/2003 |
| WO | 2010118998 A1 | 10/2010 |

OTHER PUBLICATIONS

"Image Processing", edited by D. Pearson, Chapter 3, "Motion and Motion Estimation," G. Thomas, pp. 40-57, McGraw-Hill, 1991 (Year: 1991).*
Notification of Reasons for Refusal for corresponding JP2018-522310, 26 pages, dated Aug. 6, 2019.
Akihiro Katayama et al.,"Viewpoint-tracked stereoscopic image display method by interpolation-reconstruction of a multi-viewpoint image," The IEICE Transactions, vol. J79-D-II, No. 5, The Institute of Electronics, Information and Communication Engineers (IEICE), pp. 803 to 811, May 25, 1996.
Itaru Kitahara et al., "Study of image generation technique in three-dimensional image display reproducing motion parallax," Proceedings of the 50th (first half of 1995 (H07)) National Convention (2) of the Information Processing Society of Japan, pp. 2-111-2-112 Mar. 15, 1995.
International Preliminary Report on Patentability and Written Opinion for related PCT Application No. PCT/JP2017/005757, 17 pages, dated Oct. 11, 2018.
International Preliminary Report on Patentability and Written Opinion for corresponding PCT Application No. PCT/JP2017/009099, 20 pages, dated Oct. 11, 2018.
International Search Report for corresponding PCT Application No. PCT/JP2017/009099, 4 pages, dated May 9, 2017.
Katayama A.' et al., "A Viewpoint Dependent Stereoscopic Display Using Interpolation of Multi-Viewpoint Images", Proceedings of SPIE, vol. 2409, p. 11-20, ISBN:0-8194-1756-4, <DOI:10.1117/12.205854>. Especially, equation (3) (Mar. 30, 1995).
Satoh, K.' et al., "3D Image Display with Motion Parallax by Camera Matrix Stereo",Proceedings of the Third IEEE Int. Conf. on Multimedia Computing and Systems 1996, p. 349-357, ISBN:0-8186-7438-5, <DOI:10.1109/MMCS.1996.535894>. Especially, equations (10) and (12), (Jun. 23, 1996).
Kitahara, I., et al., "Assessment of synthetic images for 3D display with motion parallax", Proceedings of the 50th Conference of Information Processing Society of Japan, vol. 2, 6 pages, pages from 2-111 to 2-112, Especially, Section 3.1., (Mar. 15, 1995).
Katayama, A., et al., "A Viewpoint Dependent Stereoscopic Display Method with Interpolation and Reconstruction of Multi-Viewpoint Images", The Transactions of The Institute of Electronics, Information and Communication Enigineers, vol. J79-D-11, No. 5, 13 pages, p. 803-811, ISSN:0915-1923. Especially, equation (5), (May 26, 1996).
Extended European Search Report for corresponding EP Application No. 17809870.3, 9 pages, dated Dec. 18, 2019.
Decision to Grant Patent for corresponding JP Application No. 2018-522310, 8 pages, dated Mar. 24, 2020.

* cited by examiner

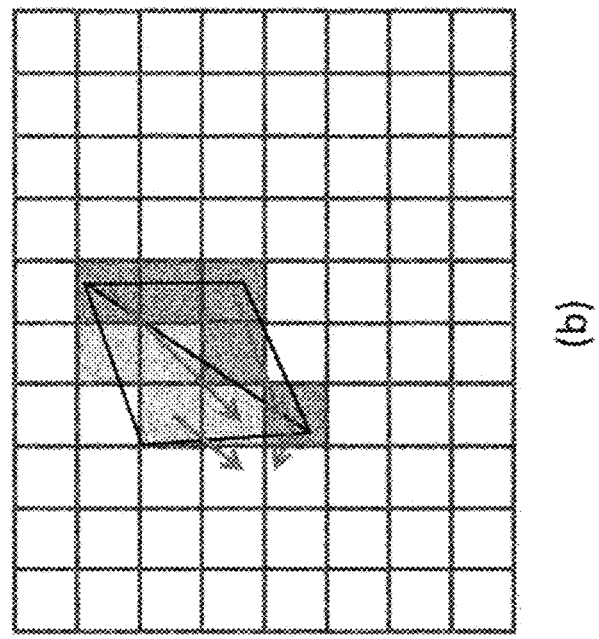
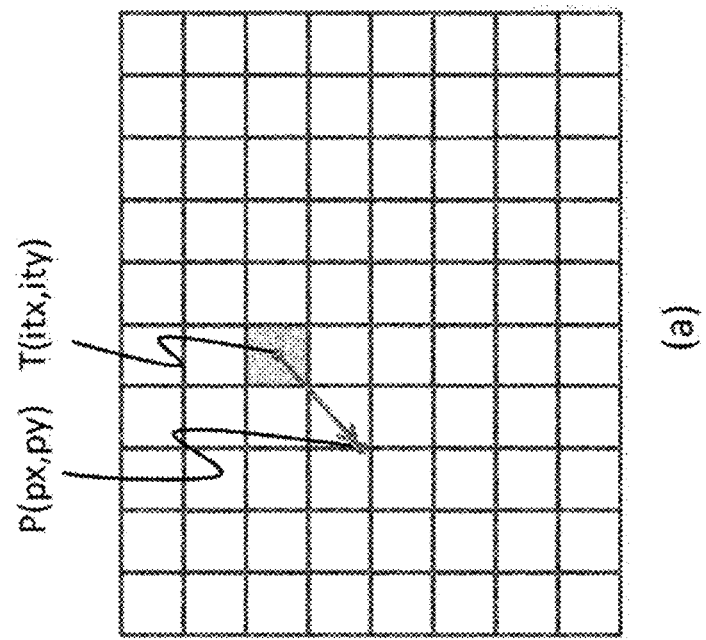
FIG. 14

FIG.15
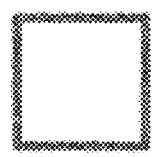 : INVALID
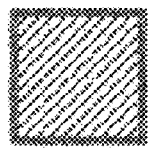 : VALID
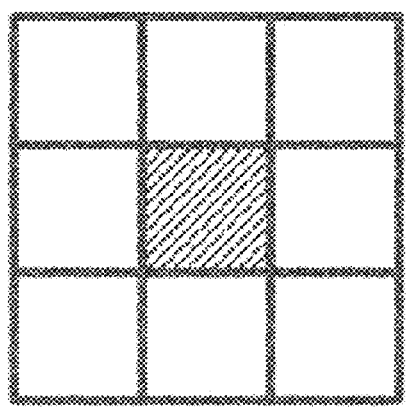

F I G. 19
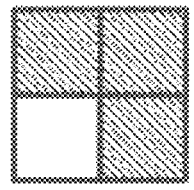 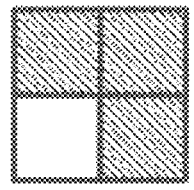 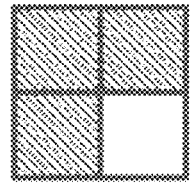 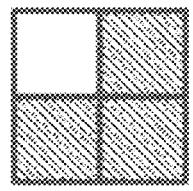

FIG.20
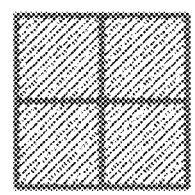
(a)
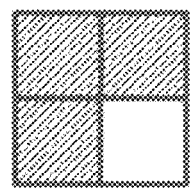  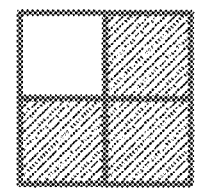
(b)                                              (c)

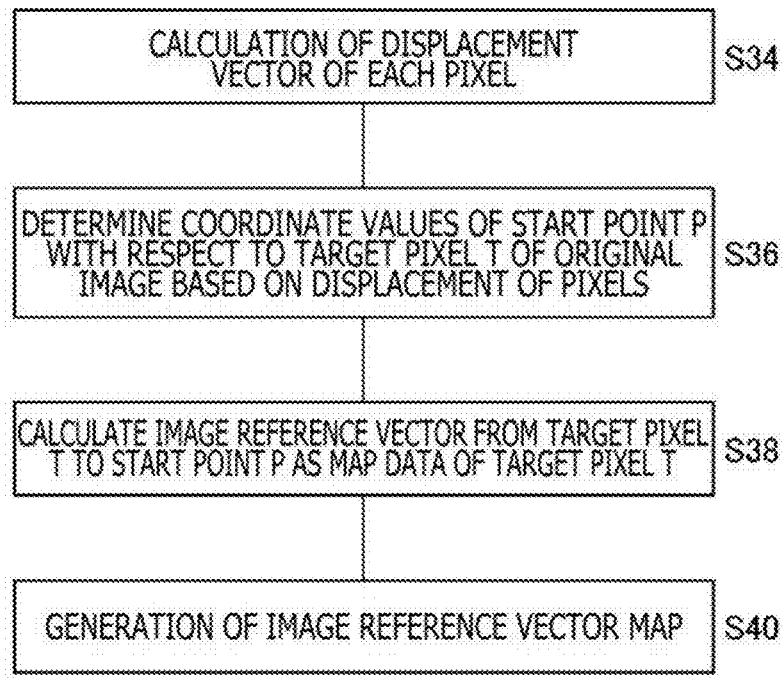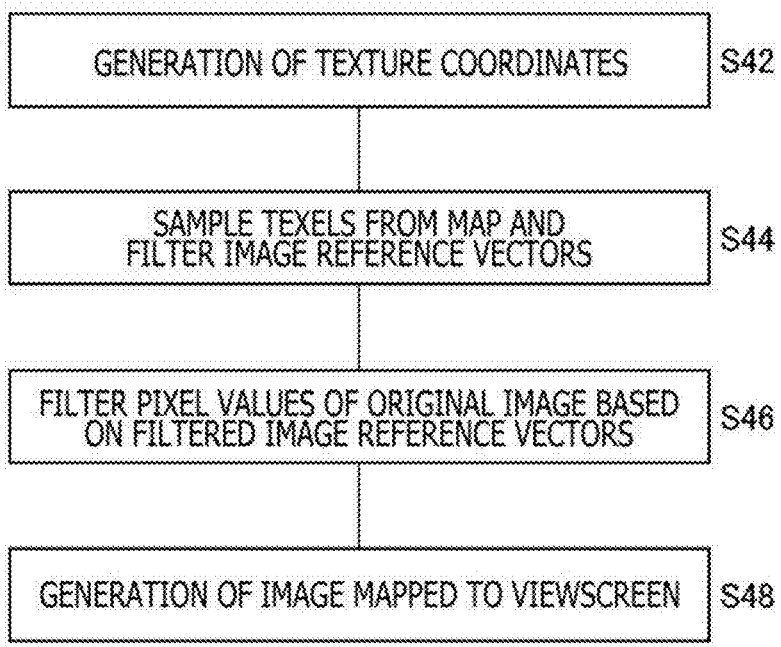

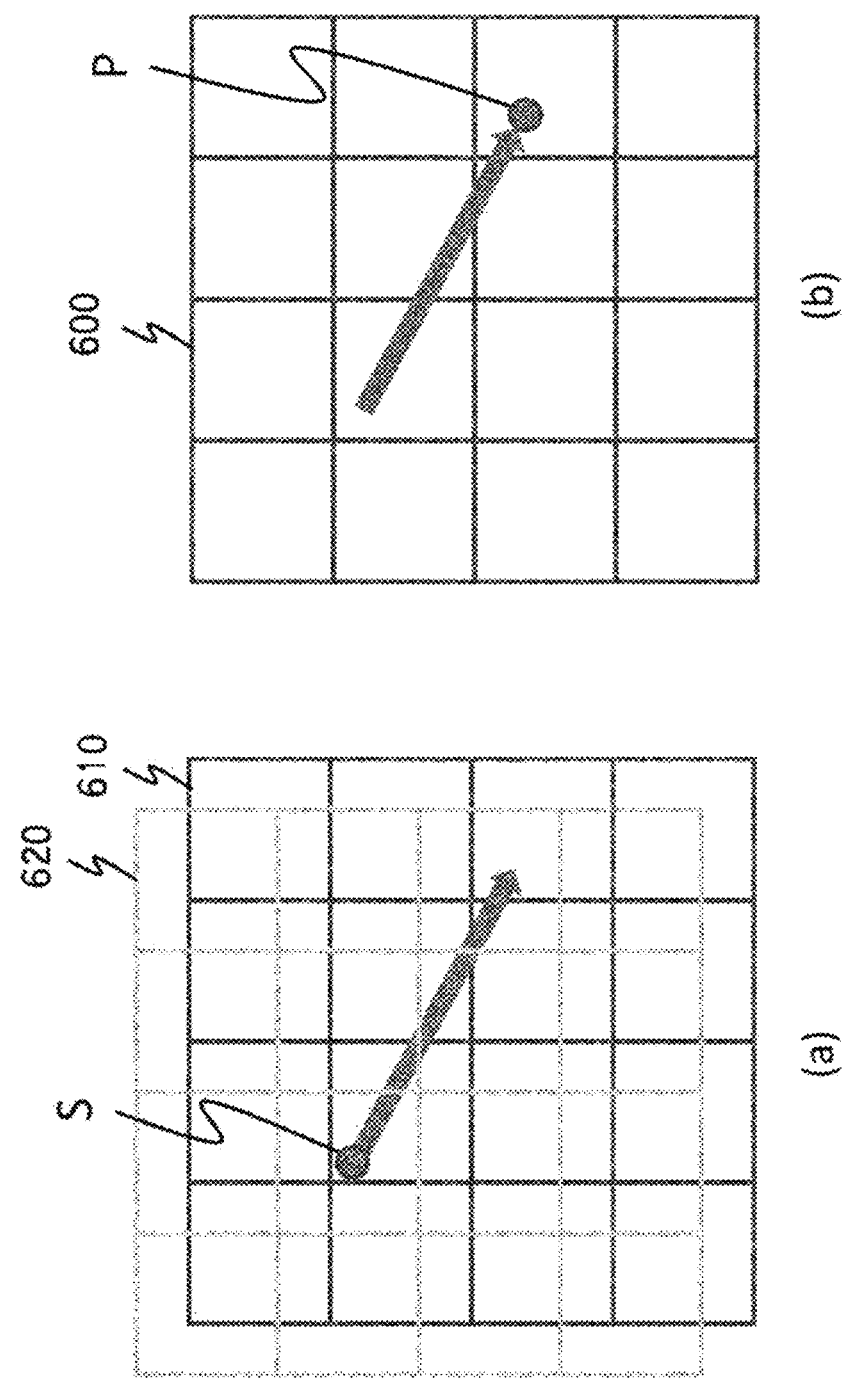

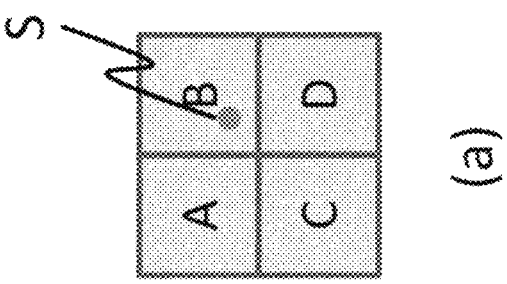
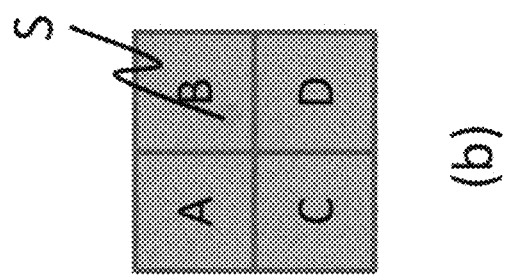
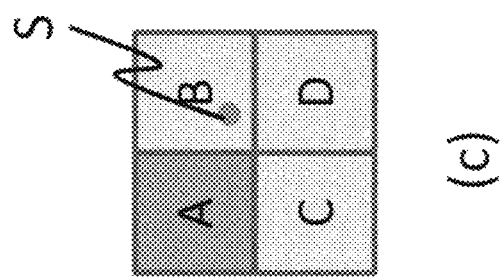
FIG. 42

FIG.52
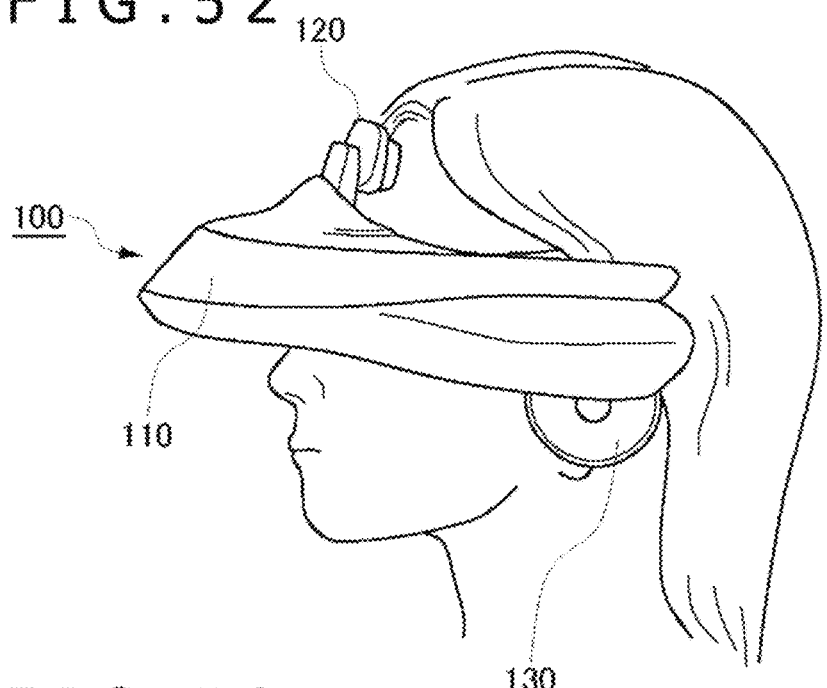
FIG.53
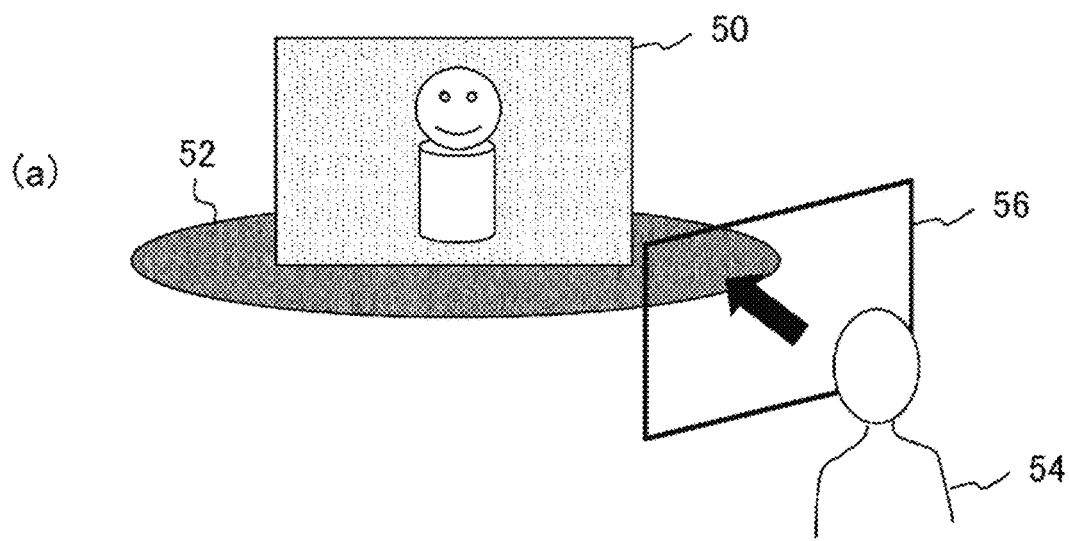
(a)
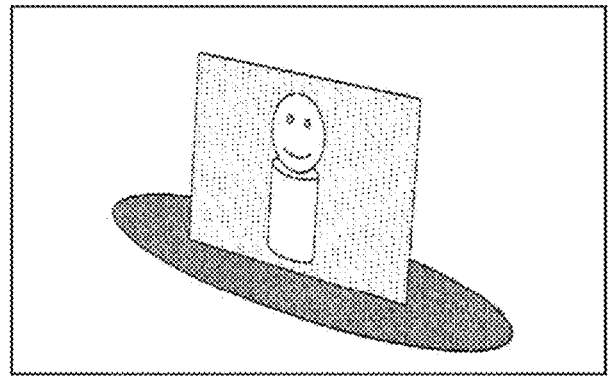
(b)

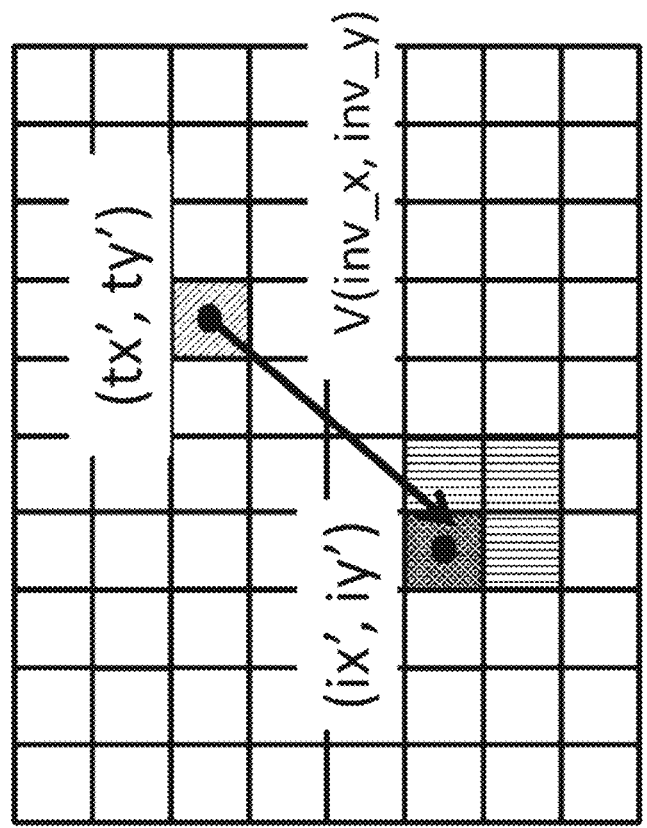
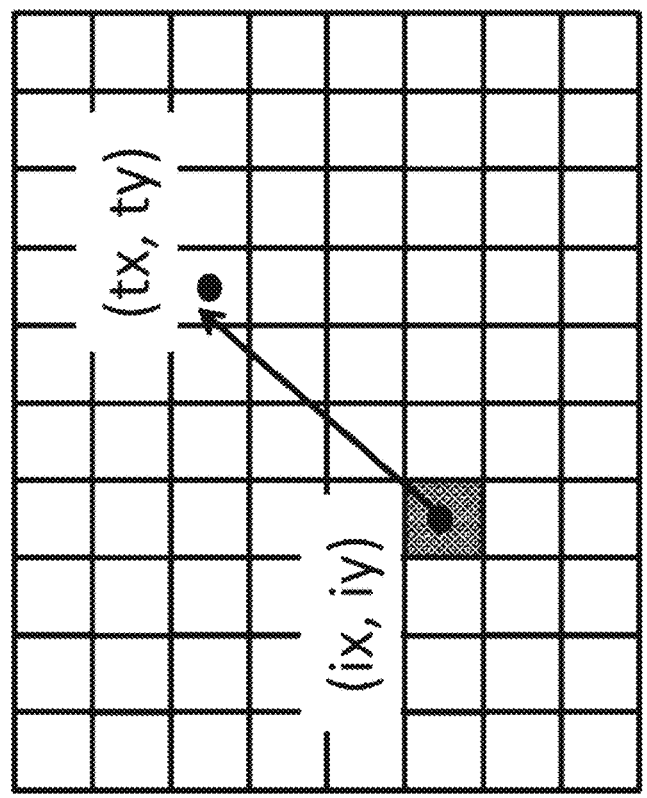
FIG. 61

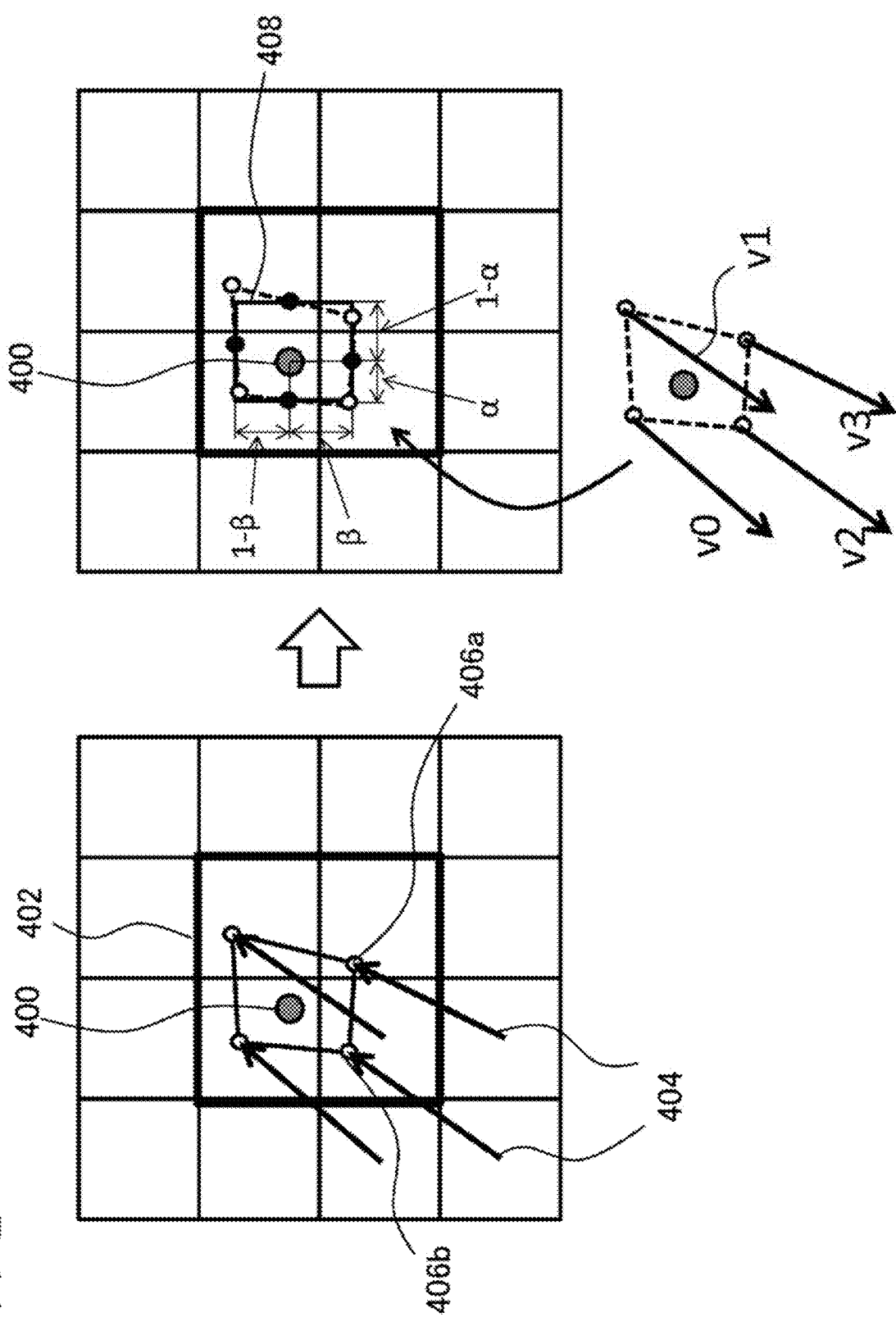
F I G . 7 2

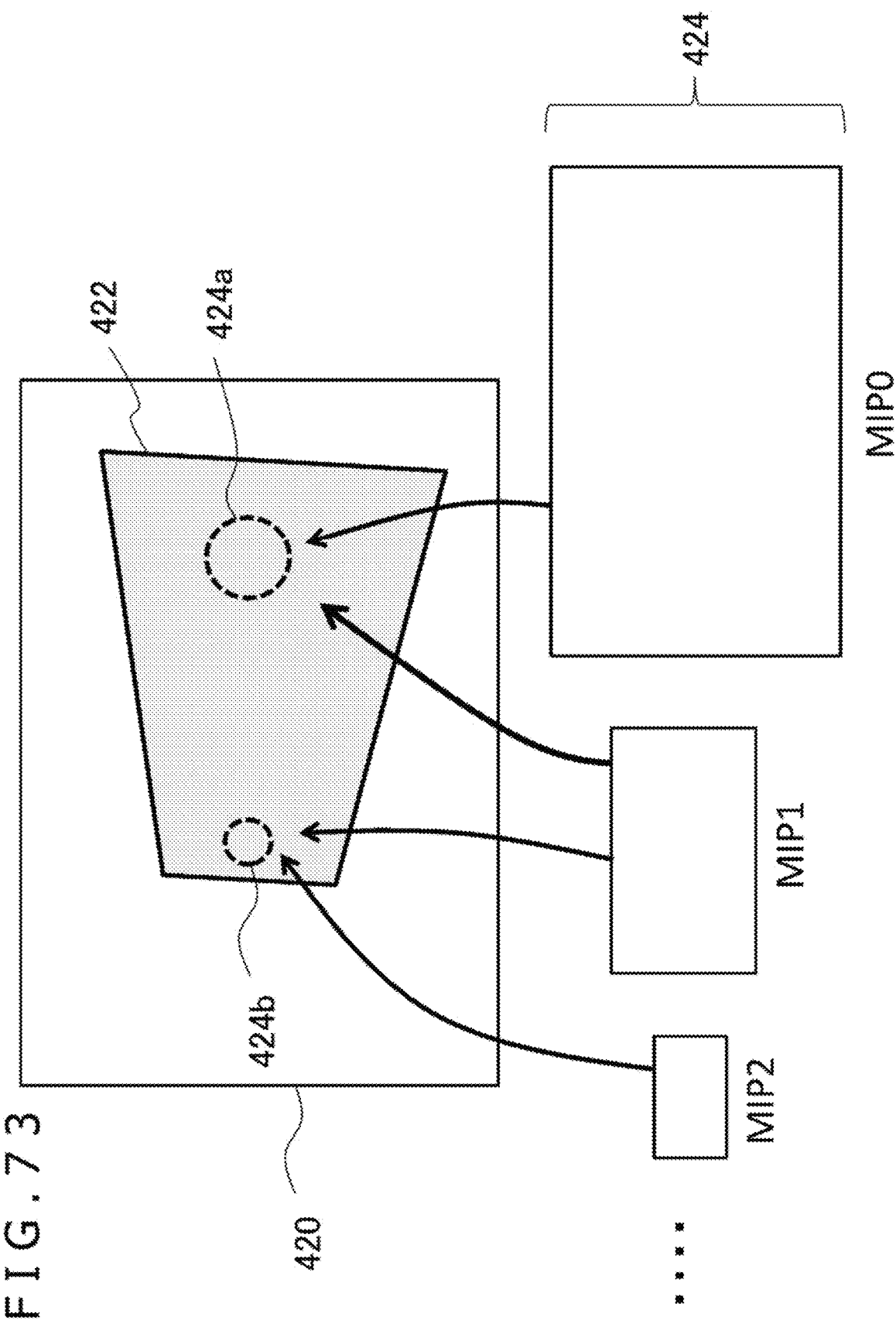

FIG. 77
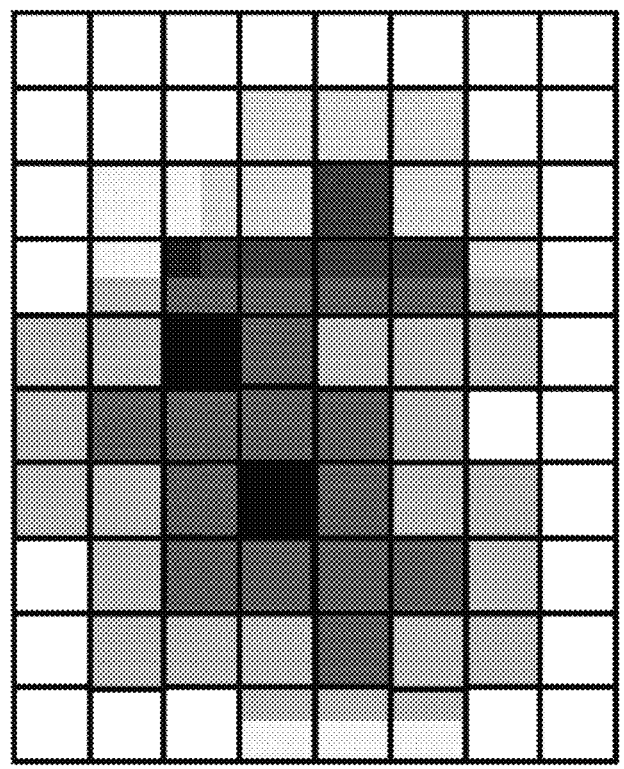
(b)
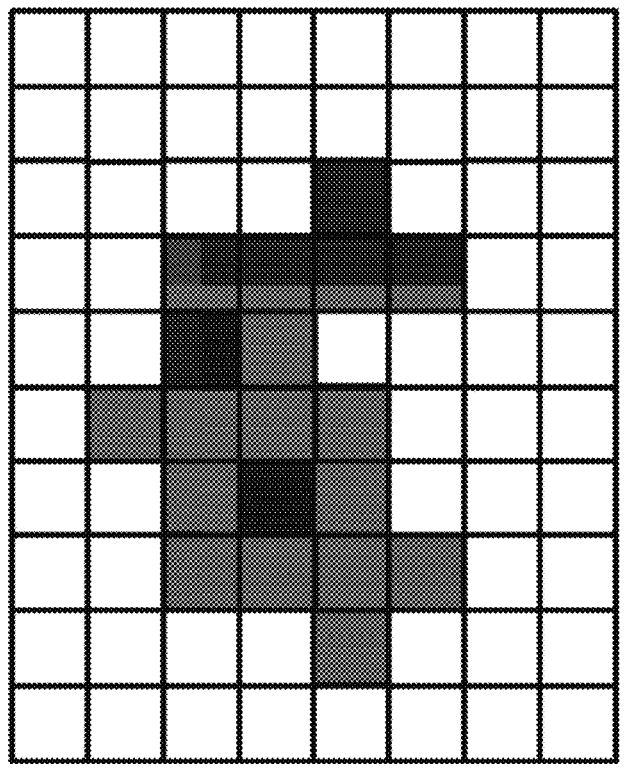
(a)

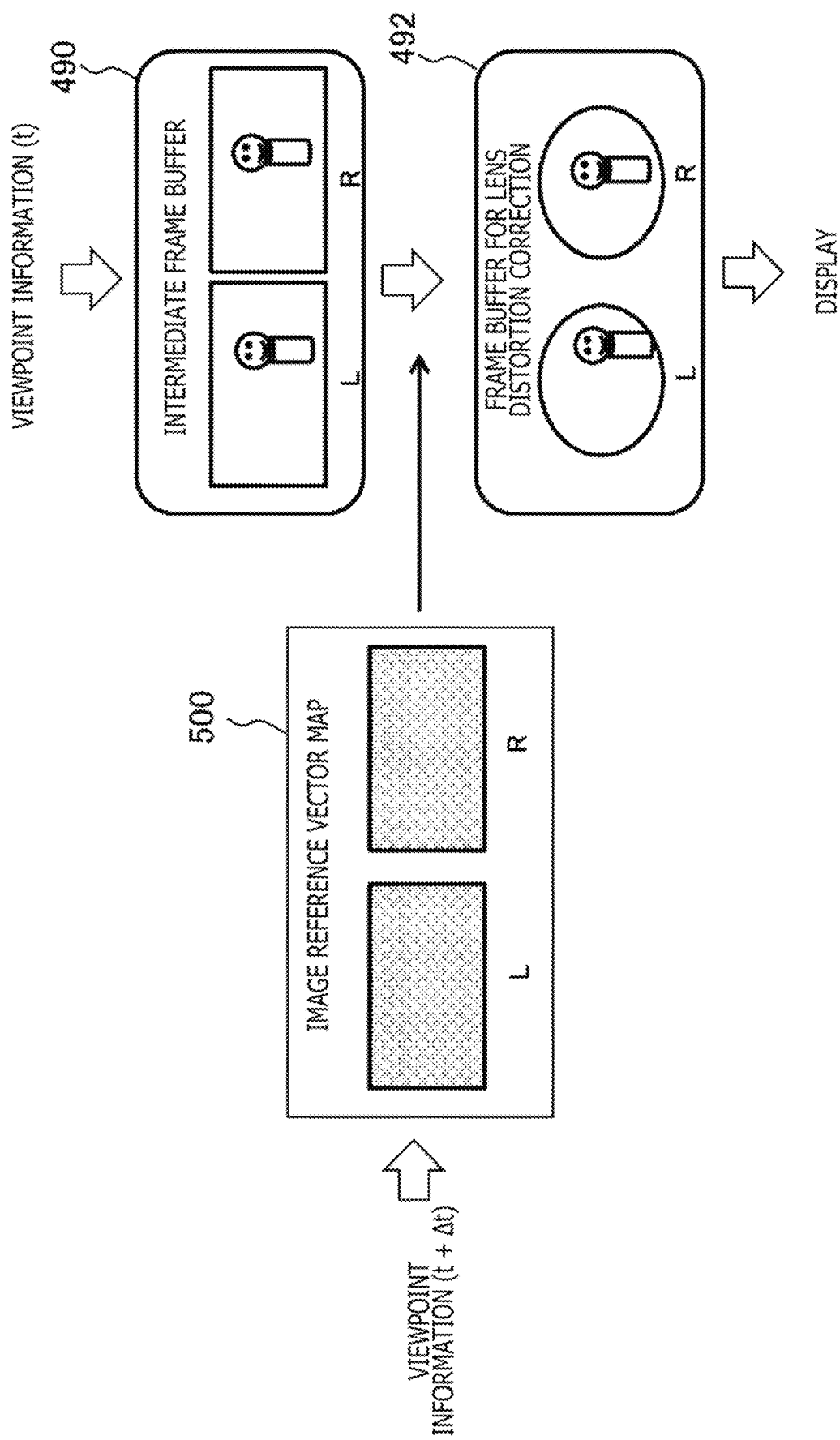

IMAGE GENERATION APPARATUS AND IMAGE GENERATION METHOD

TECHNICAL FIELD

The present invention relates to an image generation apparatus and an image generation method for generating a stereoscopic video.

BACKGROUND ART

Three-dimensional display devices that can present a video stereoscopically such as a three-dimensional television set, a head mounted display and so forth are used. Also devices that can present a video stereoscopically on portable terminals such as portable telephone sets, portable game machines and so forth have been developed, and an opportunity in which a general user views a stereoscopic video has been and is increasing.

A three-dimensional display device that displays a stereoscopic video makes it possible for a user to stereoscopically view an image by showing images having a parallax there between to the left and right eyes of the user. A system that uses special optical glasses, a system that uses a parallax barrier or a lenticular lens without using optical glasses and so forth in order to show images having a parallax there between to the left and right eyes are available.

SUMMARY

Technical Problems

In order to show a stereoscopic video free from distortion, it is necessary to generate accurate parallax images based on the viewpoint of a user. Accordingly, in order to allow movement of the viewpoint to present a stereoscopic video, generally such processes as disposing an object in a virtual three-dimensional space, projecting with the camera coordinate system changed and so forth are required. However, as the quality or accuracy of images is pursued, the time required for such processes increases and the display becomes less likely to follow up the movement of the viewpoint. Further, since many operations are applied to data of an initial parallax image, the possibility that the picture quality may be degraded increases.

The present invention has been made in view of such a subject as described above, and the object of the present invention resides in provision of a technology that can generate a stereoscopic image of high quality with a reduced delay even if the viewpoint is displaced.

Solution to Problems

A mode of the present invention relates to an image generation apparatus. The image generation apparatus uses an original image acquired from a plurality of viewpoints to generate an image that allows stereoscopic viewing of an object. The image generation apparatus includes an original image operation unit configured to calculate a displacement to be generated for each pixel of the original image in response to movement of a viewpoint of a user and generate, for each of left and right viewpoints, a vector map in which reference vectors for referring to positions before the displacement on the original image from positions after the displacement are lined up on an image plane after the displacement, a display image generation unit configured to determine, based on the reference vector at a position on the vector map corresponding to each pixel of a display image, a pixel value of the display pixel by referring to a pixel value at a corresponding position on the original image, to generate display images corresponding to the left and right viewpoints, and an outputting unit configured to output data of the display image. The original image operation unit includes, into the reference vector to be set to the vector map for one of the left and right viewpoints, the reference vector whose reference destination is the original image acquired from a different viewpoint, and the display image generation unit includes, when a pixel value of the display image for the one viewpoint is to be determined, an original image acquired from the different viewpoint into the reference destination.

Another mode of the present invention relates to an image generation method. The image generation method by an image generation apparatus uses an original image acquired from a plurality of viewpoints to generate an image that allows stereoscopic viewing of an object. The image generation method includes a step of acquiring information relating to a viewpoint of a user, a step of calculating a displacement to be generated for each pixel of the original image in response to movement of the viewpoint and generating, for each of left and right viewpoints, a vector map in which reference vectors for referring to positions before the displacement on the original image from positions after the displacement are lined up on an image plane after the displacement, a step of determining, based on the reference vector at a position on the vector map corresponding to each pixel of a display image, a pixel value of the display pixel by referring to a pixel value at a corresponding position on the original image, to generate display images corresponding to the left and right viewpoints, and a step of outputting data of the display image. The step of generating the vector map includes, into the reference vector to be set to the vector map for one of the left and right viewpoints, the reference vector whose reference destination is the original image acquired from a different viewpoint, and the step of generating display images includes, when a pixel value of the display image for the one viewpoint is to be determined, an original image acquired from the different viewpoint into the reference destination.

It is to be noted that also arbitrary combinations of the constituent features described above and converted matters of the representations of the present invention between a method, an apparatus and so forth are effective as modes of the present invention.

Advantageous Effect of Invention

According to the present invention, a stereoscopic image of high quality can be presented with less delay even if the viewpoint is displaced.

BRIEF DESCRIPTION OF DRAWINGS

FIG. 14 is a view illustrating an image reference vector in the embodiment 1.

FIG. 15 is a view illustrating a generation technique of an image reference vector in the case where only one pixel is valid in the embodiment 1.

FIG. 19 is a view illustrating a generation technique of an image reference vector in the case where three pixels are valid in the embodiment 1.

FIG. 20 is a view illustrating a generation technique of an image reference vector in the case where four pixels are valid in the embodiment 1.

FIG. 25 is a flow chart more particularly depicting a processing procedure in which an original image operation unit generates an image reference vector map at S12 of FIG. 7.

FIG. 26 is a flow chart more particularly depicting a processing procedure in which a display image generation unit maps an original image to a viewscreen at S14 of FIG. 7.

FIG. 27 is a view illustrating a relationship among a display image, an image reference vector map and an original image in the embodiment 1.

FIG. 42 is a view illustrating case classification of a filter process of an image reference vector in the embodiment 1.

FIG. 52 is an appearance view of a head mounted display in an embodiment 2.

FIG. 53 is a view illustrating a form of display implemented by an image displaying system of the embodiment 2.

FIG. 61 is a view schematically depicting a correspondence relationship of a division and a position of a pixel in an original image and an image reference vector map in the embodiment 2.

FIG. 72 is a view illustrating bilinear interpolation of an image reference vector in the embodiment 2.

FIG. 73 is a view illustrating a relationship between an original image and a display image in the case where the original image is a mipmap texture in the embodiment 2.

FIG. 77 is a view schematically depicting an image reference vector map before and after extension of a parallax value image in the embodiment 2.

FIG. 81 is a view illustrating a technique for reflecting, on an image drawn once, later movement of a viewpoint using an image reference vector map.

DESCRIPTION OF EMBODIMENTS

Embodiment 1

The present embodiment relates to a three-dimensional image displaying system in which an image for the right eye from between a pair of stereo images having a parallax there between is introduced to the right eye and an image for the left eye is introduced to the left eye to cause the stereo images to be viewed stereoscopically. To that extent, the display form of the images or the appreciation form of the user are not restrictive. For example, a form may be conceivable in which parallax images are displayed simultaneously or alternately on a flat panel display or screen such that they are appreciated through polarized glasses or shutter glasses. Alternatively, also it is conceivable to use a head mounted display that can present images to the left and right eyes independently of each other.

Figure 1:
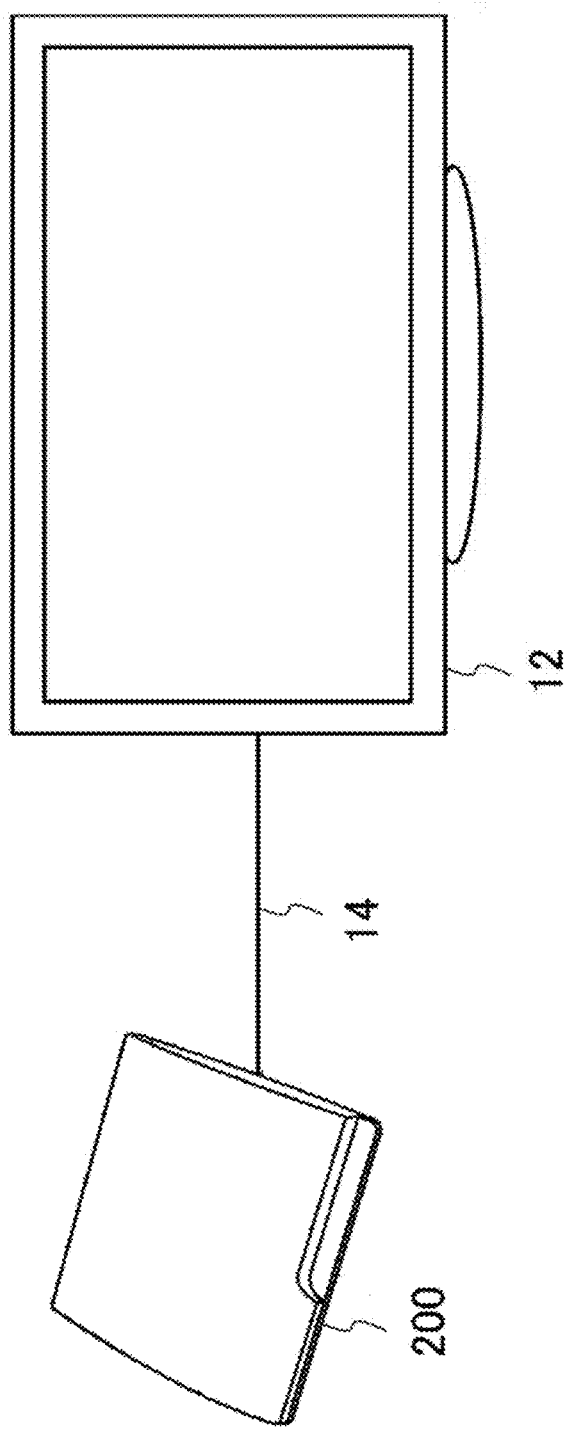
FIG. 1 is a diagram of an image displaying system in an embodiment 1.

FIG. 1 is a view depicting an example of a configuration of an image displaying system in the present embodiment.

The image displaying system of the present example introduces a flat panel display 12 as a display apparatus. The flat panel display 12 is connected to an image generation apparatus 200 by an interface 14 that connects a peripheral apparatus by wireless communication or a universal serial bus (USB). The image generation apparatus 200 may further be connected to a server through a network. In this case, the server may provide an online application of a game or the like in which a plurality of users can participate through the network. The image generation apparatus 200 may be any of a game apparatus, a personal computer, a portable terminal and so forth. Further, the image generation apparatus 200 and the flat panel display 12 may be configured integrally.

Figure 2:
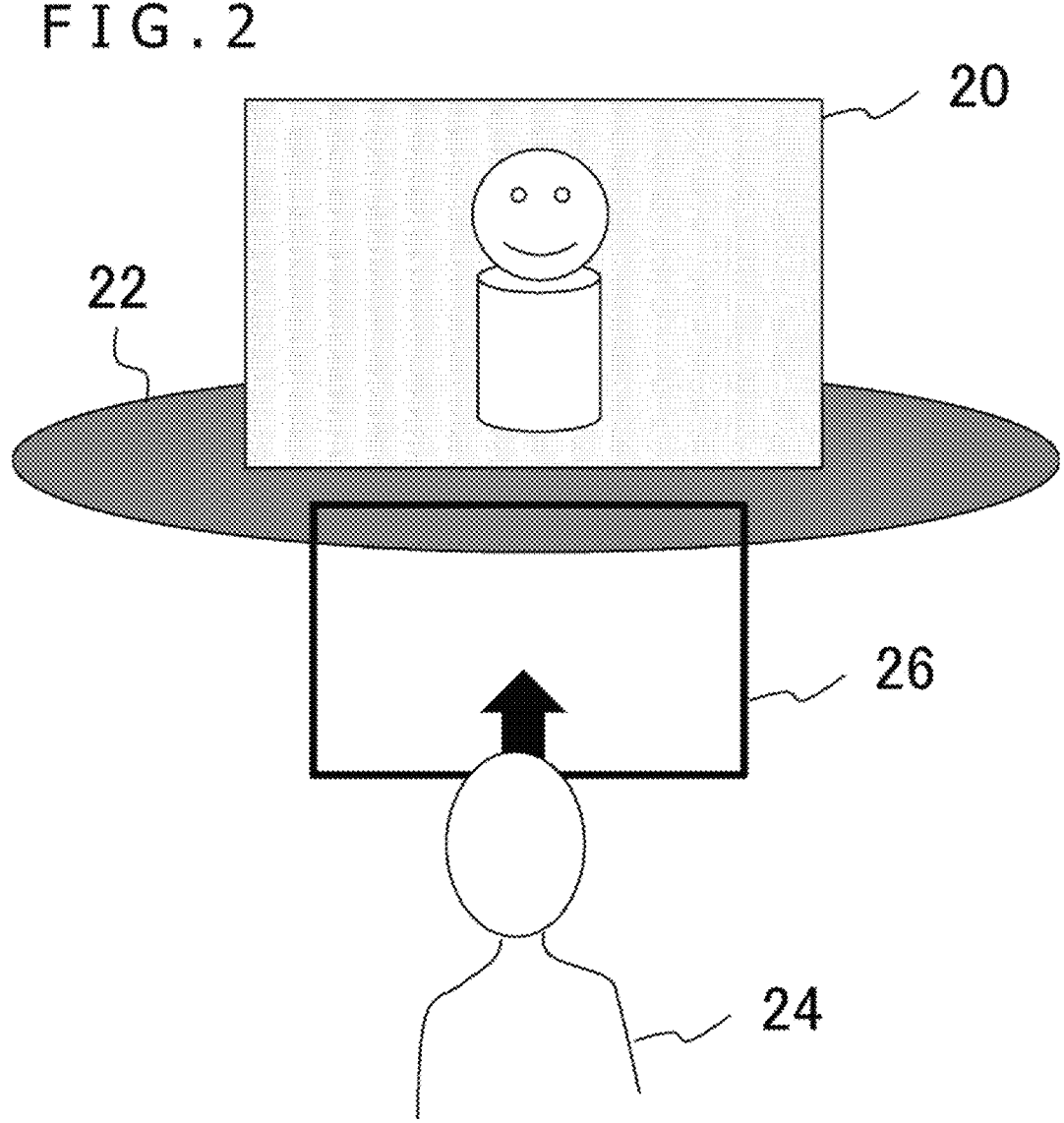
FIG. 2 is a view illustrating a form of display that can be implemented by the image displaying system of the embodiment 1.

FIG. 2 is a view illustrating a form of display implemented by the image displaying system. In the present embodiment, a state in which a plane on which an image is to be represented is further disposed in a virtual space is created. In particular, ideally an image screen 20 on which an image for stereoscopic viewing is to be displayed is disposed on a field 22 in a virtual space such that a user 24 can appreciate the image through a viewscreen 26. Here, the viewscreen 26 corresponds to a field of view of the image displayed on the flat panel display 12. It is to be noted that the field 22 in the virtual space merely represents a coordinate system of the virtual space and does not intend to restrict the shape or the like. Further, the field 22 may not necessarily be displayed.

Figure 3:
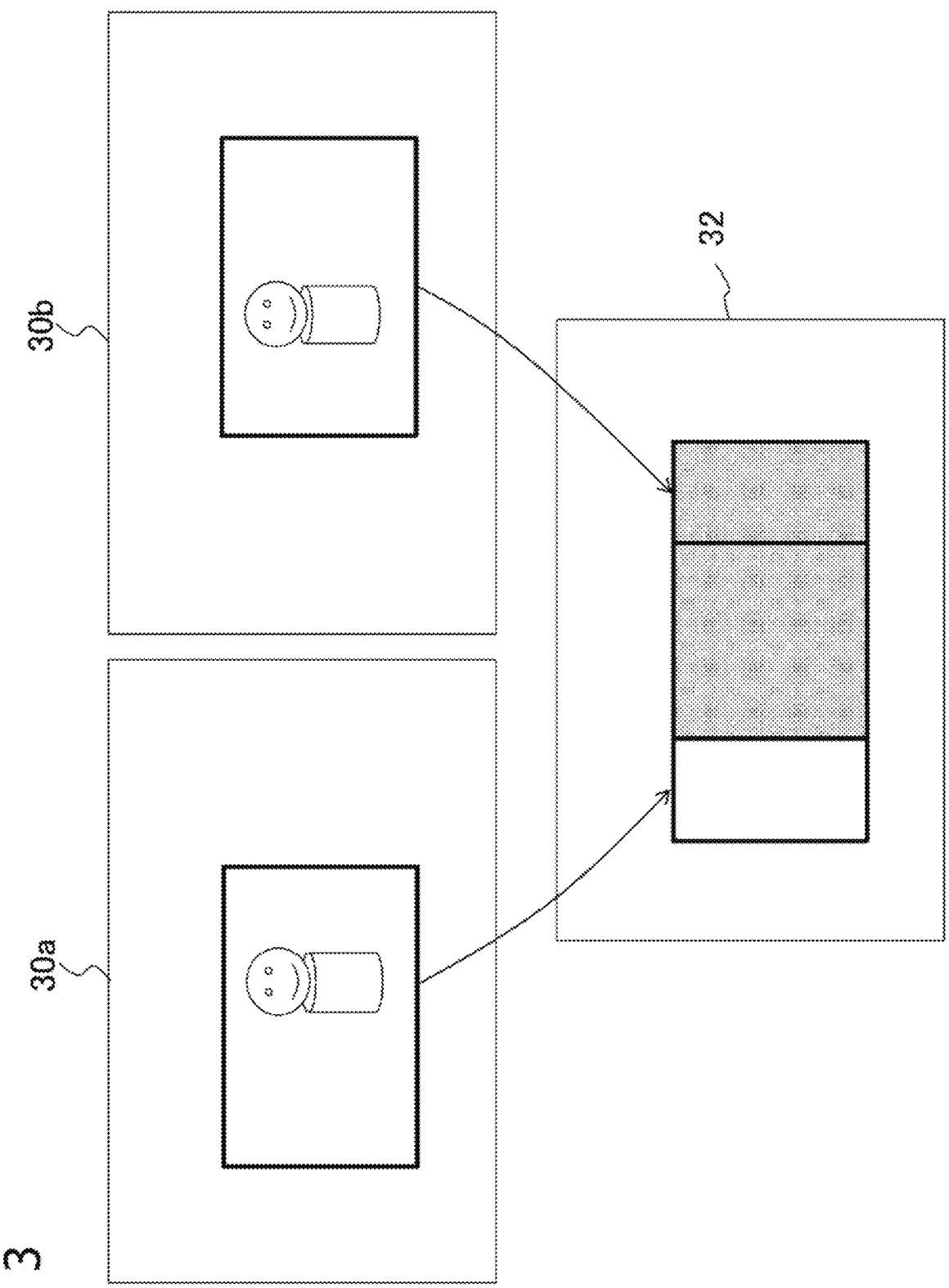
FIG. 3 schematically depicts an image generated by an image generation apparatus in order to implement the form of FIG. 2.

FIG. 3 schematically depicts an image generated by the image generation apparatus 200 in order to implement the form of FIG. 2. The image to be displayed on the image screen 20 in the present embodiment is configured from a pair of parallax images for stereoscopic viewing, namely, an image 30a for the left eye and an image 30b for the right eye. In order to cause such an image as depicted in FIG. 2 to be viewed stereoscopically, a same object appears rather rightwardly on the image 30a for the left eye and appears rather leftwardly on the image 30b for the right eye.

Further, since the position of the viewpoint on the image screen 20 differs between the left and right eyes, it is necessary to display the image 30a for the left eye and the image 30b for the right eye at positions corresponding to the respective viewpoints. In particular, the position of the frame of the image screen 20 differs between the image 30a for the left eye and the image 30b for the right eye, and if they are represented in a superimposed relationship with each other on a same plane, then such a positional relationship as depicted on a plane 32 is obtained. By generating such an image 30a for the left eye and an image 30b for the right eye as described above and introducing them the left eye and the right eye, respectively, by a known technique, an object appearing on the image screen 20 looks stereoscopic to the user.

In such a present embodiment as just described above, a form in which a pair of images prepared for stereoscopic viewing in advance are appreciated is supposed. As a technology for causing a virtual space to be viewed stereoscopically, a technology is available by which a virtual world is defined in a three-dimensional space in advance and an object of the virtual world is projected to a viewscreen according to the left and right viewpoints of a viewer to generate parallax images. On the other hand, in the case where two-dimensional images picked up or generated in advance are caused to be viewed stereoscopically like a three-dimensional video, since a parallax is given initially, the viewpoint of the viewer is restricted as it is now.

Figure 4:
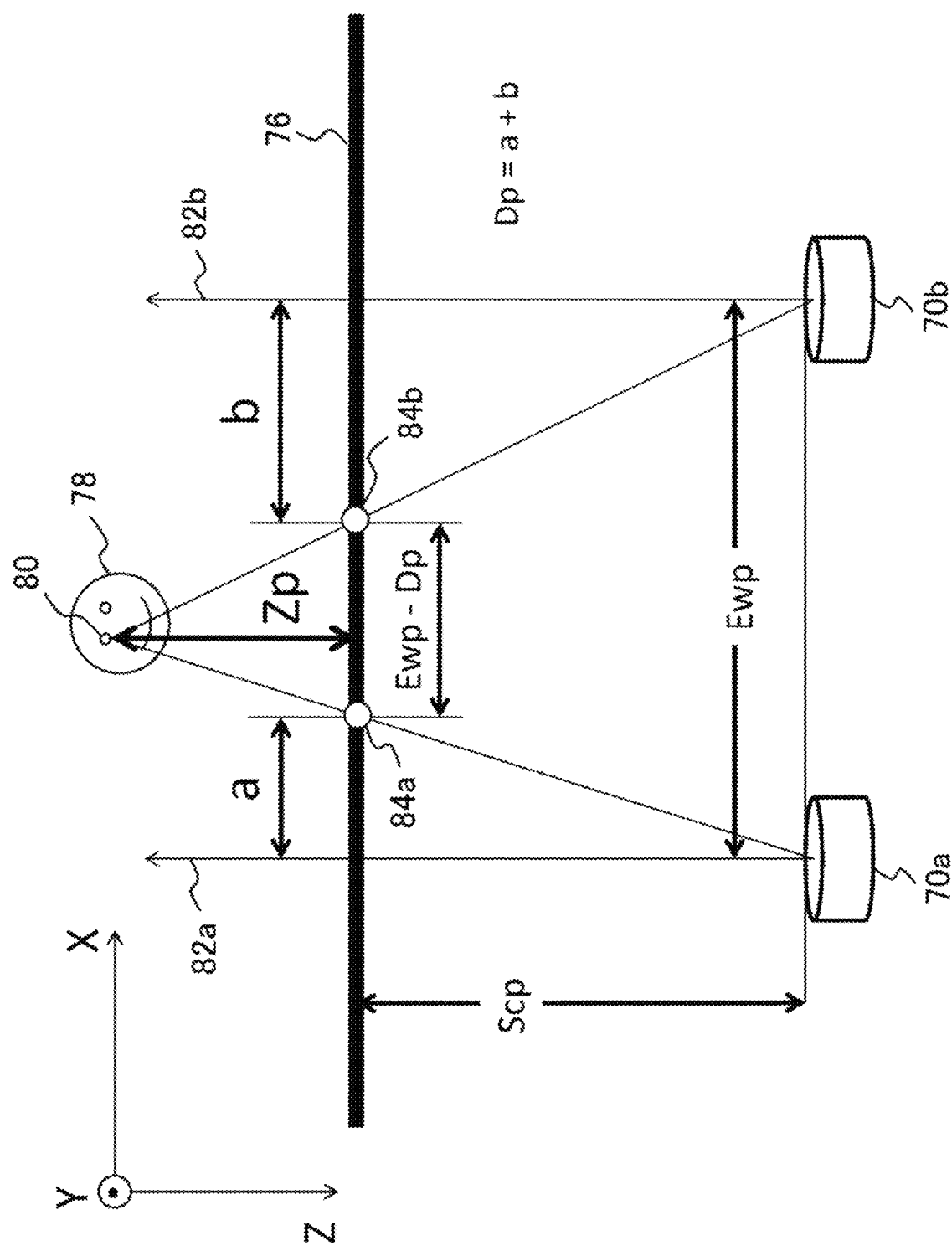
FIG. 4 is a view illustrating a relationship between a parallax and an image provided at a stage at which images for stereoscopic viewing are acquired in the embodiment 1.

FIG. 4 is a view illustrating a relationship between a parallax and an image given at a stage at which an image for stereoscopic viewing is acquired. FIG. 4 schematically depicts a state in which a virtual space that includes supposed left and right viewpoints (cameras 70a and 70b), an image screen 76 from which an image is to be acquired, and an object 78 appearing in the image. It is to be noted that also it is possible for the image to be an image picked up by a stereo camera, and the cameras 70a and 70b correspond to the stereo camera in this case.

Further, in FIG. 4, planes of a pair of images are represented simultaneously by the image screen 76. An image obtained initially on the image screen 76 in this manner is hereinafter referred to sometimes as "original image" in order to distinguish the image from a display image at the appreciation stage. Further, in the following description, a direction perpendicular to the plane of the original image is referred to as Z axis, and a horizontal direction and a vertical direction in the image plane are referred to as X axis and Y axis, respectively.

In the original image, a picture of the object 78 appears. For example, a certain point 80 on the surface of the object 78 appears at a position 84a spaced by a distance a to the right side from an optical axis 82a from the left camera 70a and appears at a position 84b spaced by a distance b to the left side from an optical axis 82b from the right camera 70b. In short, a parallax Dp with respect to the point 80 is a+b. Actually, an object may exist at various positions, and a picture is represented on left and right original images with a parallax according to the distance of the object in the depthwise direction.

A distance Zp from the image screen 76 to the point 80 on the object 78 can be determined in the following manner on the basis of the similarity of triangle using the parallax Dp.

$$Ewp:Ewp-Dp=Scp+Zp:Zp$$

Therefore, $$Zp=Scp*Ewp/Dp-Scp$$

where Ewp is the distance between the left and right cameras 70a and 70b, and Scp is the distance from the cameras 70a and 70b to the image screen 76.

Figure 5:
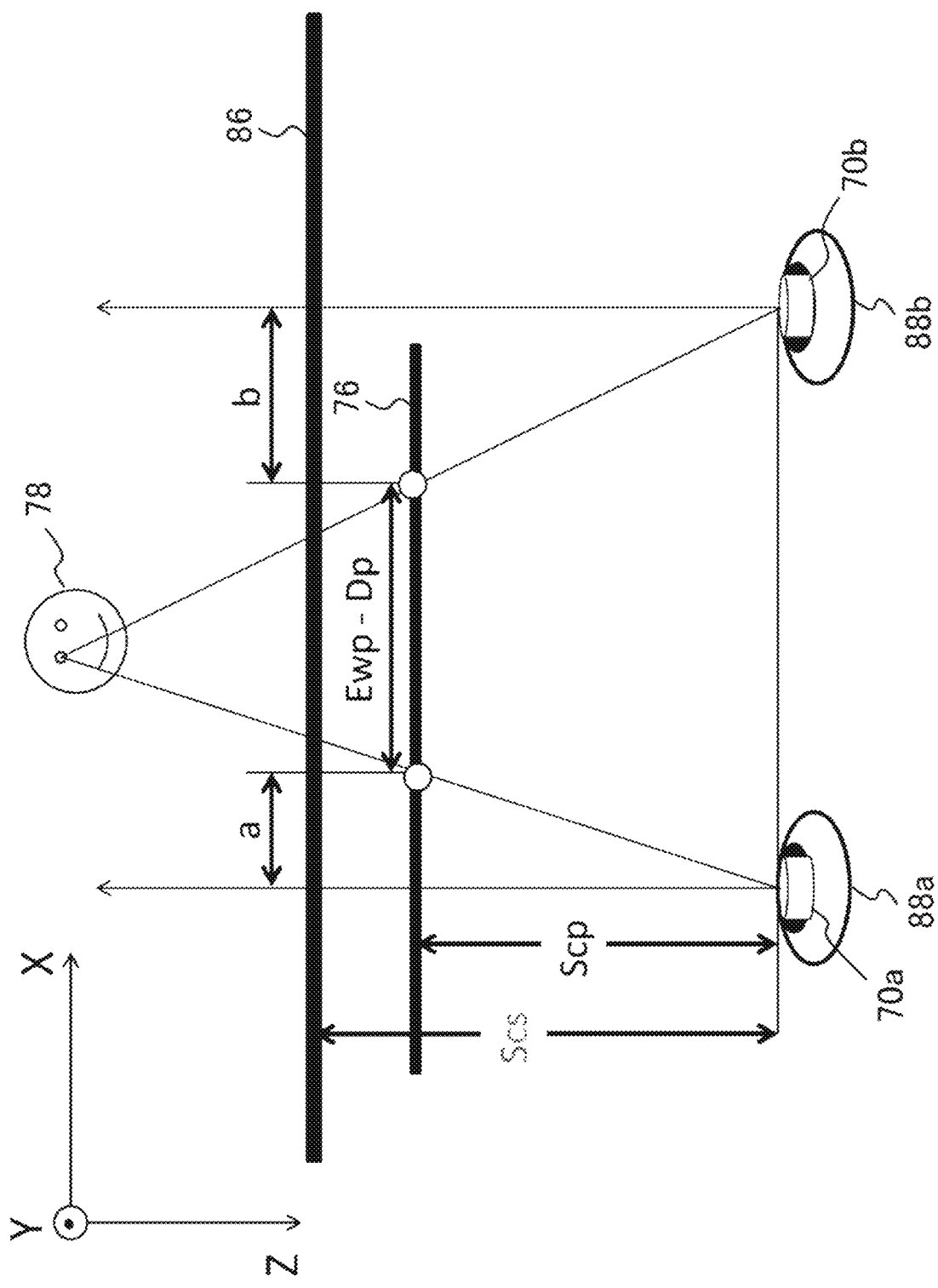
FIG. 5 is a view depicting a relationship between a viewpoint and an image in the case where a parallax image is appreciated from an appropriate position in the embodiment 1.

A case is considered in which an original image obtained in this manner is appreciated in such a manner as described above. FIG. 5 depicts a relationship between a viewpoint and an image in the case where parallax images are appreciated from an appropriate position. The format of the figure is similar to that of FIG. 4. At a stage at which an image is appreciated, viewpoints 88a and 88b of a viewer exist, and a viewscreen 86 that is viewed by a viewer exists at a position spaced by a distance Scs from the viewpoints 88a and 88b. In the case where the positional relationship upon parallax image acquisition depicted in FIG. 4 is applied such a spaced as just described, if the position of the image screen 76 is determined such that the viewpoints 88a and 88b of the viewer come to the same positions of the cameras 70a and 70b as depicted in FIG. 5 and the parallax images at the positions are projected individually to the viewscreen 86, then the object 78 can be viewed stereoscopically without distortion.

This corresponds to that the viewing frustums of the cameras 70a and 70b when the original images are acquired and the viewing frustums of the viewpoints 88a and 88b when the original images are appreciated coincide with each other, individually. On the other hand, if the viewer moves until the viewpoints 88a and 88b are placed out of such a positional relationship as depicted in FIG. 5, then it is supposable that the object looks distorted or cannot be stereoscopically viewed appropriately. In some cases, a bad influence may be had on the physical condition.

Figure 6:
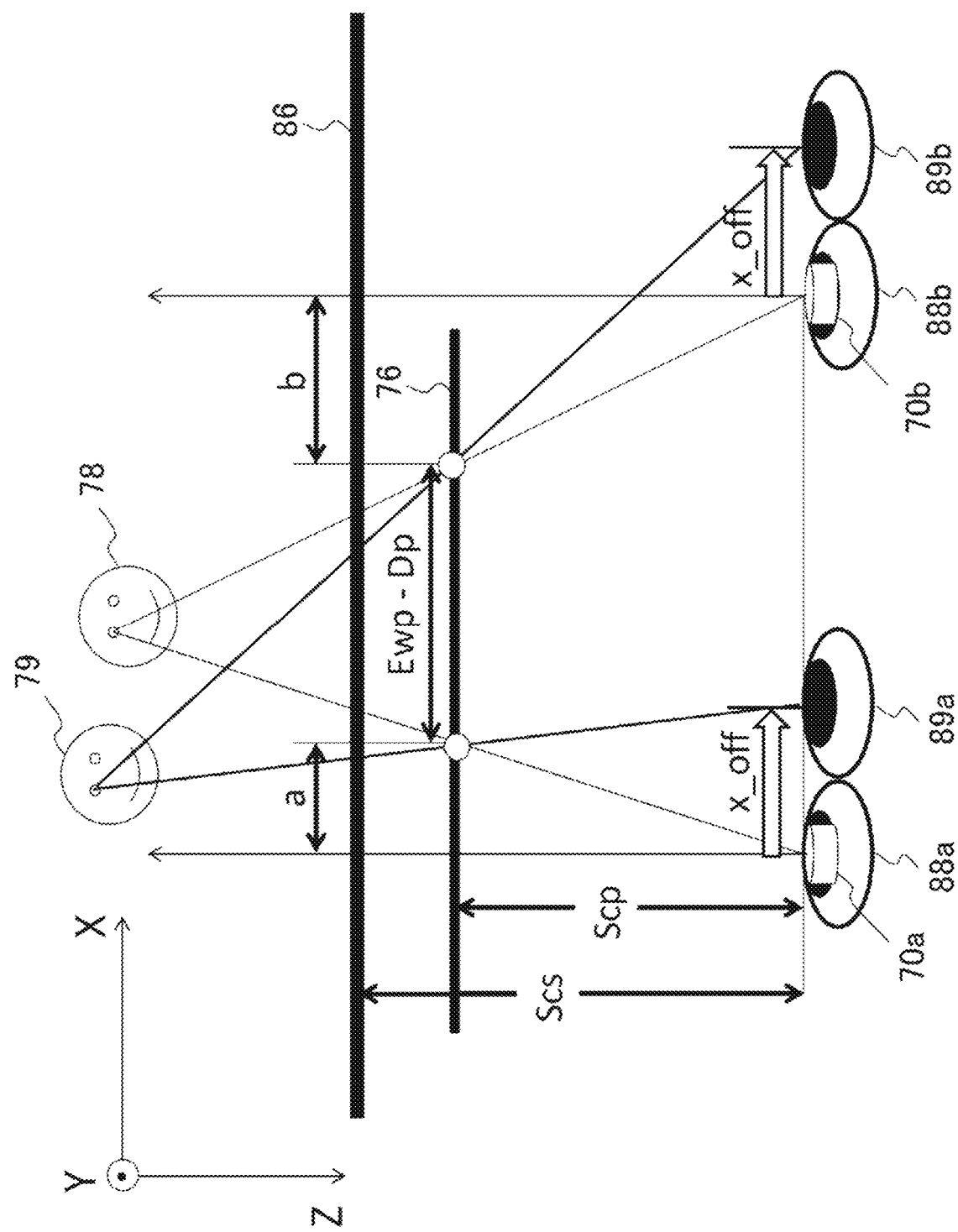
FIG. 6 is a view illustrating visual distortion when the viewpoint of a viewer in a virtual space is displaced in the disposition of FIG. 5.

FIG. 6 is a view illustrating visual distortion when the viewpoint of the viewer in the virtual space is displaced in the disposition of FIG. 5. As depicted in FIG. 6, in the case where the viewpoint of the viewer is displaced by x_off in the X axis direction and moves from the viewpoints 88a and 88b to viewpoints 89a and 89b, in an image as it is, the picture moves relative to the viewpoint. As a result, the object 78 looks moving to the position of an object 79 in the virtual space, which gives rise to visual distortion. In the present embodiment, the display image is corrected appropriately to make it possible to view a stereoscopic video that is free from distortion even if the viewpoint is displaced.

In particular, the original image is corrected such that, even if the viewpoint moves, the position of the object in the virtual space may not change or may not be distorted in response to the movement. It is to be noted that the following description is given principally of movement of a viewpoint and change of an image by the movement from a base point at the position of the viewpoint in a state in which the cameras and the viewing frustums of the viewer coincide with each other depicted in FIG. 5.

Figure 7:
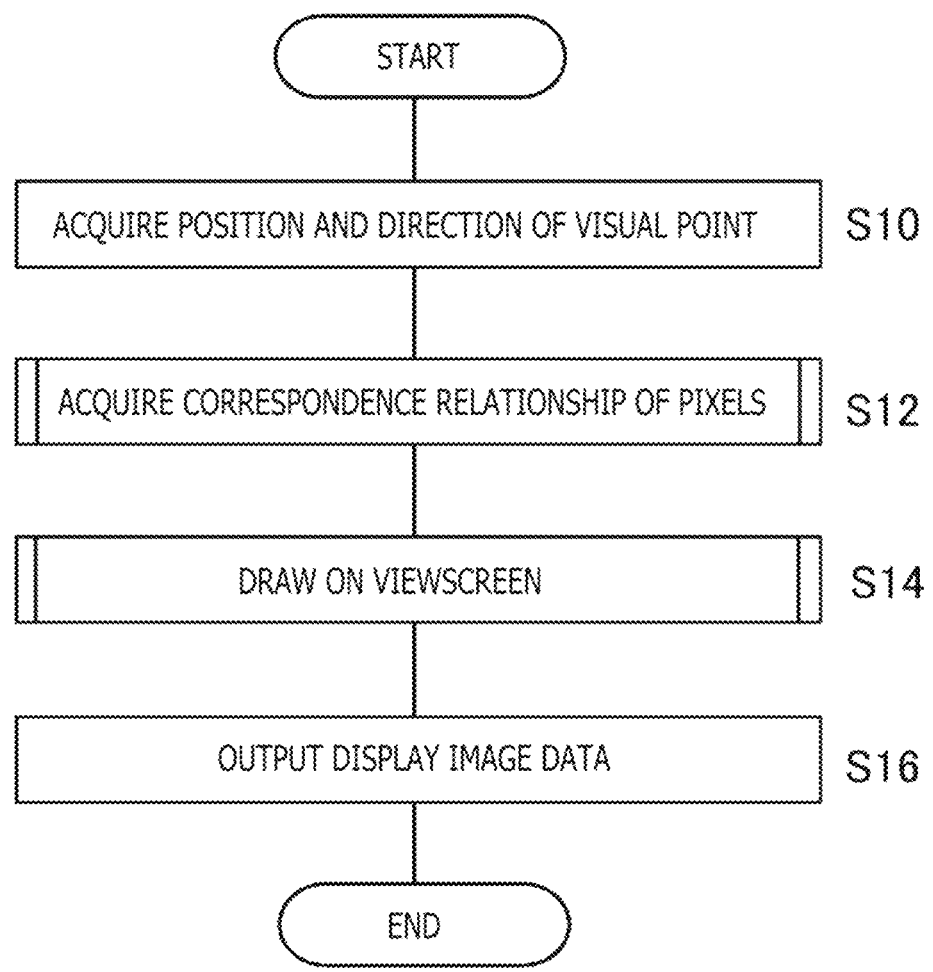
FIG. 7 is a flow chart depicting an outline of a processing procedure by which the image generation apparatus in the embodiment 1 generates a display image from an original image.

FIG. 7 is a flow chart depicting an outline of a processing procedure in which the image generation apparatus 200 in the present embodiment generates a display image from an original image. The image generation apparatus 200 first acquires the position of the viewpoint of the user (S10). For example, the image generation apparatus 200 picks up an image of an appearance of the user who appreciates a stereoscopic video by an image pickup apparatus not depicted and acquires the position and the posture of the user on the basis of the image. The image generation apparatus 200 may acquire the position or the tilt of the head of the user more strictly by causing the user to wear grasses on which light emitting markers are provided. From the position or the posture of the head acquired in this manner, the position of the viewpoint can be estimated. Further, it could be recognized by those skilled in the art that various other acquisition methods of a viewpoint of a user are conceivable.

Then, the image generation apparatus 200 calculates to which position of the original image a pixel on the viewscreen corresponding to a screen image of the display apparatus (S12). More particularly, the image generation apparatus 200 first generates a corrected image to which the original image is changed by determining the amount of movement and the direction of movement of pixels that configure the picture such that the object represented on the image does not change in response to the movement of the viewpoint, namely, the position of the object looks fixed in the virtual space.

In addition, perspective transformation is applied to the overall corrected image in response to the direction of the line of sight. Qualitatively, such a series of movements are followed reversely to determine, for each pixel of the viewscreen, the corresponding position on the original image. Then, the color values at the positions on the original image are reflected on the pixels of the viewscreen to draw a display image (S14). By performing such processes for the left and right viewpoints, a display image can be generated. By outputting the data of the display image to the display apparatus (S16), a stereoscopic image that does not suffer from distortion even if the viewpoint moves can be viewed.

The processes at the two stages at S12 and S16 of FIG. 7 can be implemented by successively changing the original image itself. In particular, by generating a corrected image to which the original image is changed once by movement of the viewpoint and perspectively transforming the corrected image on the viewscreen, the display image can be drawn. However, in this case, since the conversion process is performed twice for the original image, there is the possibility that the quality of the display image may not be maintained. Therefore, in place of generating the corrected image itself described above, an image map is generated which represents at which position of the original image each pixel of the corrected image according to the movement of the viewpoint initially is.

Then, the image map is projected to the viewscreen to specify the positional relationship between the viewscreen and the map, and then it is confirmed to which position of the original image each pixel on the viewscreen corresponds and then color values are acquired from the original image. By this, only one time operation is required for the original image, and the picture quality can be maintained at the original image level.

Here, since information representing to which position of the original image each pixel of the corrected image corresponds becomes a vector value whose start point and end point are defined on the image plane, it is hereafter referred to as "image reference vector." Further, a map that retains information of an image reference vector for each pixel on the corrected image and corresponds to the image plane is referred to as "image reference vector map" or simply as "map."

Figure 8:
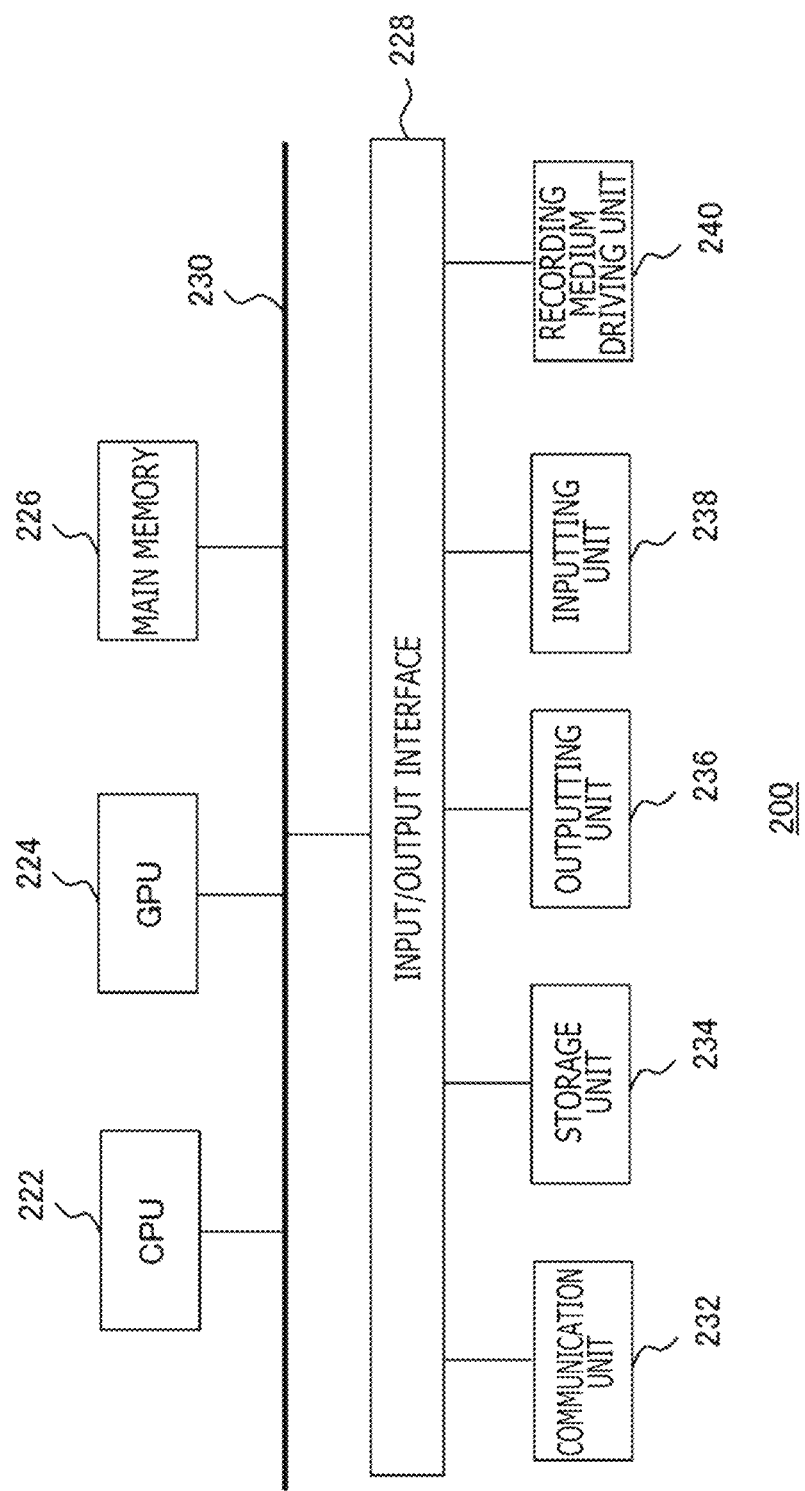
FIG. 8 is a view depicting an internal circuit configuration of the image generation apparatus in the embodiment 1.

FIG. 8 depicts an internal circuit configuration of the image generation apparatus 200. The image generation apparatus 200 includes a central processing unit (CPU) 222, a graphics processing unit (GPU) 224, and a main memory 226. The components are connected to each other through a bus 230. To the bus 230, an input/output interface 228 is connected further.

To the input/output interface 228, a communication unit 232 configured from a peripheral apparatus interface such as USB or Institute of Electrical and Electronics Engineers (IEEE) 1394 or a network interface to a wired or wireless local area network (LAN), a storage unit 234 such as a hard disk drive or a nonvolatile memory, an outputting unit 236 that outputs data to a display apparatus such as a head mounted display 100, an inputting unit 238 for receiving data as an input from the head mounted display 100, and a recording medium driving unit 240 that drives a removable recording medium such as a magnetic disk, an optical disk, or a semiconductor memory are connected.

The CPU 222 executes an operating system stored in the storage unit 234 to control the entire image generation apparatus 200. The CPU 222 further executes various programs read out from the removable recording medium and loaded into the main memory 226 or downloaded from the communication unit 232. The GPU 224 has a function of a geometry engine and a function of a rendering processor, and performs a drawing process in accordance with a drawing command from the CPU 222 and stores a display image into a frame buffer not depicted. Then, the GPU 224 converts a display image stored in the frame buffer into a video signal and outputs the video signal to the outputting unit 236. The main memory 226 is configured from a random access memory (RAM) and stores programs and data necessary for processing.

Figure 9:
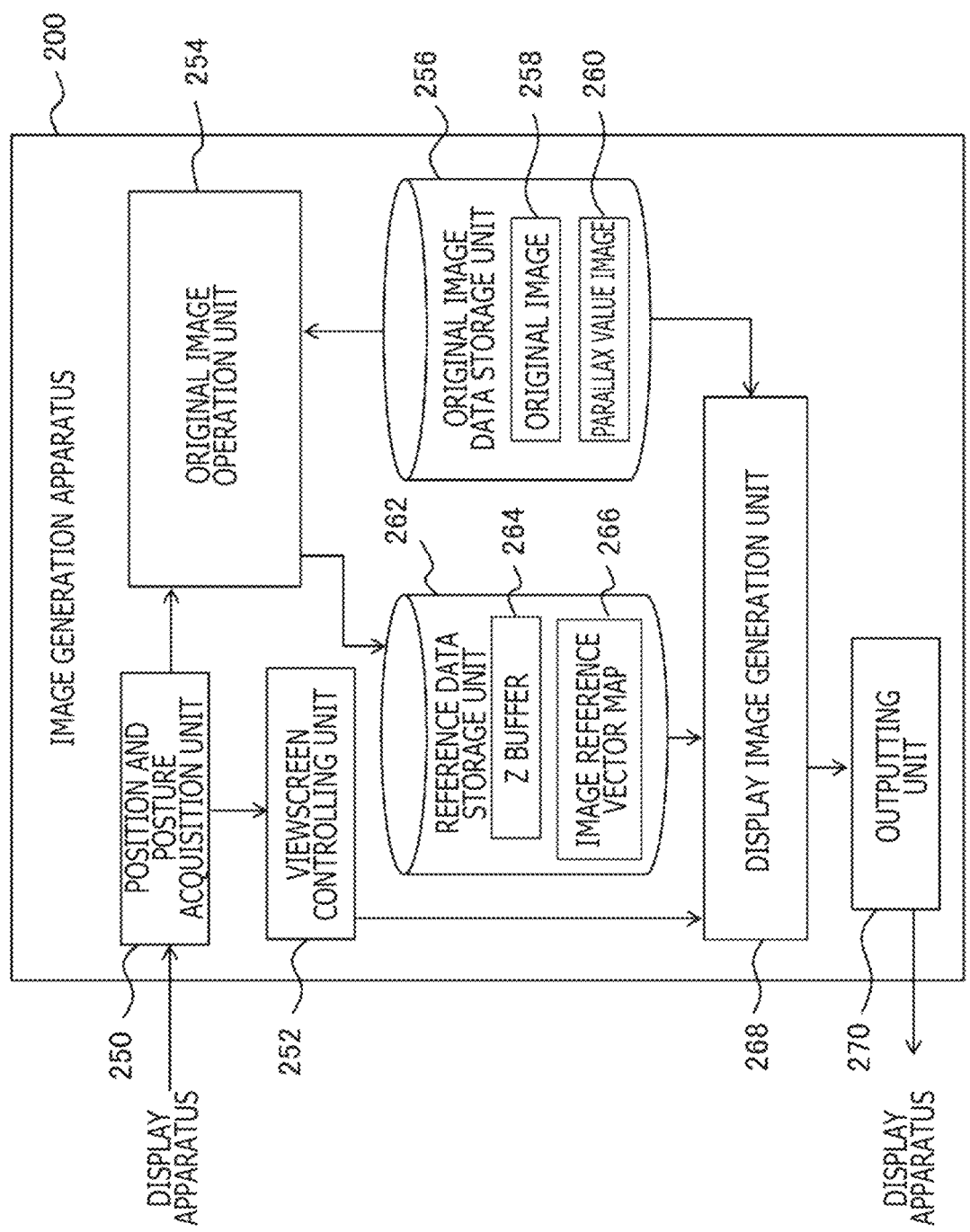
FIG. 9 is a view depicting functional blocks of the image generation apparatus in the embodiment 1.

FIG. 9 depicts functional blocks of the image generation apparatus 200 in the present embodiment. It is to be noted that at least some of the functions of the image generation apparatus 200 depicted in FIG. 9 may be incorporated in the display apparatus. Alternatively, at least some of the functions of the image generation apparatus 200 may be incorporated in a server connected to the image generation apparatus 200 through a network. Further, the image generation apparatus 200 may be part of an information processing apparatus such as a game machine or a personal computer.

FIG. 9 depicts a block diagram paying attention principally to a function for generating a display image from among the functions the image generation apparatus 200 has. The functional blocks can be implemented, in hardware, by a configuration such as CPU, GPU, various memories or the like depicted in FIG. 8. The functional blocks can be implemented, in software, by a program that demonstrates such various functions loaded from a recording medium or the like into a memory as a data inputting function, a data retaining function, an image processing function, and a communication function. Accordingly, it is recognized by those skilled in the art that the functional blocks can be implemented in various forms from only hardware, only software, or a combination of them and are not limited to any of them.

The image generation apparatus 200 includes a position and posture acquisition unit 250 that acquires the position or the posture of the user, a viewscreen setting unit 252 that sets a viewscreen, an original image operation unit 254 that generates an image reference vector map on the basis of the position of the viewpoint, an original image data storage unit 256 that stores data of an original image, a reference data storage unit 262 that stores intermediate data of an image reference vector map or the like, a display image generation unit 268 that draws a display image on the viewscreen using the image reference vector map, and an outputting unit 270 that outputs data of the generated display image.

The position and posture acquisition unit 250 acquires the position or the posture of the head of the user by such means as described above. The viewscreen setting unit 252 sets a viewscreen corresponding to the screen image of the display apparatus. Where the display apparatus is a flat panel display, the viewscreen is fixed, but in the case of a head mounted display, it is necessary to move the viewscreen so as to correspond to the movement of the head of the user. In this case, the viewscreen setting unit 252 successively acquires information relating to the position or the posture of the head of the user from the position and posture acquisition unit 250 and sets a viewscreen in response to the information. The display image to be drawn on the viewscreen is, for example, an image 60a for the left eye and an image 60b for the right eye depicted in FIG. 3, and also in regard to a viewscreen, those for the left eye and the right eye are set.

The original image operation unit 254 specifies the position of the viewpoint on the basis of the information regarding the position or the posture of the head of the user acquired by the position and posture acquisition unit 250 and calculates the amount and the direction of movement of pixels that configure a picture of the object in response to the specified position. Then, the original image operation unit 254 generates an image reference vector indicative of to which position of the original image each pixel after the movement corresponds. Furthermore, the original image operation unit 254 generates an image reference vector map, which associates the vector with each pixel on the image plane, for each of the left and right eyes.

As hereinafter described, in order to determine an image reference vector, a distance Zp of an object, which is represented on the image, in the virtual space is required in addition to the amount of movement and the direction of movement of the viewpoint. The distance Zp is determined from the parallax Dp between the left and right original images as described hereinabove. In the original image data storage unit 256, left and right original image data 258 and left and right parallax value image data 260, which retain a parallax value for each pixel of the images, are stored. It is to be noted that distance value image data that retain the distance Zp for each pixel of the left and right images may be prepared in place of the parallax value image data 260.

It is to be noted that the original image operation unit 254 may provide, depending upon the viewpoint, pixels that refer to the original image for the right eye in the image reference vector map for the left eye or provide pixels that refer to the original image for the left eye on the image reference vector map for the right eye. This is because a location that does not appear as a picture because it is included in a blind spot in one of the left and right original images sometimes appears on the other of the original images. In the case where it becomes necessary to display such a blind spot portion by movement of the viewpoint, also such details can be regenerated with high accuracy by acquiring data from the other one of the images.

The reference data storage unit 262 not only stores left and right image reference vector maps 266 generated by the original image operation unit 254 but also includes a Z buffer 264 that stores information of the Z value for deciding data to be written into an image reference vector at a stage of creation of the image reference vector maps 266. The display image generation unit 268 draws a display image on the viewscreen set by the viewscreen setting unit 252 by referring to the pixel value of the original image corresponding to each pixel.

In particular, by mapping the image reference vector map on the viewscreen by perspective transformation and then acquiring a color value of the original image on the basis of the image reference vector acquired at the position on the map corresponding to the pixel on the viewscreen, the pixel value of the pixel is determined. By performing this individually for the left and right eyes, display images for the left eye and the right eye can be generated. The outputting unit 270 outputs the data of the left and right display images generated by the display image generation unit 268 at a predetermined rate to the display apparatus. The outputting unit 270 may further output acoustic data of music for a menu screen image or sound included in various contents.

Figure 10:
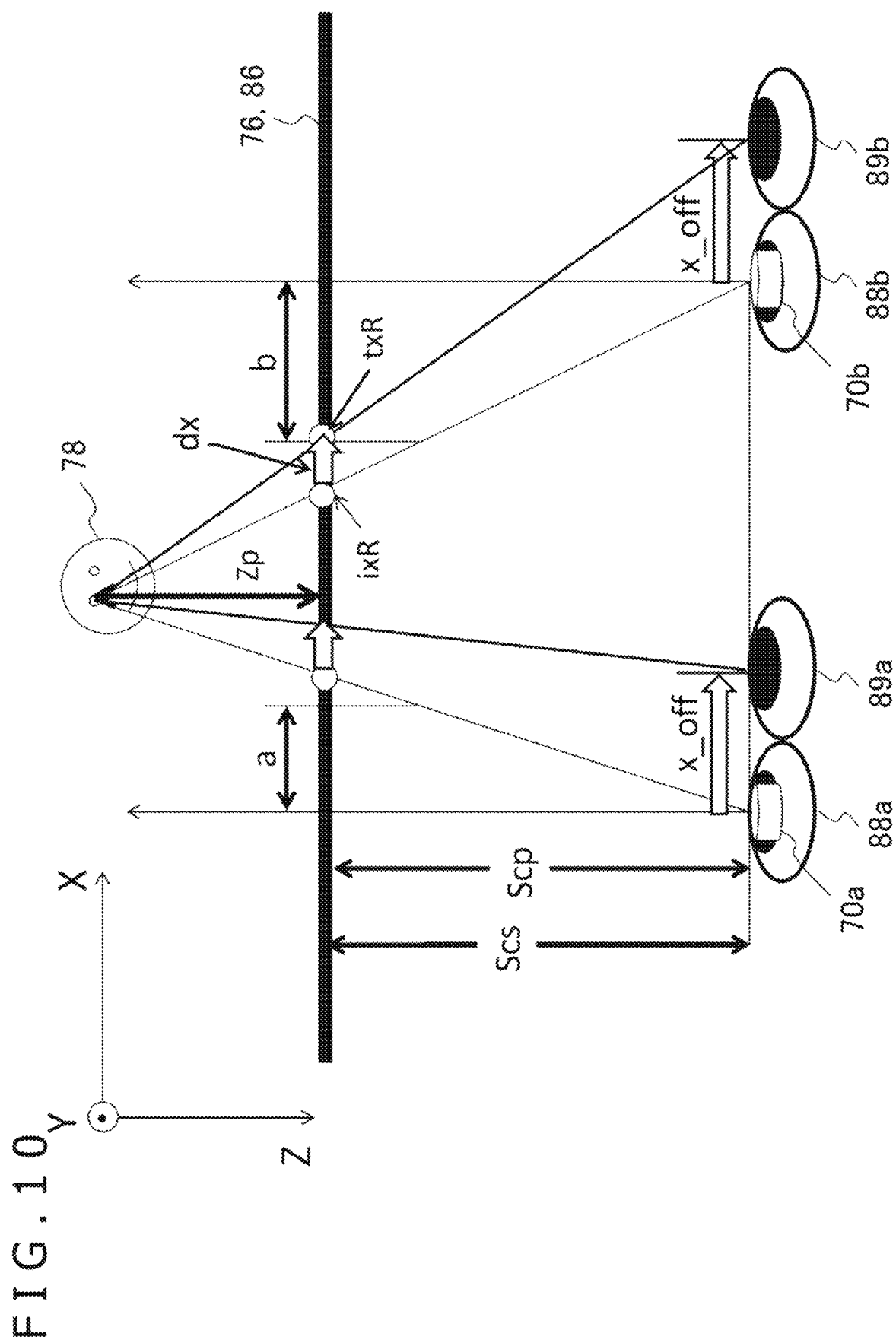
FIG. 10 is a view illustrating a relationship between the amount of movement of the viewpoint and the amount of movement of a pixel of an original image in response to the movement of the viewpoint in the embodiment 1.

Now, a technique by which the original image operation unit 254 calculates an image reference vector is described. FIG. 10 is a view illustrating a relationship between an amount of movement of a viewpoint and an amount of movement of a pixel of an original image in response to the movement of the viewpoint. In FIG. 10, the viewpoints after they move by x_off in the X axis direction from the viewpoints 88a and 88b in the state depicted in FIG. 5 are indicated as viewpoints 89a and 89b, respectively. It is to be noted that, in order to simplify the model, it is assumed that the original image is disposed on the viewscreen 86 in the virtual space, namely, the image screen 76 coincides with the viewscreen 86.

Such disposition is possible by suitably expanding or reducing stereo images. By this, the distance Scp from the viewpoint to the image screen 76 and the distance Scs from the viewpoint to the viewscreen 86 become equal to each other. Further, it is assumed that, in the description given below, the unit of a length on an image is suitably converted into a unit of a length in such a virtual space as depicted in the figure.

The image reference vector is information representative of a correspondence relationship of pixels when the object 78 in the virtual space looks fixed when the original image is viewed from the viewpoints 88a and 88b and when the image after correction is viewed from the viewpoints 89a and 89b after the movement. For example, if a picture that looks at a position ixR in the X axis direction of the original image for the right eye as viewed from the viewpoint 88b is moved to a position txR on the image after correction and is viewed from the viewpoint 89b, then the object 78 looks fixed.

The correction amount dx at this time has the following relationship to the movement amount x_off of the viewpoint depending upon similarity of triangle.

$$dx:x\_off=Zp:(Scp+Zp)$$

Accordingly, the correction amount dx can be determined by $$dx=Zp*x\_off/(Scp+Zp)$$

In other words, the correction amount dx is a function of the distance Zp of the object represented by pixels and the movement amount x_off of the viewpoint.

The correction amount dx is calculated for each pixel of the original image. However, in a region in which the distance Zp exhibits no change, the display position may be corrected in a unit of the region regarding that the overall region has a single distance Zp. Also the correction amount dy in the Y axis direction of the image can be calculated on the basis of the amount of movement of the viewpoint in the Y axis direction. The displacement vector (dx, dy) indicative of a correction amount of each pixel is calculated from the distance Zp of an object represented by each pixel in this manner. Since the distance Zp is calculated from the parallax value of each pixel in such a manner as described above, after all, the displacement vector (dx, dy) of each pixel can be calculated from the parallax value of each pixel.

Therefore, in the present embodiment, for each of the left and right original images, data of a parallax value image representing a parallax of an object, which appears as a picture in them, for each pixel are prepared. In particular, a parallax value image for the left eye in which, with reference to an original image for the left eye, a pixel value is represented for each pixel of the image and a parallel value image for the right eye in which, with reference to an original image for the right eye, a pixel value is represented for each pixel of the image are prepared. The reason why parallax value images for the left eye and the right eye are prepared is such as follows.

Figure 11:
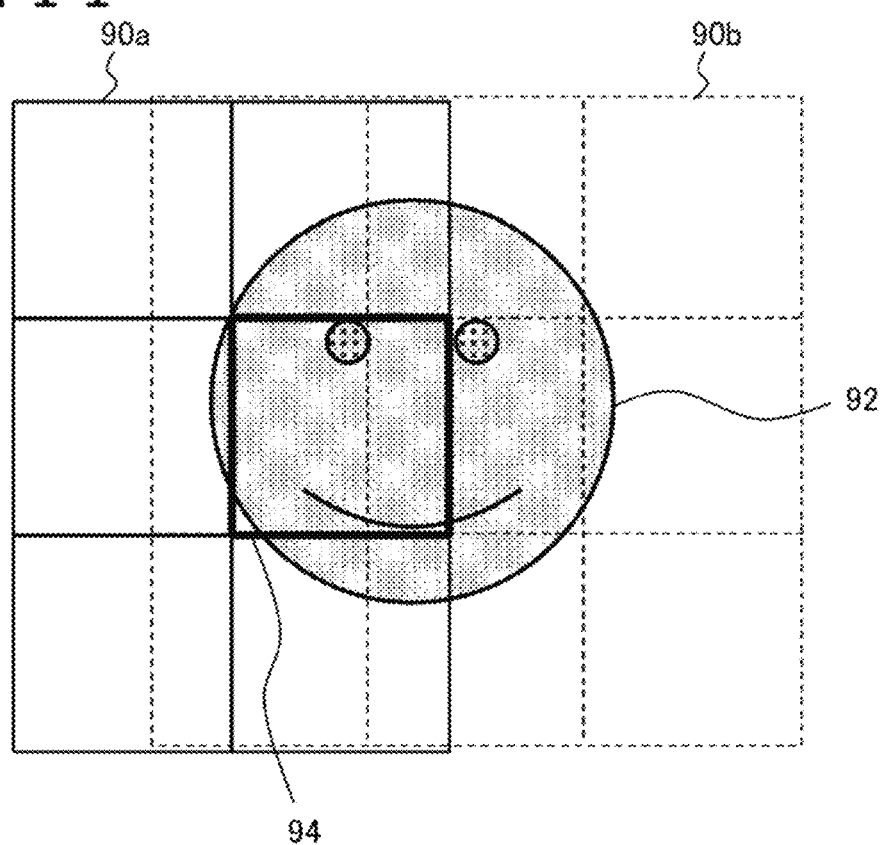
FIG. 11 is a view depicting pictures of a same object represented by left and right original images in a superimposed relationship with each other in the embodiment 1.

FIG. 11 depicts pictures of a same object represented on the left and right original images in a superposed relationship with each other. Boundaries of pixel regions of an original image 90a for the left eye and an original image 90b for the right eye are represented by lattices of a solid line and a broken line, respectively. As depicted in FIG. 11, even between pixel sets representative of a picture 92 of a same object, boundaries of pixels of both images do not necessarily coincide with each other. At this time, a region corresponding to a certain pixel (for example, a pixel 94 in a thick line lattice) in the original image 90a for the left eye extends over two pixels in the original image 90b for the right eye.

In this case, the parallax value obtained in regard to the pixel 94 of the original image 90a for the left eye has units of a subpixel smaller than a pixel. In short, even if a pixel represents a same picture, a very small difference appears, by which one of an original image for left and right is to refer, between positions on an object on which the picture is represented, and this gives rise to a difference between parallax values of subpixel units. As a result, data representing a parallax value for each pixel frequently does not coincide between the left and right original images. In other words, by generating a "parallax value image" that retains parallax values in a unit of a pixel for each of left and right original images and correcting the "parallax value images" independently of each other, parallax information in a unit of a subpixel and hence depthwise information can be reflected on the image.

Further, images acquired from different viewpoints are commonly different in component of specular reflection of light or component of refraction light. Such information is of a nature that it is included already at a stage at which original images for the right eye and the left eye are prepared. The present embodiment basically supposes that an actual viewpoint of a user is positioned substantially identically with a viewpoint supposed when an original image is acquired and puts the focus on deformation of each image for a viewpoint with high quality in response to a displacement of the viewpoint of the user. Accordingly, it is rational to generate a corrected image for the right eye from an original image for the right eye and generate a corrected image for the left eye from an original image for the left eye.

Figure 12:
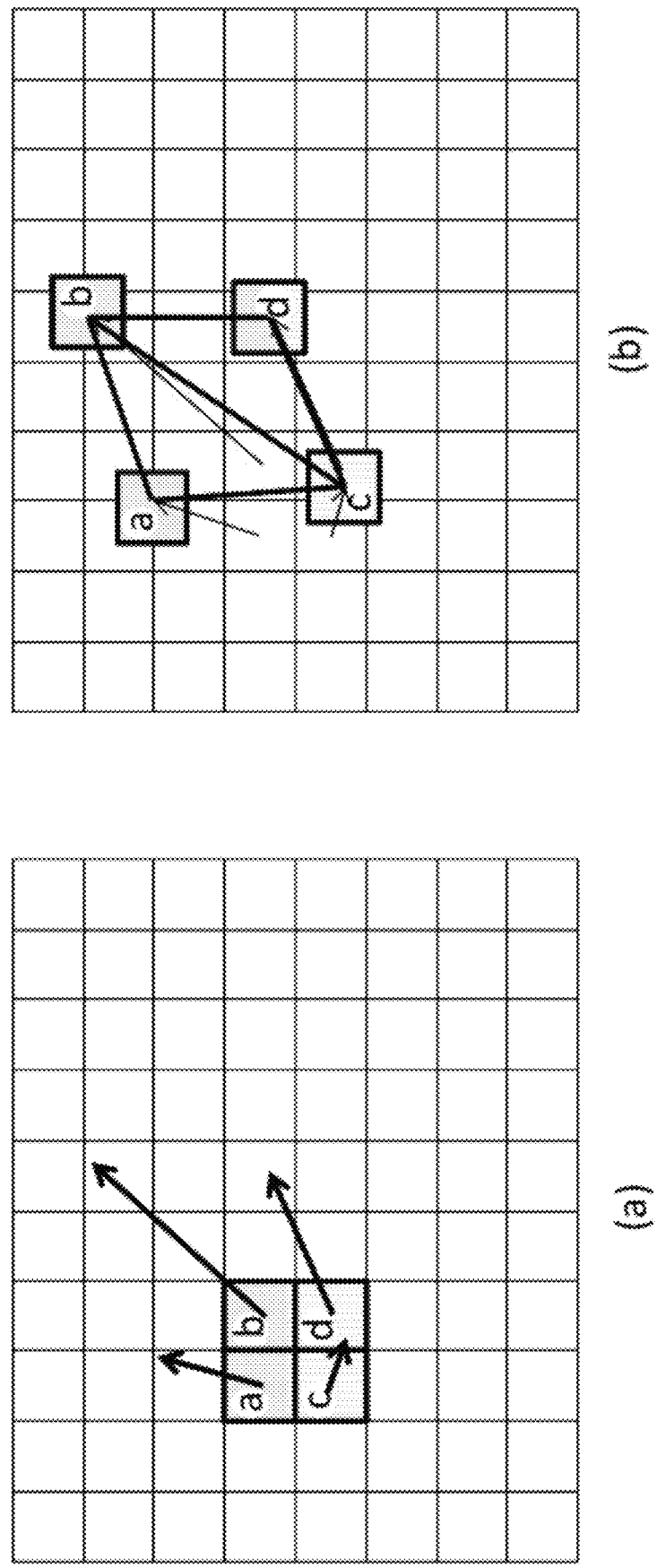
FIG. 12 is a view depicting a displacement vector of pixels of an original image in the embodiment 1.

FIG. 12 is a view depicting a displacement vector of pixels of an original image. In (a) of FIG. 12, displacement vectors (dx, dy) of four pixels a, b, c, and d are indicated by arrow marks. (b) depicts positions of the four pixels a, b, c, and d displaced by the displacement vectors.

The original image operation unit 254 rasterizes a triangle formed by connecting the centers of displaced pixels of (b) to determine an image reference vector regarding each pixel in the inside of the triangle. The coordinate values (integral values) of the three pixels configuring the triangle of the original image depicted in (a) are written as (ix0, iy0), (ix1, iy1), and (ix2, iy2). The displacement vectors of the three pixels are represented by (dx0, dy0), (dx1, dy1), and (dx2, dy2). If the coordinate values (real values) of the three pixels after the displacement depicted in (b) are written as (tx0, ty0), (tx1, ty1), and (tx2, ty2), then the coordinate values of the three pixels after the displacement are floating point numbers and are determined by $$txi=ixi+dxi$$

$$tyi=iyi+dyi$$

(where i=0, 1, 2).

Figure 13:
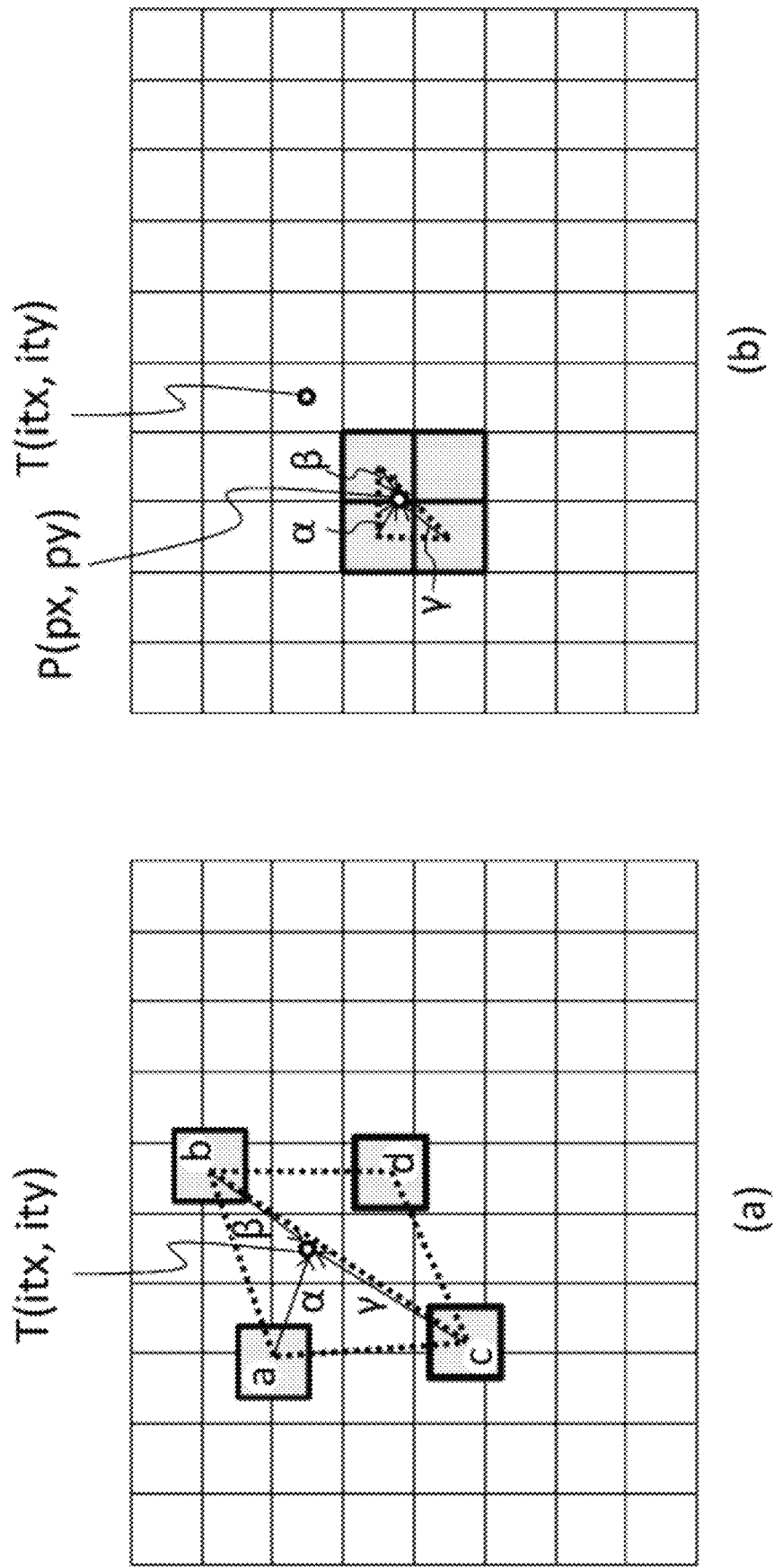
FIG. 13 is a view illustrating a generation method of an image reference vector in the embodiment 1.

FIG. 13 is a view illustrating a generation method of an image reference vector. First, coordinate values (integral values) of one target pixel T in the inside of the triangle configured by three pixels (tx0, ty0), (tx1, ty1), and (tx2, ty2) after the displacement are represented by (itx, ity). The center-of-gravity coordinates (α, β, γ) of the target pixel T are determined by the following expressions.

$$\alpha = \frac{(ty1-ty2)\cdot(itx-tx2)+(tx2-tx1)\cdot(ity-ty2)}{(ty1-ty2)\cdot(tx0-tx2)+(tx2-tx1)\cdot(ty0-ty2)} \quad \text{[Expression 1]}$$

$$\beta = \frac{(ty2-ty0)\cdot(itx-tx2)+(tx0-tx2)\cdot(ity-ty2)}{(ty1-ty2)\cdot(tx0-tx2)+(tx2-tx1)\cdot(ty0-ty2)}$$

$$\gamma = 1.0 - \alpha - \beta$$

On the other hand, the coordinate values (real values) of a start point P of displacement to the target pixel T (itx, ity) are written as (px, py) as depicted in (b). The coordinate values (px, py) of the start point P are calculated by the following expressions using the center-of-gravity coordinates (α, β, γ) of the target pixel T (itx, ity).

$$px = \alpha * ix0 + \beta * ix1 + \gamma * ix2$$

$$py = \alpha * iy0 + \beta * iy1 + \gamma * iy2$$

FIG. 14 is a view illustrating an image reference vector. As described hereinabove with reference to (b) of FIG. 13, the start point P (px, py) of the target pixel T (itx, ity) in the inside of the triangle configured by the three pixels after the displacement is calculated. The start point P is associated with the target pixel T by the movement of the viewpoint. As depicted in (a) of FIG. 14, a vector that refers to the coordinates of the start point P in the reverse direction from the coordinates of the target pixel T, namely, a vector representing to which position of the original image each pixel in the corrected image corresponds, is an image reference vector.

Further, as depicted in (b), an image reference vector map is a map in which an image reference vector (indicated by an arrow mark) that points to a start point is stored for each target pixel in the inside of a triangle. The image reference vector map is hereinafter referred to sometimes merely as "map." Attention is to be paid to that, into the target pixel T (itx, ity) where the inside of the triangle is rasterized, not a pixel value of a start point P obtained by bilinearly interpolating the pixel values of the three pixels (ix0, iy0), (ix1, iy1), and (ix2, iy2) is stored, but a vector that refers to the start point P from the target pixel T is stored.

In the case of an ordinary pixel value (For example, RGBA values), in order to represent that a pixel value to be stored does not exist, 0 can be stored into each factor of the pixel value. On the other hand, in the case of an image reference vector, that a value to be stored does not exist cannot be represented by setting the value of the image reference vector to 0. This is because that the image reference vector is 0 has a significance that the correction amount from the original image is zero, and this cannot be distinguished from that a start point P of a reference source having a corresponding parallax value or distance value does not exist.

Therefore, for example, the least significant bit of the X component of the image reference vector is used as a flag bit indicative of whether or not an image reference vector exists. If the flag bit is 0, then the image reference vector of the pixel is handled as invalid, and only in the case where the flag bit is 1, the image reference vector is used as valid data. It is to be noted that also it is possible to perform a same process by storing the flag bit into a different memory region without embedding the image reference vector into the least significant bit. However, in this case, a surplus memory region becomes required, and besides, a demerit occurs that a surplus memory bandwidth is consumed for reading and writing the memory region is consumed.

Although the generation process of an image reference vector map described above is described in connection with the case in which at least three pixels are juxtaposed in a triangular shape, an actual original image sometimes includes, presupposing an alpha test or the like, an invalid pixel whose alpha value is 0. In such a case as just described, it is necessary to generate an image reference vector only for a value pixel whose alpha value is not 0. Alternatively, also such a method is conceivable that some bit of a pixel value of a parallax value image is used to represent whether a pixel of an original image is valid/invalid or information of such validity/invalidity is retained directly in a different memory region. In the following, a generation process of an image reference vector map is described in detail in regard to separate cases.

FIG. 15 is a view illustrating a generation technique of an image reference vector in the case where only one pixel is valid. Pixels around the valid pixel are all invalid. In this case, an image reference vector is generated only using the one valid pixel in the following manner. As depicted in FIG. 10, in the case where the two viewpoints move by x_off in the X axis direction, the correction amount (dx0, dy0) becomes, using the distance Zp0 of the object, $$dx0 = Zp0 * x\_off / (Scp + Zp0)$$

$$dy0 = 0.$$

Here, from that (dx0, dy0) are floating point numbers and the position correction amounts for the pixel of (ix0, iy0) are (dx0, dy0), it is considered that a pixel at the position at which the decimal point of dx0 and dy0 is rounded off becomes a pixel of a target, and therefore, (−dx0, −dy0) are written as an image reference vector of the pixel at the position of ((int)(ix0+dx0+0.5), (int)(iy0+dy0+0.5)) of the image reference vector map.

Figure 16:
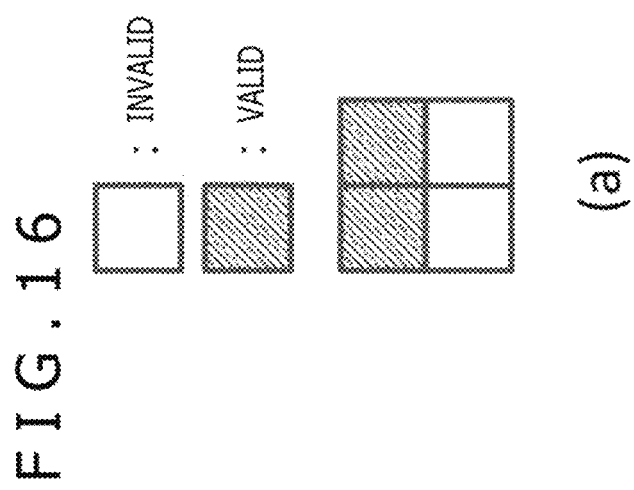
FIG. 16 is a view depicting the case in which two pixels are valid in the embodiment 1.

FIG. 16 is a view depicting the case in which two pixels are valid. As a case in which two pixels are valid, four cases are available for processing including a case in which two horizontally lined up pixels are valid like (a), another case in which two vertically lined up pixels are valid like (b), a further case in which two pixels at the left upper position and the right lower position are valid like (c), and a still further case in which two pixels at the right upper position and the left lower position are valid. Since a coordinate of a pixel is incremented one by one, the four cases described above exist except cases in which pixels overlap.

Figure 17:
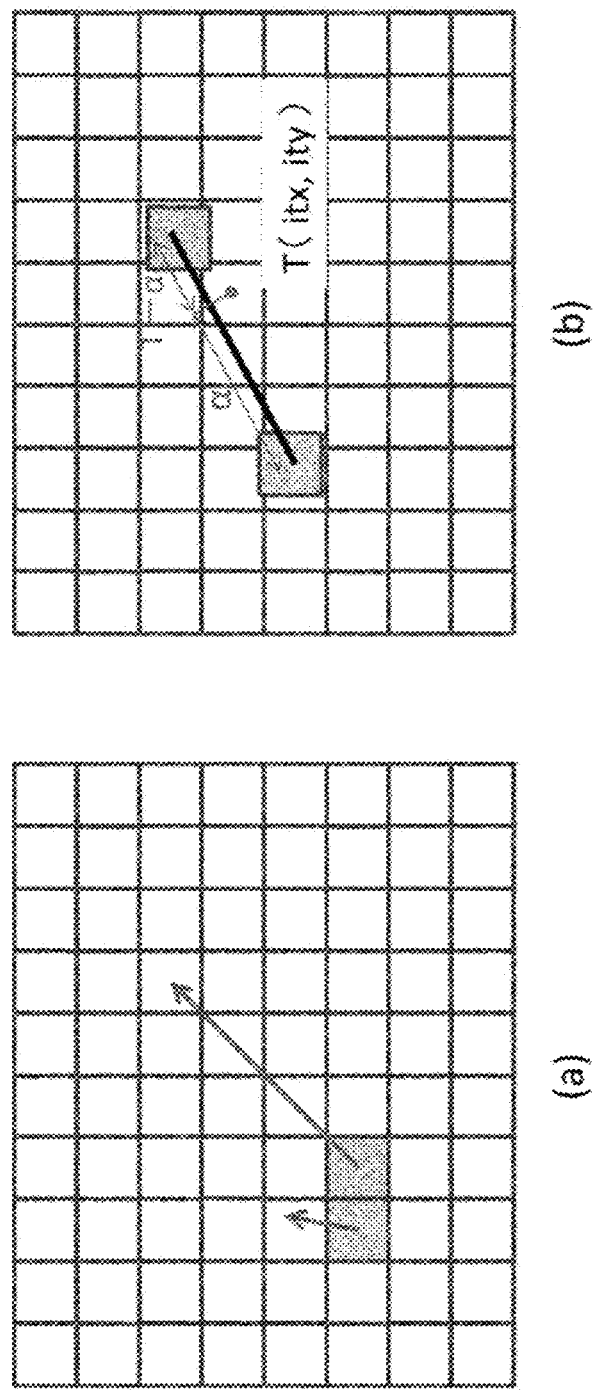
FIG. 17 is a view illustrating a generation technique of an image reference vector in the case where only two pixels are valid in the embodiment 1.
Figure 18:
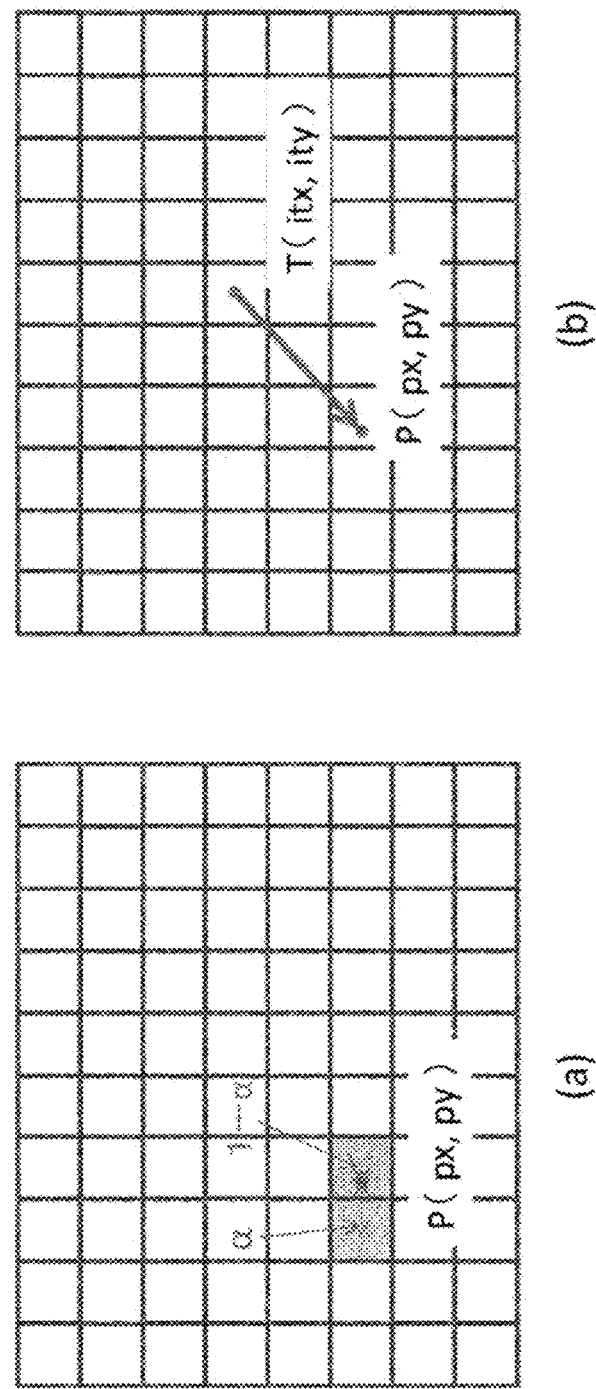
FIG. 18 is a view illustrating a generation technique of an image reference vector in the case where only two pixels are valid in the embodiment 1.

FIGS. 17 and 18 are views illustrating a method for determining an image reference vector in the case where two pixels are valid. As depicted in (a) of FIG. 17, for two valid pixels, a displaced position of each pixel is calculated from an individual parallax value. (b) of FIG. 17 depicts the positions of the two pixels after the displacement. A target pixel whose image reference vector is to be determined is represented by T (itx, ity). A perpendicular is drawn from the center of the target pixel T (itx, ity) to a line segment interconnecting the positions of the two displaced pixels, and a ratio α:1−α at which the foot of the perpendicular internally divides the line segment is determined.

Then, a point that internally divides a line segment, which interconnects the centers of the two original pixels at an interior division ratio α:1−α, is determined as a start point P (px, py) as depicted in (a) of FIG. 18. Then, as depicted in (b) of FIG. 18, a vector that refers to the start point P (px, py) from the target pixel T (itx, ity) is determined and set as an image reference vector of the target pixel T (itx, ity).

FIG. 19 is a view illustrating a generation technique of an image reference vector in the case where three pixels are valid. As a case in which three pixels are valid, four cases are available for processing including a case in which a right lower pixel is invalid like (a), another case in which a right upper pixel is invalid like (b), a further case in which a left lower pixel is invalid like (c), and a still further case in which a left upper pixel is invalid like (d). In each of the cases, an image reference vector may be determined by interpolation using center-of-gravity coordinates in regard to a triangle configured by three valid pixels in such a manner as described hereinabove.

FIG. 20 is a view illustrating a generation technique of an image reference vector in the case where four pixels are valid. The case where all of four pixels are valid like (a) can be divided into a case in which one right lower pixel is invalid while the other three pixels are valid like (b), and another case in which one right upper pixel is invalid while the other three pixels are valid like (c). Accordingly, rasterization may be performed for each of a triangle configured from the three valid pixels of (b) and another triangle configured from the three valid pixels of (c), and an image reference vector may be determined by interpolation using center-of-gravity coordinates.

The generation process of an image reference vector described above is performed while ix and iy are successively incremented one by one. In order to avoid flaws by calculation errors, processing for rasterization of pixels on a boundary line is performed in an overlapping relationship between different processes to determine an image reference vector, and simultaneously the Zp value at the center of each pixel of the displaced coordinates is determined from parameters of same linear interpolation and is stored into the Z buffer 264 to perform Z comparison such that an image reference vector having the lowest Zp value is selected. By this, it is possible to uniquely exclude overlapping on the boundary line.

Now, a method for determining a displacement of a pixel in the case when the user rotates its head to obtain an image reference vector is described with reference to FIGS. 21 to 24. In the case where a stereoscopic video by a stereo image is to be appreciated, if the offset direction of left and right images rotates with respect to the horizontal direction of the eyes of the human being, then image processing in the brain fails, resulting in such a problem that dizziness is caused or the stereoscopic image does not look stereoscopically or looks as two images. A method for correcting such rotation around the Z axis of a stereo image in the plane of a screen is described.

Figure 21:
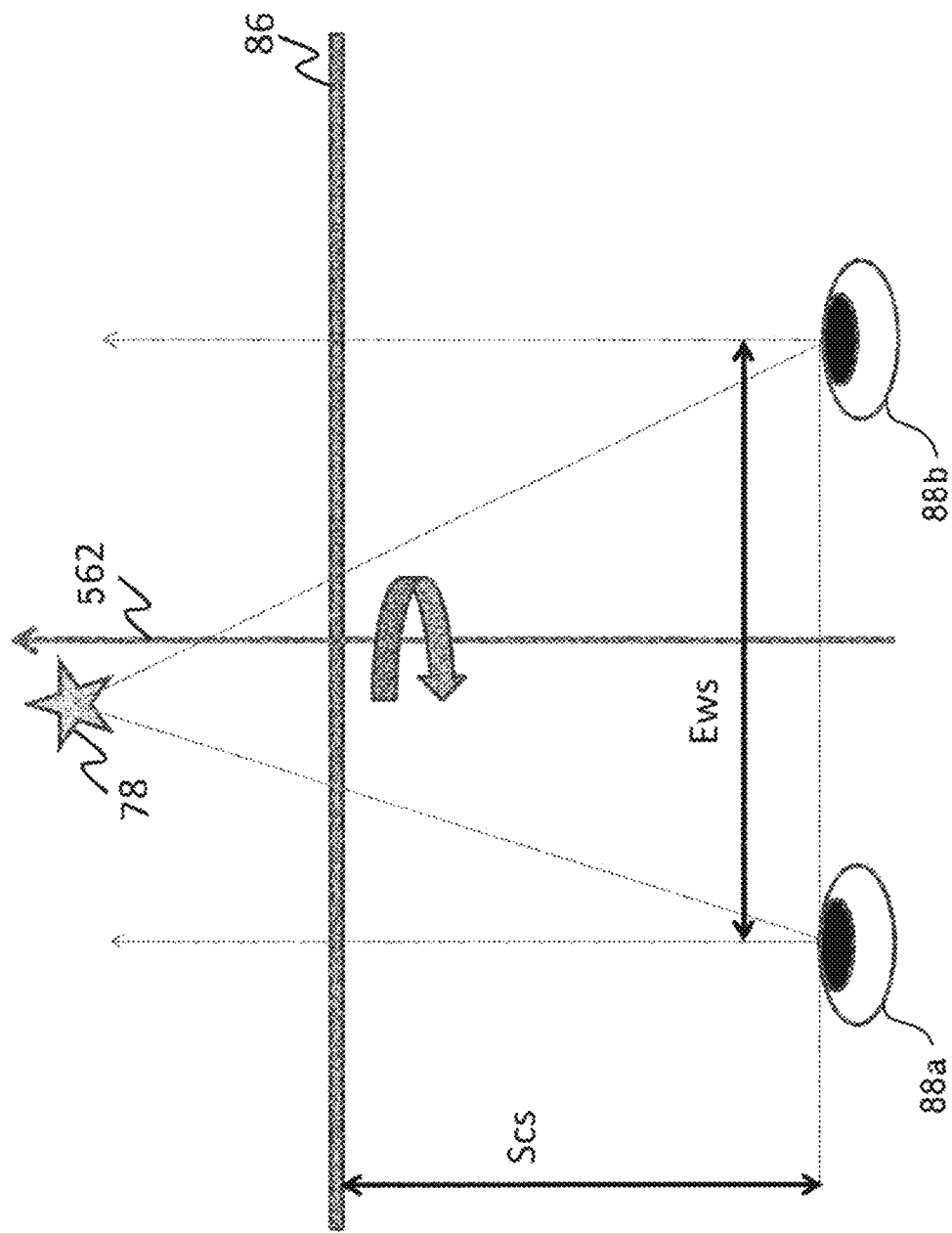
FIG. 21 is a view illustrating rotation of the positions of the two eyes of a user who observes a virtual space in the embodiment 1.

FIG. 21 is a view illustrating rotation of the positions of both eyes of a user who observes a virtual space. If the user tilts its head, then it is considered that both eyes of the user who observes an object 78 through the viewscreen 86 rotate around the central line 562 of sight. In particular, the rotation here points to a change of the angle (inclination) between a straight line in the horizontal direction interconnecting the left and right viewpoints and an actual horizontal plane including the axis of abscissa of the screen image, and rotation occurs when the user tilts its head or in a like case.

Figure 22:
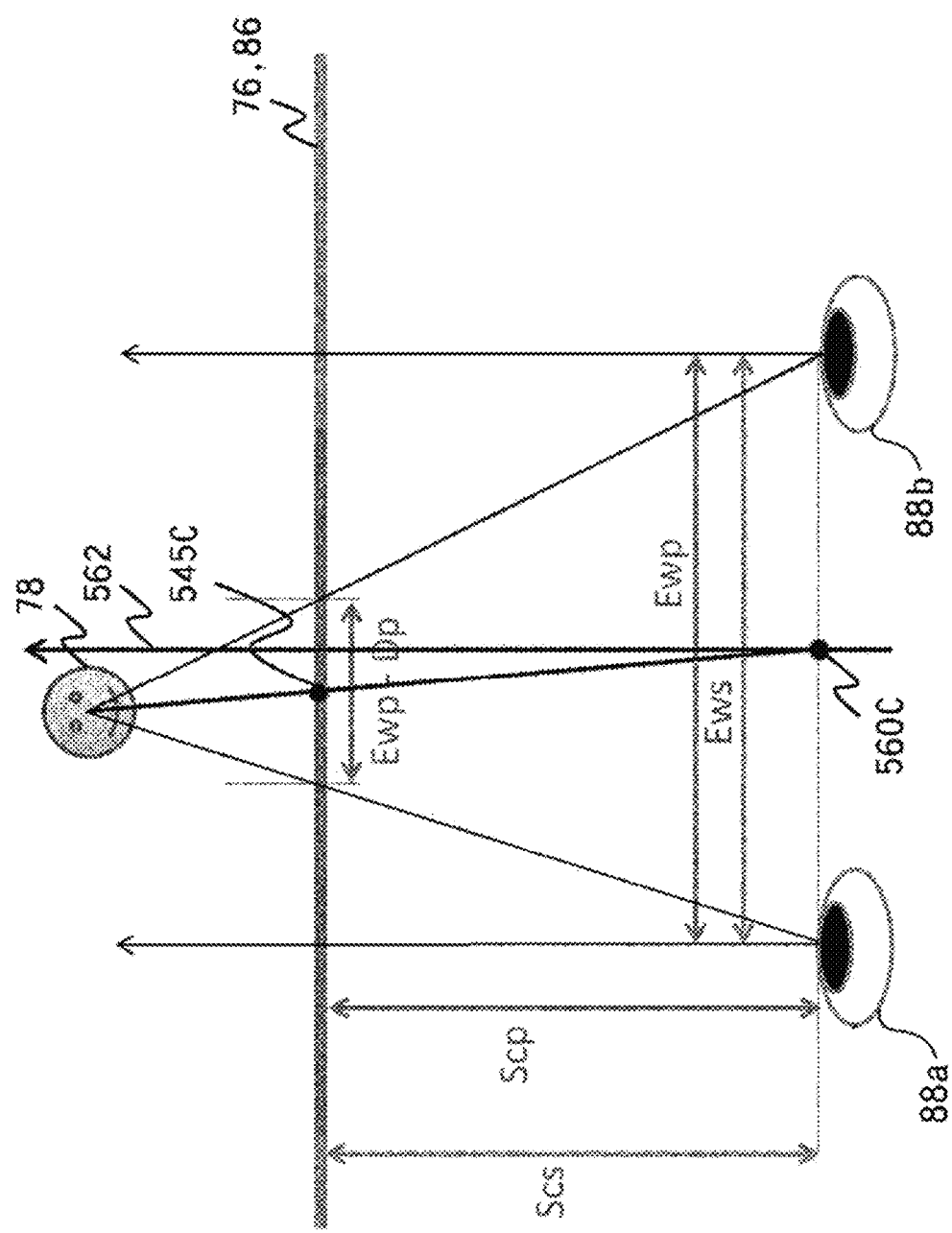
FIG. 22 is a view illustrating an image in the case where an original image disposed in a virtual space is viewed from a central viewpoint in the embodiment 1.

FIG. 22 is a view illustrating an image in the case where an original image disposed in a virtual space is viewed from the central viewpoint. Considering rotation in the plane of the viewscreen 86, it is assumed that the axis of rotation is the central line 562 of sight. A central image 545C of the object 78 in a proper state when viewed from a central viewpoint 560C that is the center of the left and right eyes is called "central image."

Since the central image 545C is a same image as viewed from the left and right eyes (accurately, there is a difference in luminance caused by a difference in specular reflection of the surface of a target between the left and right viewpoints or a difference in luminance arising from displacement in pixel position on the subpixel level), this is considered as a standard image, and it is considered that this rotates around the central line 562 of sight. Since the central viewpoint 560C is the center of the viewpoint 88a of the left eye and the viewpoint 88b of the right eye, the central image 545C is at the center of the right eye image and the left eye image. The distance Ewp−DP between corresponding points of the right eye image and the left eye image is written as Ewosc (eye width on screen). Ewosc is a function of the distance Zp.

Figure 23:
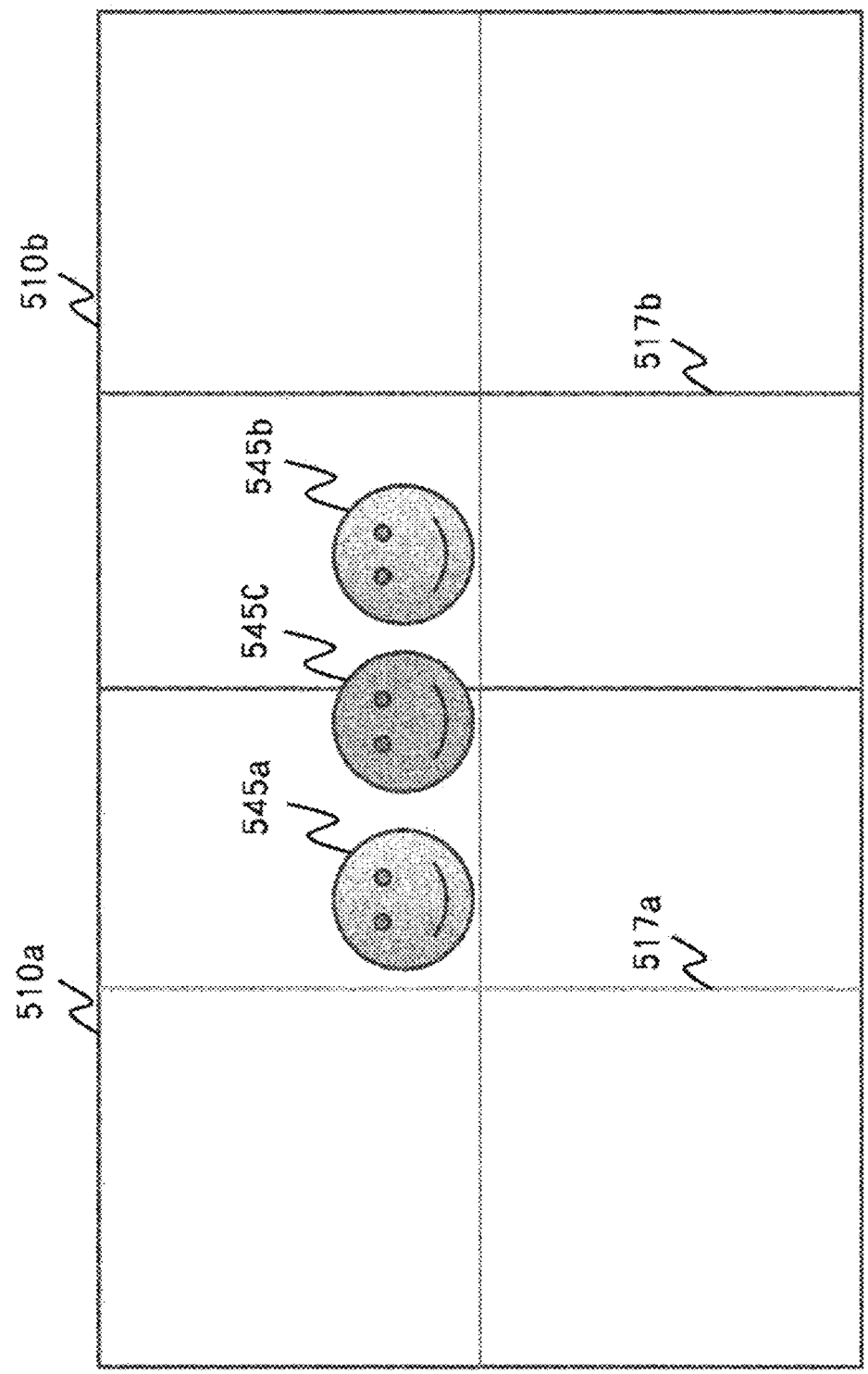
FIG. 23 is a view illustrating a state in which an image for the left eye and an image for the right eye are superimposed with each other at a central viewpoint in the embodiment 1.

FIG. 23 is a view illustrating a state in which an image 510a for the left eye and an image 510b for the right eye are superimposed on each other at the central viewpoint 560C. Reference symbol 517a denotes the center axis of the screen for the left eye, and reference symbol 517b denotes the center axis of the screen for the right eye. The image 510a for the left eye includes an object 545a for the left eye displayed on the screen for the left eye and the image 510b for the right eye includes an object 545b for the right eye displayed on the screen for the right eye, and the central image 545C is positioned between them.

Figure 24:
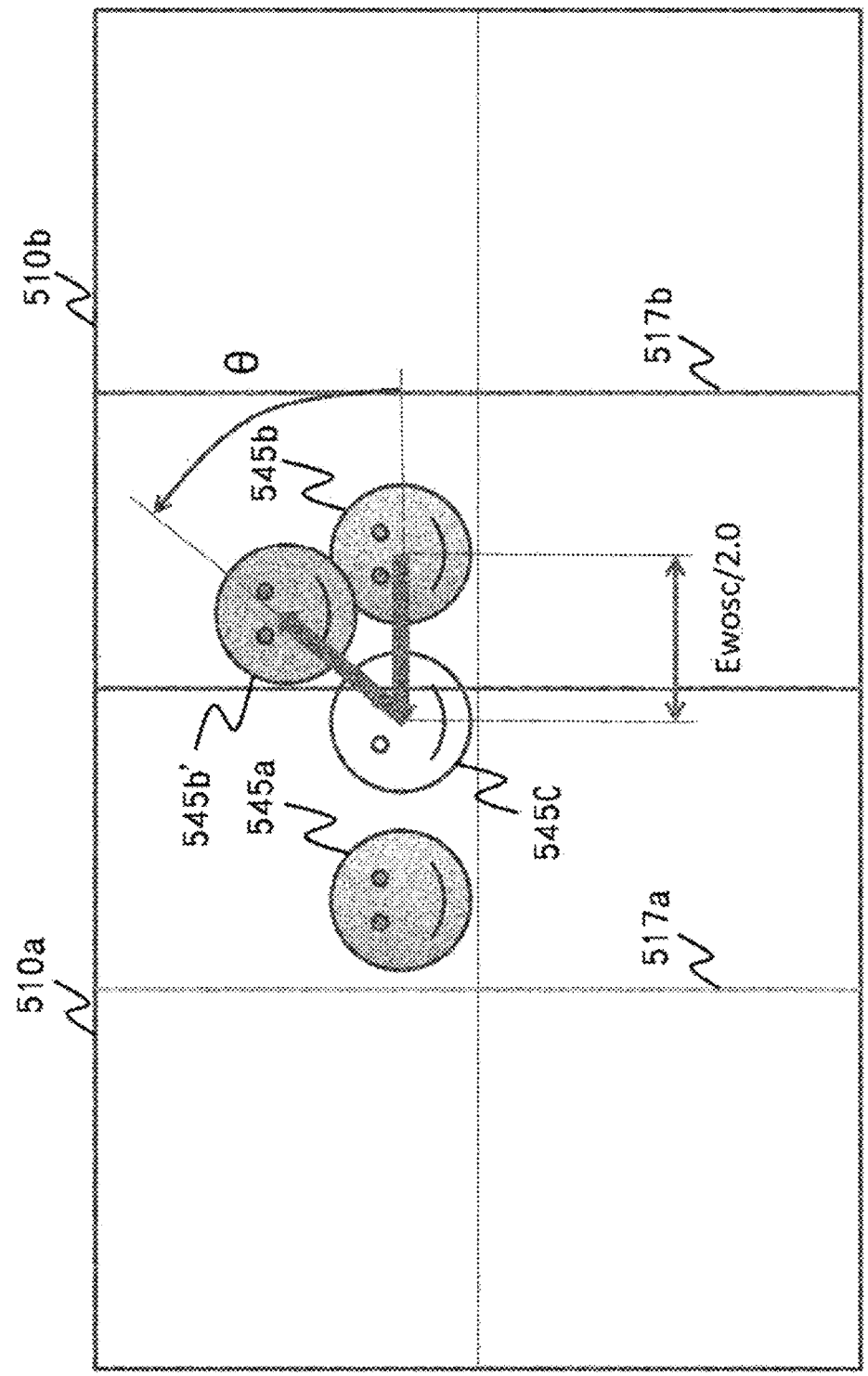
FIG. 24 is a view illustrating rotation correction of an image for the right eye in the embodiment 1.

FIG. 24 is a view illustrating rotation correction in the image 510b for the right eye. If both eyes rotate by an angle θ around the central viewpoint 560C, then on the image 510b for the right eye, the object 545b for the right eye is displaced to a position (reference symbol 545b') rotated by the angle θ around the central image 545C. On the image 510b for the right eye, a displacement amount dx in the X axis direction and a displacement amount dy in the Y axis direction of each pixel are determined.

If the coordinate values (integral values) of a given pixel of the right eye image are (irx, iry), then the pixel position of the central image 545C corresponding to the given pixel is (irx−Ewosc/2.0, iry). The correction amounts dx and dy in the X axis direction and the Y axis direction from the pixel position of the center image upon rotation by the angle θ are given as follows.

$$dx = Ewosc/2.0 * \cos(\theta)$$

$$dy = Ewosc/2.0 * \sin(\theta)$$

Consequently, the displacement amount dx in the X axis direction and the displacement amount dy in the Y direction of the given pixel of the right eye image are given as follows.

$$dx = -Ewosc/2.0 + Ewosc/2.0 * \cos(\theta)$$

$$dy = Ewosc/2.0 * \sin(\theta)$$

Using this, a vector that refers to the initial pixel from the pixel after the displacement, namely, an image reference vector, is given by (−dx, −dy).

Also in regard to the image for the left eye, the displacement amount dx in the X axis direction and the displacement amount dy in the Y direction of the given pixel of the image for the left eye are given as follows.

$$dx = Ewosc/2.0 - Ewosc/2.0 * \cos(\theta)$$

$$dy = -Ewosc/2.0 * \sin(\theta)$$

Attention is to be paid that the sign is opposite to that of the displacement mounts of the image for the right eye. A vector that refers to the initial pixel from the pixel after the displacement on the image for the left eye, namely, an image reference vector, is given by (−dx, −dy).

FIG. 25 is a flow chart more particularly depicting a processing procedure by the original image operation unit 254 for generating an image reference vector map as an acquisition process of a correspondence relationship of pixels at S12 of FIG. 7. As a process at a preceding stage, data of an original image and a parallax value image are input and an amount of movement and an angle of rotation of the viewpoint of the user are acquired already (S32). The original image operation unit 254 calculates a displacement vector (dx, dy) of each pixel from a parallax value of each pixel of the original image and the amount of movement and the angle of rotation of the viewpoint (S34).

Then, on the basis of the displacement (dx, dy) of each pixel of the original image, coordinate values (px, py) of a start point P with respect to a target pixel T (itx, ity) in the inside of a triangle having its vertexes at the pixels after the displacement (S36). Further, a vector (px−itx, py−ity) from the target pixel T (itx, ity) to the start point P (px, py) is calculated as an image reference vector of the target pixel T (itx, ity) (S38). By determining an image reference vector at steps S36 and S38 for all target pixels and setting them in an associated relationship with the pixels, an image reference vector map is generated (S40).

FIG. 26 is a flow chart particularly depicting a processing procedure by the display image generation unit 268 for mapping an original image on a viewscreen at S14 of FIG. 7. The display image generation unit 268 first generates texture coordinates (tu, tv) to be mapped to a point (tx, ty) on the viewscreen (S42). This establishes texels in a map. Then, the display image generation unit 268 filters the image reference vectors on the basis of the texture coordinates designated at step S42 using the image reference vector map as a texture (S44). In other words, (S44) involves sampling texels from the map and filtering image reference vectors. In particular, the display image generation unit 268 samples image reference vectors from within the image reference vector map and filters the image reference vectors by extended bilinear interpolation hereinafter described to determine an image reference vector at the texture coordinates.

On the basis of texture coordinates (u, v) of a reference destination obtained by adding the image reference vector determined in such a manner as described above to the texture coordinates (tu, tv), the pixel values of the original image are filtered to generate color values of the original image to be mapped to the pixels on the viewscreen (S46). By generating color values to be mapped by the procedure of steps S42, S44, and S46 for all pixels on the viewscreen, a display image in which the original image is mapped to the viewscreen is generated (S48).

In this manner, in the present embodiment, when an original image is to be texture mapped to a viewscreen, it is regarded that an image reference vector map exists at the position of the original image and the map is referred to as a texture to filter the stored image reference vectors. Further, the values of pixels of the reference destination pointed to by the filtered image reference vectors from among the pixels of the original image are filtered by bilinearly interpolating surrounding pixel values and mapped to the viewscreen. Since the initial stereo image is directly referred to with the filtered image reference vectors, filtering of pixels is performed only once.

On the other hand, in the case where a corrected image itself in which pixel values are displaced in response to movement of a viewpoint is to be generated in place of generating an image reference vector map, since filtering for pixels is performed twice by a process for generating a corrected image from an original image and another process of texture mapping from the corrected image to a viewscreen, the picture quality is liable to be degraded. By reducing the number of times of filtering to once utilizing an image reference vector map, degradation of the picture quality can be prevented.

FIG. 27 is a view illustrating a relationship among a display image, an image reference vector map, and an original image. At the position of an original image 600 depicted in (b), an image reference vector map 610 depicted in (a) exists. As depicted in (a), pixel lattices of the viewscreen configuring a display image 620 are displayed from pixel lattices of the original image 600.

As depicted in (a), an image reference vector is sampled from the image reference vector map 610 at the central point S of a pixel of the display image 620. The sampling point S at the center of the pixel in the display image 620 is designated by texture coordinates (tu, tv) on the image reference vector map 610. The image reference vector at the sampling point S is determined as indicated by an arrow mark of (a) by filtering image reference vectors of surrounding valid pixels stored in the image reference vector map 610 by extended bilinear interpolation hereinafter described.

Then, as depicted in (b), the pixel value of the pixel P of a reference destination pointed to by the image reference vector of the sampling point S is determined from the original image 600 by filtering by ordinary bilinear interpolation.

Figure 28:
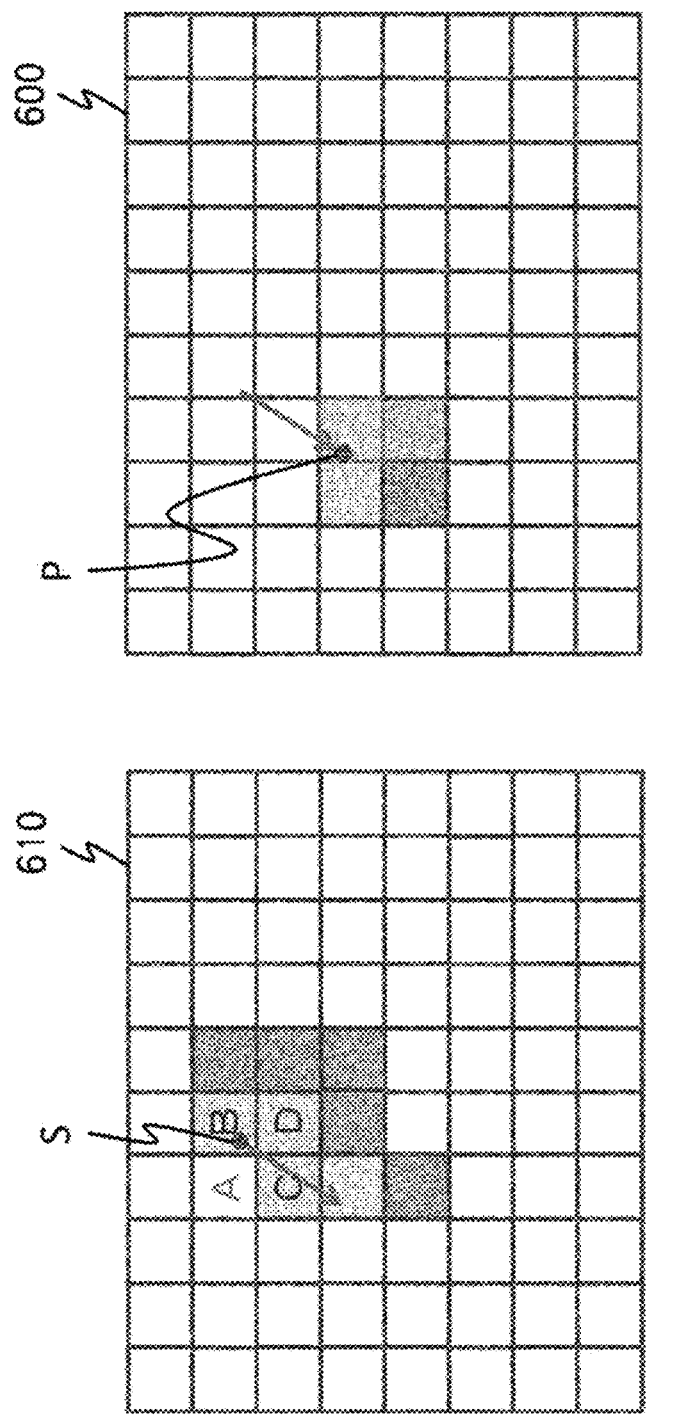
FIG. 28 is a view illustrating a method of sampling an image reference vector map in the embodiment 1.

FIG. 28 is a view illustrating a method for sampling an image reference vector map. The point S depicted in (a) is sampled using an image reference vector map 610 as a texture at the position of the original image to determine an image reference vector at the point S. It is assumed that, although image reference vectors of three pixels B, C, and D from among four pixels A, B, C, and D around the point S exist, no image reference vector exists at the pixel A. In this case, the image reference vector of the point S (indicated by an arrow mark in the figure) is determined by linearly interpolating image reference vectors of the three pixels B, C, and D in which an image reference vector exists. Since an image reference vector map sometimes includes an invalid pixel in this manner, a process that is different from ordinary bilinear interpolation is required as hereinafter described.

The reference destination pointed to by the image reference vector at the point S obtained in (a) is the point P of the original image as depicted in (b). The original image is sampled and subjected to an alpha blend, an alpha test or the like, and then rendering of the point P is performed to determine a color value at the point P. This sampling is performed by interpolating the pixel values of four pixels around the point P by ordinary bilinear interpolation. In this manner, in the present embodiment, image reference vectors stored in an image reference vector map of (a) are filtered considering that the image reference vector map of (a) exists at the position of the original image of (b), and the original image of (b) is referred to with the filtered image reference vectors to filter the pixels.

Since an image reference vector map sometimes includes an invalid pixel at which an image reference vector does not exist, it is necessary to perform texture mapping, which refers to the image reference vector map, for separate cases in the following manner.

Figure 29:
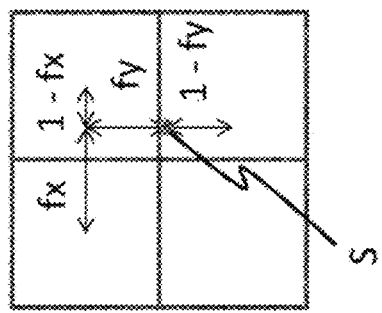
FIG. 29 is a view illustrating filtering in the case where all four pixels around a designated texture coordinate of an image reference vector map are valid in the embodiment 1.

FIG. 29 is a view illustrating filtering in the case where all of four pixels around designated texture coordinates of an image reference vector map are valid. As depicted in (a), in the four pixels, valid image reference vectors V00, V10, V01, and V11 are stored. As depicted in (b), in the case where the point S (tu, tv) of the designated sampling position is, in the horizontal direction, at a position that internally divides two pixels in the horizontal direction at image reference vector fx:(1−fx) and is, in the vertical direction, at a position that internally divides two pixels in the vertical direction at fy:(1−fy), the image reference vectors of the four pixels may be bilinearly interpolated by the following expression to determine an image reference vector F at the point S.

$$F = V01*(1-fx)*fy + V11*fx*fy + V00*(1-fx)*(1-fy) + V10*fx*(1-fx)$$

Figure 30:
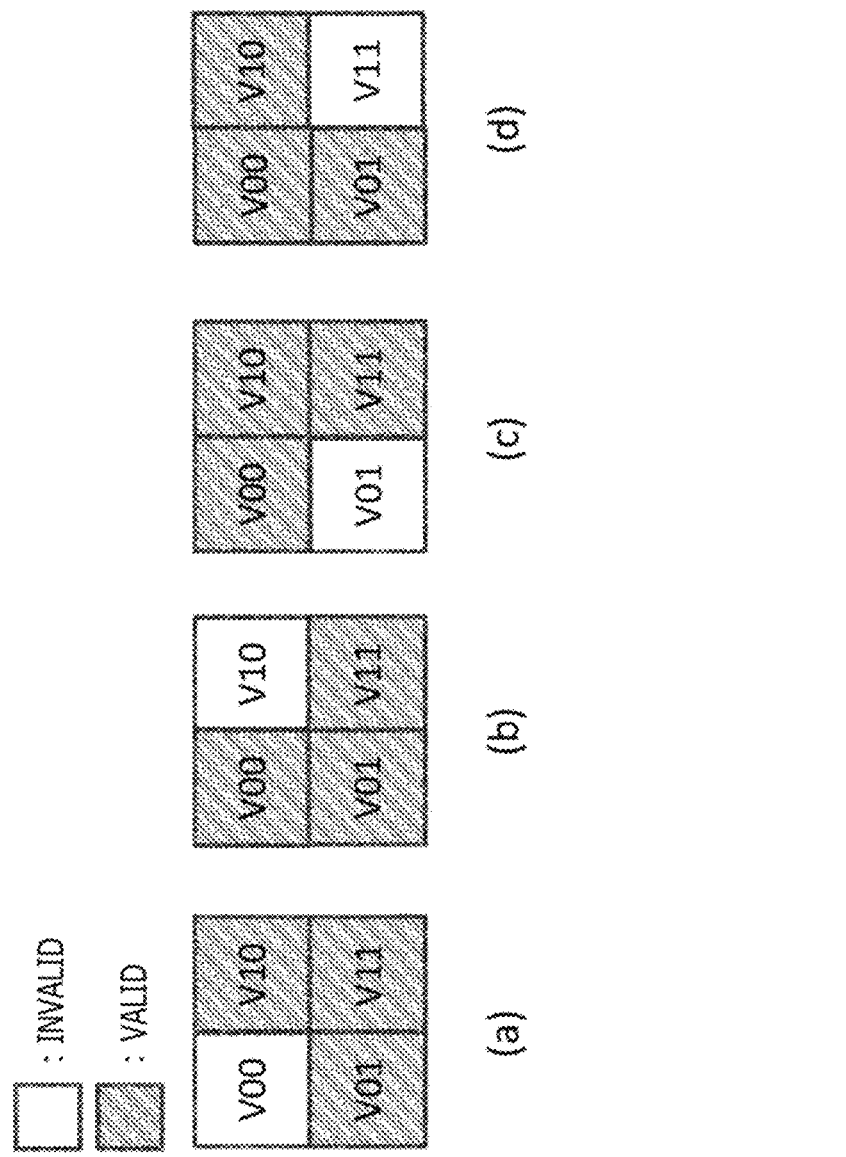
FIG. 30 is a view illustrating filtering in the case where three pixels from among four pixels around a designated texture coordinate of an image reference vector map are valid in the embodiment 1.

FIG. 30 is a view illustrating filtering in the case where, from among four pixels around a designated texture coordinate of an image reference vector map, three pixels are valid. In the case where the left upper pixel is invalid as in (a), the image reference vector V00 of the invalid left upper pixel is determined by the following expression from the image reference vectors of the remaining three pixels.

$$V00=(V10-V11)+(V01-V11)+V11$$

In the case where the right upper pixel is invalid as in (b), the image reference vector V10 of the invalid right upper pixel is determined by the following expression from the image reference vectors of the remaining three pixels.

$$V10=(V00-V01)+(V11-V01)+V01$$

In the case where the left lower pixel is invalid as in (c), the image reference vector V01 of the invalid left lower pixel is determined by the following expression from the image reference vectors of the remaining three pixels.

$$V01=(V00-V10)+(V11-V10)+V10$$

In the case where the right lower pixel is invalid as in (d), the image reference vector V11 of the invalid right lower pixel is determined by the following expression from the image reference vectors of the remaining three pixels.

$$V11=(V10-V00)+(V01-V00)+V00$$

If an image reference vector of one invalid pixel is generated from image reference vectors of the valid three pixels and the image reference vectors of the four pixels are used to perform bilinear interpolation in this manner, then an image reference vector F at the point S of the sampling position can be determined with high accuracy. If this interpolation process is not performed, for example, that a valid image reference vector does not exist in a certain pixel and (inv_off_x, inv_off y) have initial values (0.0, 0.0) signifies that pixels at the same (tu, tv) coordinates are sampled. Therefore, if this vector (0.0, 0.0) is used in bilinear filtering of image reference vectors, then since a displacement vector of a different pixel is pulled to the initial position of the pixel, as a result, a reference vector to a halfway pixel having no relation is generated, and a color value having no relation appears in a final image. In the present embodiment, this problem is solved by generating an image reference vector of an invalid one pixel from image reference vectors of three valid pixels.

In the case where the number of valid pixels is two or less, drawing by bilinear sampling of an image reference vector map is not performed. In this case, an image may be drawn, for example, by performing point sampling of the image reference vector map, performing reference to the original image only with regard to valid pixels and performing bilinear interpolation of a color value and an alpha value of the pixels.

In the case where an image reference vector of an invalid pixel is determined by interpolation, information that the image reference vector of the pixel is invalid is not reflected in calculation of interpolation of the image reference vector. However, since, in the first place, the information of the invalidity is reflection of information of the validity of an alpha value or a parallax value of input original image data on the image reference vector, as a result, the information is reflected when the original pixel data is referred to from the interpolated image reference vector. In particular, for example, in the case where bilinear interpolation of the original pixel data is performed, by performing, also in regard to the alpha value, bilinear interpolation and performing an alpha test or an alpha blend using the obtained alpha value, the color value of an invalid pixel is suppressed from being reflected on the display image.

In the case where an image reference vector is determined by point sampling, if a point at which the image reference vector changes suddenly exists in the inside of the image, then a flicker of a pixel sometimes occurs when the viewpoint is moved smoothly. Further, if an image reference vector is determined by ordinary bilinear sampling, then although a flicker of a point in the inside is reduced, a flicker is liable to occur at a boundary portion of an image at which an invalid point is liable to be referred to. In contrast, by performing extended bilinear sampling that utilizes validity/invalidity information of a pixel as described above, generation of an image that is free from a flicker not only in the inside of an image but also at a boundary portion becomes possible.

Filtering of Parallax Value

Here, filtering of a parallax value is described. In the case where an original image is generated by rendering of three-dimensional model data, it is possible to accurately determine a parallax value image for each pixel, but in the case where an original image obtained by image pickup of a natural picture is analyzed to determine a parallax value image, frequently the parallax value image cannot be obtained with high accuracy.

In such a case as just described, by applying filtering parallax values, it becomes possible to perform texture mapping of small breakdown. In the present embodiment, since the displacement amount of a pixel based on a variation amount from a viewpoint upon acquisition of an original image is used for drawing of a display image, if the actual viewpoint is near to that upon acquisition of the original image, then the change of the display image can be suppressed to the minimum. In other words, even if the parallax value in a unit of a pixel is not accurate, influence upon the display image can be suppressed.

As regard a parallax value, filtering taking validity/invalidity into consideration is required. For example, filtering is performed with a filter kernel of such weights as given below is performed.

$$\text{Weights:} \begin{matrix} 1 & 2 & 1 \\ 2 & 4 & 2 \\ 1 & 2 & 1 \end{matrix}$$

Here, filtering is performed by the following formulae:

new parallax value=pixelSum/weightSum where pixelSum=Σparallax value×weight weightSum=Σweight It is to be noted that Σ is the sum regarding valid pixels.

Further, by applying filtering to parallax values, it is possible to reduce case separation of calculation of an image reference vector. In this case, for case separation of parallax value calculation, not an alpha value but a parallax value presence/absence flag is used.

In the case where a parallax value exists even at one pixel among nine pixels upon filtering described above, it is decided that the parallax value of the pixel is valid. This expands the region in which a parallax value exists one by one pixel on the whole. Consequently, upon filtering of image reference vectors, only it is necessary to perform calculation in the case where an image reference vector exists at all of four pixels, namely, ordinary bilinear filtering.

It is to be noted that, since drawing of a display image is controlled by the alpha value of the pixels of the original image, even if the setting range for an image reference vector is expanded by one pixel, this does not have an influence on the display image. Also in the case where image reference vectors are to be point sampled, occurrence of a flicker in the inside of the image can be suppressed by applying a filter to the initial parallax values in advance.

Approximation of Parallax Value

Another merit in use of an image reference vector map for movement of a viewpoint is that it is possible to perform correction of an original image using an image reference vector generated from data of parallax values having no degree of accuracy of pixel units. A correction process in response to a viewpoint in the present embodiment has a characteristic that, in the case where display is performed with a viewpoint close to the viewpoint upon acquisition of the original image, the displayed image becomes close to the original image. Therefore, even if a parallax value does not faithfully reflect distance information of the original image, in many cases, image display of sufficient quality is possible.

Therefore, not by preparing parallax values in a unit of a pixel and calculating an image reference vector map in a unit of a pixel but by preparing approximate values to parallax values in a unit of a block configured from a plurality of pixels, a unit of a region in which a depth value has a similar level, a unit of an object or the like, also an image reference vector may be determined in a unit of a block, a unit of a region, a unit of an object or the like. Since, even with this, an original image to be referred to by an image reference vector is sampled with pixel accuracy, the picture quality of the display image does not degrade.

A further merit in use of an approximate value to a parallax value is that, in the case where pictures in original images are similar to each other and do not have distortion by movement of a viewpoint, it is possible to apply the same image reference vector map to different images. Also it is possible to calculate an image reference vector map with a lower resolution than that of the original image, smoothen the image reference vector map by a filter and then apply the image reference vector or to perform approximation in which a map of a preceding frame is used in the case where the amount of change of the viewpoint is small between successive frames of a video or the like.

Cross Reference of Original Images

Now, a calculation technique of an image reference vector in the case where one of left and right image reference vectors refers to the original image of the other image reference vector is described. As described hereinabove, left and right original images can include a portion that becomes a blind spot and does not appear as a picture upon acquisition of the original image but becomes viewable by movement of a viewpoint. The original image operation unit 254 generates, for pixels that are to represent such a picture as described above, an image reference vector that refers to the other original image such that a portion that has been a blind spot can be drawn with higher accuracy. Such a technology as just described is called cross reference to a parallax image.

Figure 31:
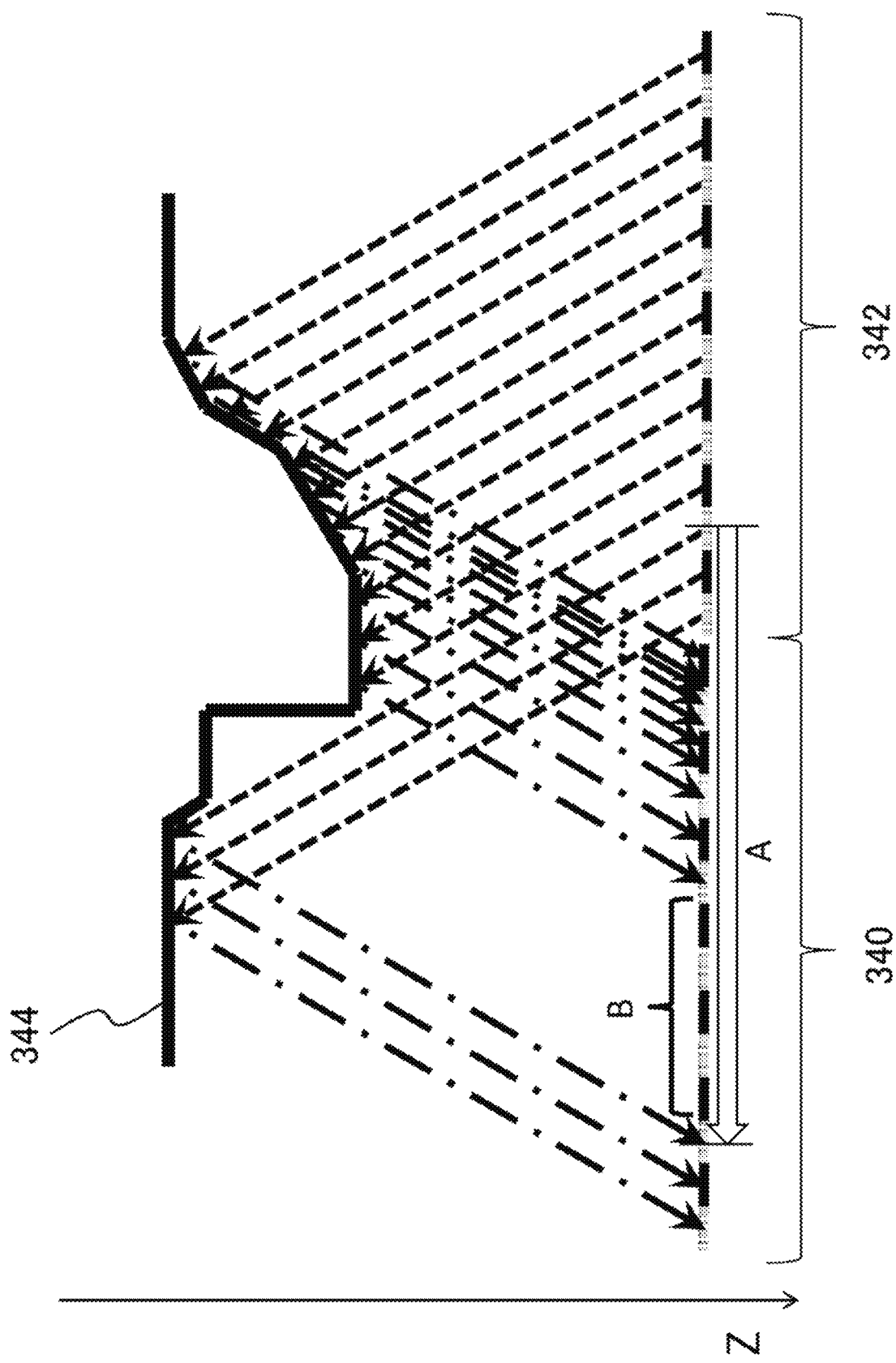
FIG. 31 is a view illustrating pixels of an original image for the left eye existing in a blind spot region from the right eye in the embodiment 1.

FIG. 31 is a view illustrating pixels of an original image for the left eye, which are in a blind spot region from the right eye. FIG. 31 schematically depicts a state in which a three-dimensional object 344 and left and right original images 340 and 342 representing the three-dimensional object 344 are watched over. A pixel for the left eye at a position offset (for example, an arrow mark A) from a position of each pixel for the right eye by an amount equal to its parallax value is a pixel of the original image 340 for the left eye corresponding to the pixel of the original image 342 for the right eye. Here, pixels in the region B of the original image 340 for the left eye represent a blind spot to the right eye upon original image acquisition because corresponding pixels of the original image 342 for the right eye do not exist. Accordingly, the pixels in the region B of the original image 340 for the left eye can be used for drawing of the blind spot region.

Figure 32:
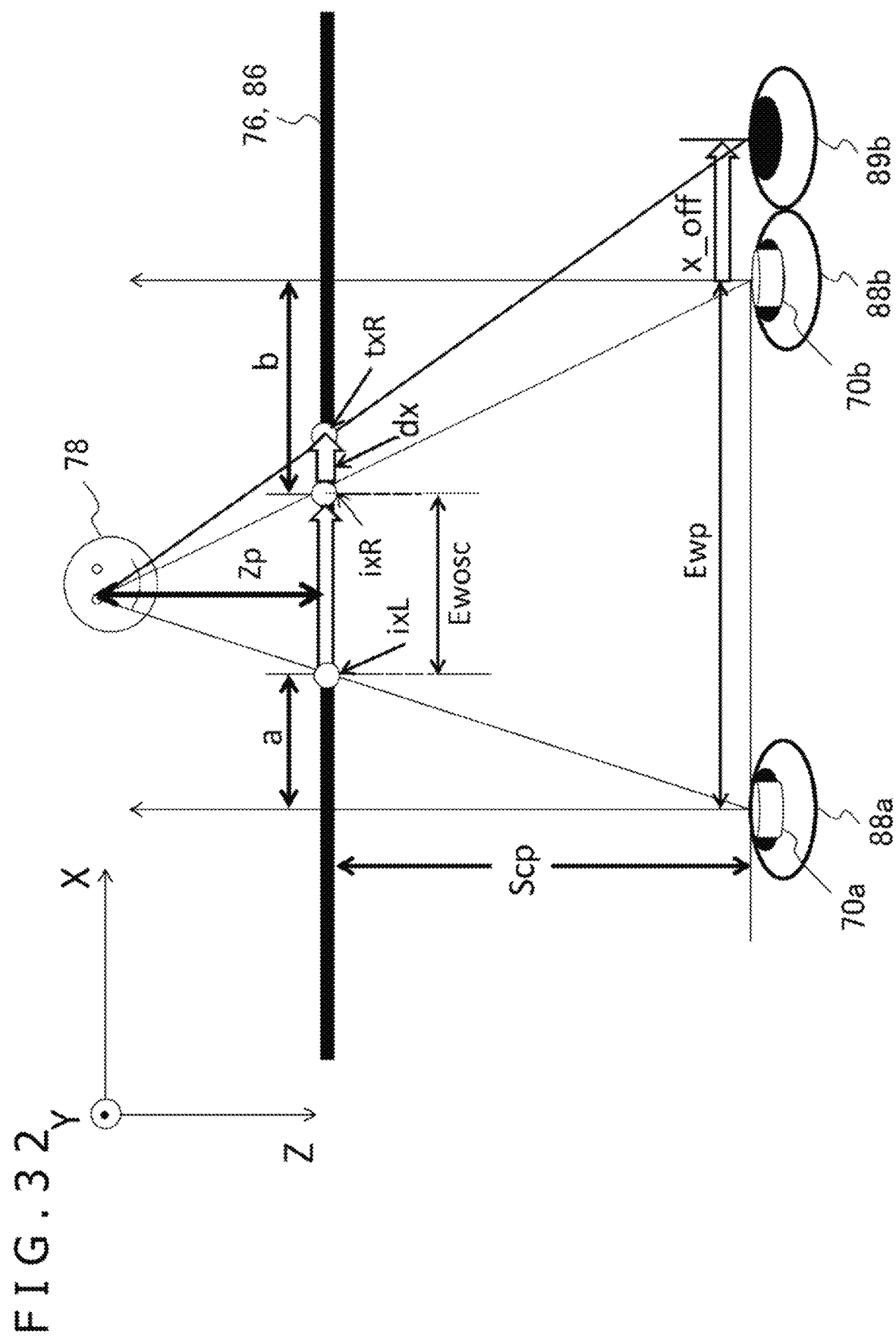
FIG. 32 is a view illustrating a relationship between an amount of movement of a viewpoint and an amount of movement of a pixel when an original image for the left eye is referred to in an image reference vector map for the right eye in the embodiment 1.

FIG. 32 is a view illustrating a relationship between the amount of movement of a viewpoint and the amount of movement of a pixel when an original image for the left eye is referred to by the image reference vector map for the right eye. It is to be noted that, while the schematic view of FIG. 31 depicts a view in which a pixel position of an original image for the right eye and a pixel position of an original image for the left eye are spaced from each other by a distance corresponding to a parallax value, in an actual formula, calculation is performed on such a coordination system as depicted in FIG. 32 taking the difference Ewp between the left and right viewpoints when original images are disposed on viewing frustums of a virtual space into consideration.

As depicted in FIG. 32, the position ixR of the right eye pixel and the position ixL of the left eye pixel corresponding to the right eye pixel are spaced from each other by Ewosc=Ewd−Dp described hereinabove. However, attention is to be paid that the value of Ewosc in the subpixel accuracy is different between a case in which the right eye pixel is taken as a reference and another case in which the left eye pixel is taken as a reference. This is because, although the value of Ewp is equal between the left and the right, the parallax value is different depending upon the eye taken as the reference. Although the way of thinking upon calculation is similar to that depicted in FIG. 10, this is different in that the position ixL on the image for the left eye corresponding to ixR that is the original start point becomes a start point. In other words, it is necessary to take the displacement in Ewosc between the left and right corresponding points into consideration.

In the case where the viewpoint moves by x_off similarly as in FIG. 10, the correction amount dx in the X axis direction of the position ixR on the original image for the right eye is $$dx = Zp * x\_off/(Scp+Zp)$$

as described hereinabove. Here, the positions ixL and ixR corresponding to each other on the original image for the left eye are spaced from each other by Ewosc, the position txR after correction on the image for the right eye in the case where the position ixL on the original image for the left eye is a start point is determined in the following manner.

$$txR = ixL + \text{Ewosc} + dx$$

Also in regard to movement of the viewpoint of the left eye, the position can be calculated similarly. In particular, the position txL after correction on the image for the left eye in the case where the position ixR on the original image for the right eye is a start point is determined in the following manner.

$$txL = ixR - \text{Ewosc} + dx$$

The movement of the position in the Y axis direction by movement of the viewpoint is similar to that in the case where cross reference is not performed.

In the case where the viewpoint rotates by an angle θ, the correction amounts dx and dy in the X axis direction and the Y axis direction of the position ixR on the original image for the right eye are given respectively as $$dx = Ewosc/2.0 * \cos(\theta)$$

$$dy = Ewosc/2.0 * \sin(\theta).$$

In the case where the positions ixL and iyL in the X axis direction and the Y axis direction on the original image for the left eye are determined as a start point, since the amount of movement to the position of a central image is Ewosc/2, the positions txR and tyR in the X axis direction and the Y axis direction after correction on the image for the right eye are determined respectively by $$txR = ixL + Ewosc/2.0 + dx$$

$$tyR = iyL + dy.$$

Similar calculation is performed also when the image reference vector map for the left eye refers to the original image for the right eye. By such calculations, an image reference vector can be set to each pixel of the image reference vector map similarly as in the case where cross reference is not performed.

It is to be noted that, when an image reference vector map for one of viewpoints is to be generated, control is performed such that setting of image reference vectors that refer to an original image from a same viewpoint is completed in advance and the image reference vectors are not overwritten with image reference vectors that refer to the original image of the other viewpoint by cross reference. This is because it is intended to reflect information of the luminance, which is originally had by the individual original images and relies upon the position of the viewpoint, correctly as far as possible. However, as hereinafter described, at a location at which the distance between pixels of an original image is extended by movement of the viewpoint, reference to the original image from the other viewpoint sometimes allows more accurate representation. In this case, a credibility degree decision process hereinafter described may be introduced or the like such that a vector that refers to the original image from the other viewpoint may be written preferentially.

It is to be noted that it is possible to improve the efficiency of processing by utilizing left and right parallax value images to specify in advance pixels that become a blind spot on one of the left and right original images and can refer to the other original image. Each parallax value image has parallax values regarding a portion of the object 344, which is viewed on an original image. For example, in FIG. 31, each pixel of an original image 342 for the right eye represents such a position on the object 344 as indicated at the end of a broken line arrow mark, and each of pixels of a corresponding parallax value image indicates at which position the pixel appears on the original image 340 for the left eye from among the pixels on the object 344 by a difference on an image plane as indicated by an arrow mark A.

Accordingly, the region B of the original image for the left eye, which does not correspond to any of the end points of the parallaxes held by the parallax value image for the right eye represents a portion of the object that is a blind spot from the right viewpoint but is visible from the left viewpoint. In this case, it is possible to set the image reference vectors of the right eye so as to refer to the pixels in the region B of the original image 340 for the left eye. Therefore, it is possible to create data indicative of the presence of the region B in advance for the image plane.

This is called cross reference flag. The cross reference flag representative of the region B in the original image 340 for the left eye can be created in the following manner. In particular, in a pixel sequence on the same horizontal line, the position ixL on the original image 340 corresponding to the position ixR on the original image 342 for the right eye is given by $$ixL = ixR - Ewosc$$

as described hereinabove.

It is to be noted that the parallax Dp used for calculation of Ewosc is a value retained by the parallax value image for the right eye given to a pixel of the original image for the right eye. Here, ixR is the center of a pixel, and ixL is not necessarily the center of a pixel. Therefore, ixL is rounded to determine the nearest pixel center, and the pixel centered at the pixel center is specified. The pixel obtained in this manner is a pixel that becomes an end point of the parallax in FIG. 31, and the other pixels are pixels that can be referred to for a display image for the right eye like the region B.

Accordingly, information of 1 bit is provided such that the pixels can be distinguished from each other. By acquiring such data for the left and right original image planes, the left and right cross reference flags can be generated. For example, if the flag of "1" is given to a pixel that becomes an end point of a parallax, then an image reference vector on a map of a different viewpoint can be set by setting a pixel that does not have the flag as a reference destination.

Figure 33:
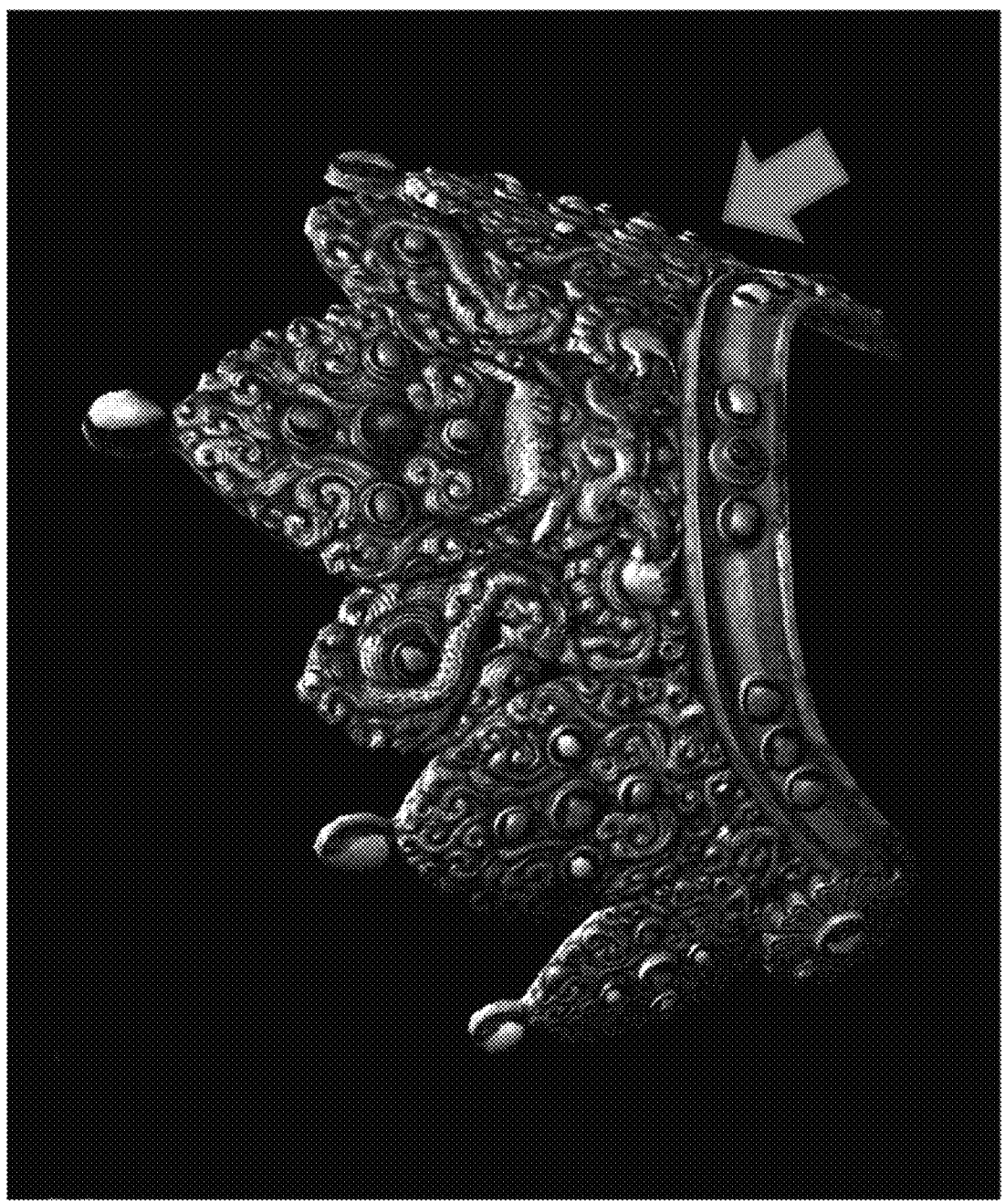
FIG. 33 is a view depicting an example of an original image in the embodiment 1.
Figure 34:
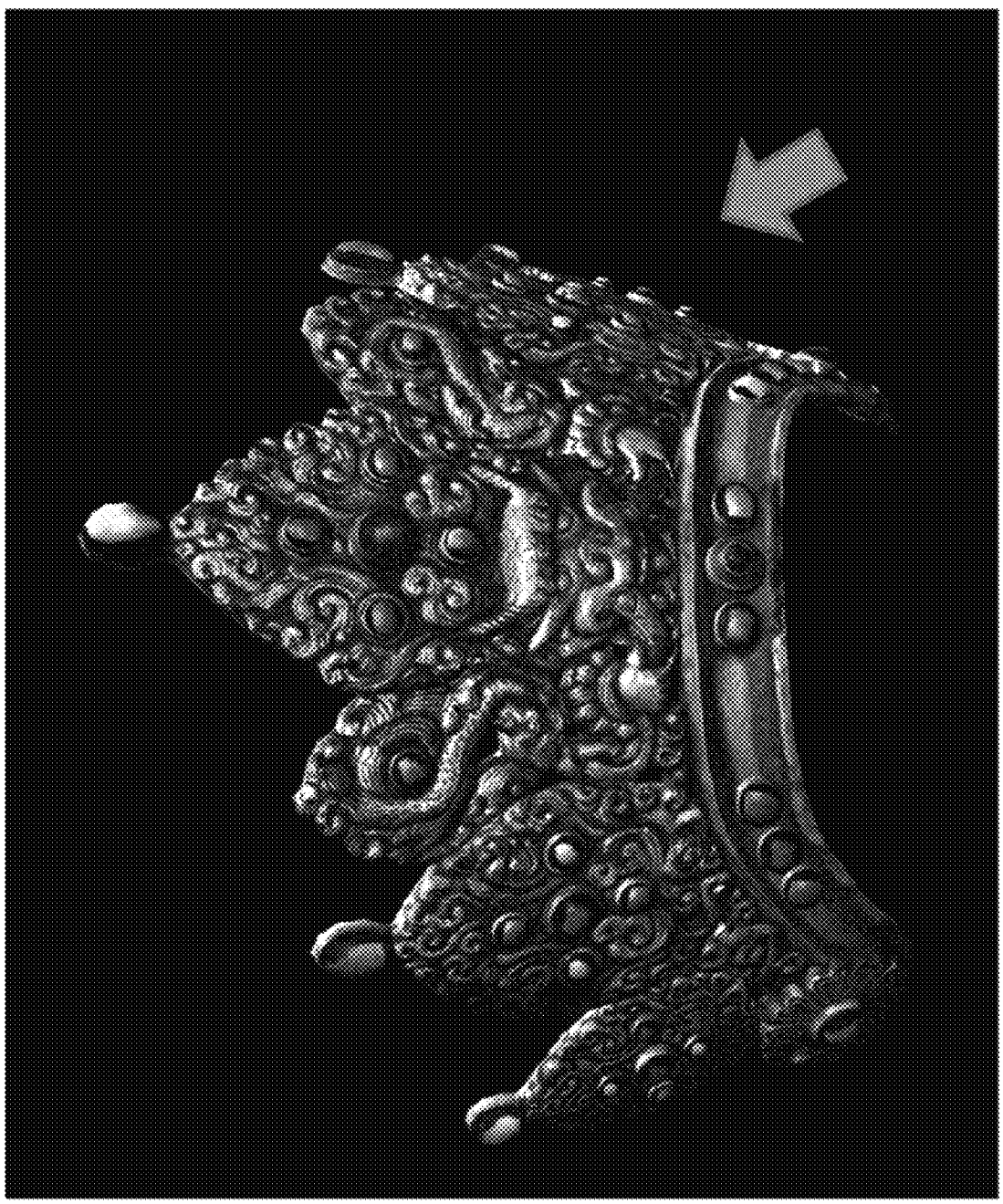
FIG. 34 is a view depicting another example of an original image in the embodiment 1.

FIGS. 33 and 34 depict an example of original images. In this example, a crown is displayed. FIG. 33 is an original image for the left eye, and FIG. 34 is an original image for the right eye. A portion that is a blind spot in the original image for the left eye and is indicated by an arrow mark is visible on the original image for the right eye.

Figure 35:
FIG. 35 is a view depicting a cross reference flag for referring to an original image for the right eye on a right eye image in a display image generation process for the left eye in the embodiment 1.

FIG. 35 is a view depicting, on a right eye image, a cross reference flag that refers to an original image for the right eye in the display image generation process for the left eye. In particular, pixels whose cross reference flag (iCL2R) is 1 and pixels whose cross reference flag (iCL2R) is 0 are displayed in different colors on the original image for the right eye of FIG. 34. The pixels whose cross reference flag is 0, namely, the pixels of the original image for the right eye that are not made an end point of a parallax on the original image for the left eye, are distributed linearly on a left side face of protruding and recessed of the surface of the crown (right side of the screen image). Further, at a portion indicated by an arrow mark, pixels exist also in a thick band shape. Those pixels make a blind spot on the original image for the left eye.

Figure 36:
FIG. 36 is a view depicting a cross reference flag for referring to an original image for the left eye on a left eye image in a display image generation process for the right eye in the embodiment 1.

FIG. 36 is a view depicting, on the left eye image, a cross reference flag that refers to the original image for the left eye in the display image generation process for the right eye. In particular, pixels whose cross reference flag (iCL2L) is 1 and pixels whose cross reference flag (iCL2L) is 0 are displayed in different colors on the original image for the left eye of FIG. 33. The pixels whose cross reference flag is 0, namely, the pixels of the original image for the left eye that are not made an end point of a parallax on the original image for the right eye, are distributed linearly on a right side face of protruding and recessed of the surface of the crown (left side of the screen image). Further, at a portion indicated by an arrow mark, pixels exist also in a thick band shape. Those pixels make a blind spot on the original image for the right eye.

Pixels of the original image for the right eye, whose cross reference flag depicted in FIG. 35 is 1, can be utilized for drawing of a display image for the left eye in order to compensate for a blind spot region of the original image for the left eye. Pixels of the original image for the left eye, whose cross reference flag depicted in FIG. 36 is 1, can be utilized for drawing of a display image for the right eye in order to compensate for a blind spot region of the original image for the right eye. However, the cross reference flag is a flag to the last for specifying candidates for a pixel that can become a reference destination of an image reference vector within the original image that becomes a reference destination in cross reference and does not become a criterion for deciding whether or not an image reference vector is to be actually set to a map.

As described hereinabove, in an image reference vector map for one of viewpoints, an image reference vector that performs cross reference is not written into a pixel in which an image reference vector whose reference destination is an original image from the same viewpoint is set already. However, in regard to a region in which the distance between pixels of an original image is extended significantly and from which it is considered that accurate corrected image data cannot be obtained, a credibility degree flag regarding the Z value can be introduced as a criterion for deciding whether or not an image reference vector that performs cross reference is to be set to a map.

Figure 37:
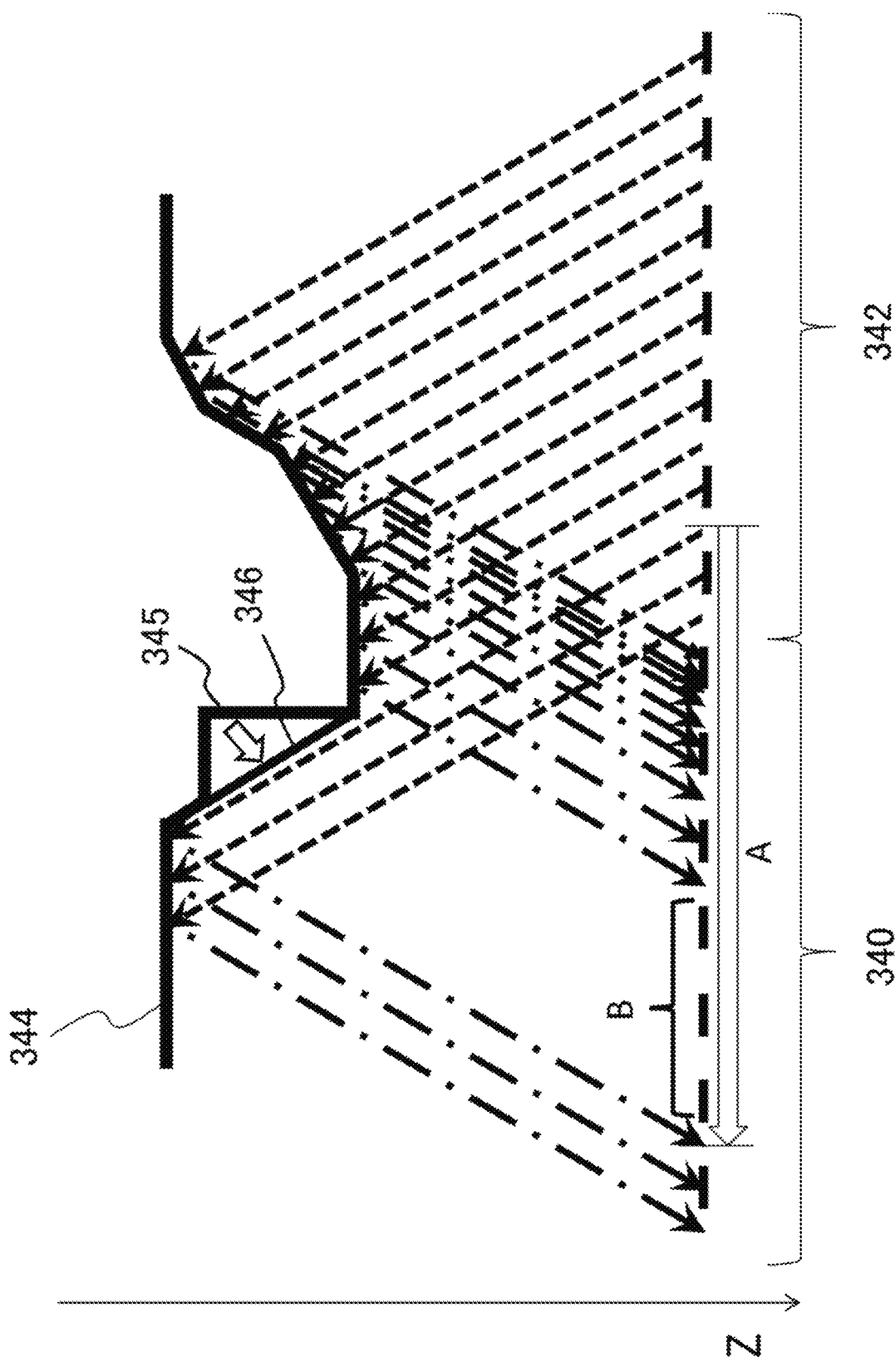
FIG. 37 is a view illustrating the necessity for setting a credibility degree flag to a Z buffer in the embodiment 1.

FIG. 37 is a view illustrating the necessity to set a credibility degree flag to a Z buffer. Since a Z value at a location that is a blind spot in an original image cannot be calculated accurately, it is necessary to perform interpolation using a Z value at a location visible on the original image. For example, in a three-dimensional object 344 of FIG. 37, a portion indicated by reference symbol 345 is a blind spot to the right eye. Since a Z value is interpolated for the blind spot region, it is estimated that the portion has, on data, such a shape as denoted by reference symbol 346. In this case, if the true shape of the object denoted by reference symbol 345 and the estimated shape denoted by reference symbol 346 are compared with each other, then the latter is positioned near to the viewpoint.

Therefore, even if pixels representative of the true shape of the object is obtained by cross reference, the pixels of the original image from the same viewpoint estimated by the interpolation take precedence by Z comparison and the effect of cross reference cannot be exhibited. In order to avoid this, for example, a bit of the credibility degree flag is set for the accurate Z value corresponding to a pixel of the original image (for example, the value 1 is set), but the credibility degree flag is not set for a Z value obtained by the interpolation (for example, an initial value 0 is maintained).

Consequently, in the image reference vector map, a pixel having an interpolated Z value can be specified on the basis of the credibility degree flag. Then, in the case where a pixel value having an accurate Z value can be referred to by cross reference for the pixel, even if the pixel is a pixel for which an image reference vector that refers to the original image from a viewpoint same as the viewpoint of the map is set already, since the credibility degree flag is not set, an image reference vector for cross reference is set without performing Z comparison. Consequently, it becomes possible to obtain a more accurate corrected image.

An example of determination of a credibility degree flag is described. In the case where three valid points (ix, iy), (ix, iy+1), and (ix+1, iy) are displaced to (tx0, ty0), (tx1, ty1), and (tx2, ty2) by movement of the viewpoint, respectively, the maximum value of the x coordinates txi (i=0, 1, 2) of the three points after the displacement is represented by tx_max, the minimum value by tx_min, the maximum value of the y coordinates tyi (i=0, 1, 2) of the three points after the displacement by ty_max, and the minimum value by ty_min. Then, from the degrees by which the three points after the displacement are extended, the credibility degree flag is set in the following manner.

In the case where $(tx\_max - tx\_min) > 1.5 \text{(pixels)}$ or $(ty\_max - ty\_min) > 1.5 \text{ (pixels)}$, the credibility degree flag=0 in any other case, the credibility degree flag=1

In this manner, in the case where the degree by which the three points after displacement are extended is higher than a predetermined threshold value, the credibility degree is low. However, if the degree by which the three points after displacement are extended is lower than the predetermined threshold value, then it is decided that the credibility degree is high and the credibility degree flag is set to the Z value of the corresponding pixel. That the threshold value for the reference for the credibility degree is set to 1.5 pixels is an example, and the threshold value may be changed in response to the picture quality.

Meanwhile, in the case where only the two points of (ix, iy) and (ix, iy+1) are valid and they are displaced to (tx0, ty0) and (tx1, ty1) by movement of the viewpoint, respectively, the maximum value of the x coordinates txi (i=0, 1) of the two points after the displacement is represented by tx_max, the minimum value by tx_min, the maximum value of the y coordinates tyi (i=0, 1) of the two points after the displacement by ty_max, and the minimum value by ty_min. Then, from the degrees by which the two points after the displacement are extended, the credibility degree flag is set in the following manner.

In the case where $(tx\_max - tx\_min) > 1.5 \text{ (pixels)}$ or $(ty\_max - ty\_min) > 1.5 \text{ (pixels)}$, the credibility degree flag=0 in any other case, the credibility degree flag=1

In the case where only one point of the original image is valid, also the number of pixels after the displacement is one and the pixel is not extended, and therefore, the credibility degree flag is handled as 1.

Figure 38:
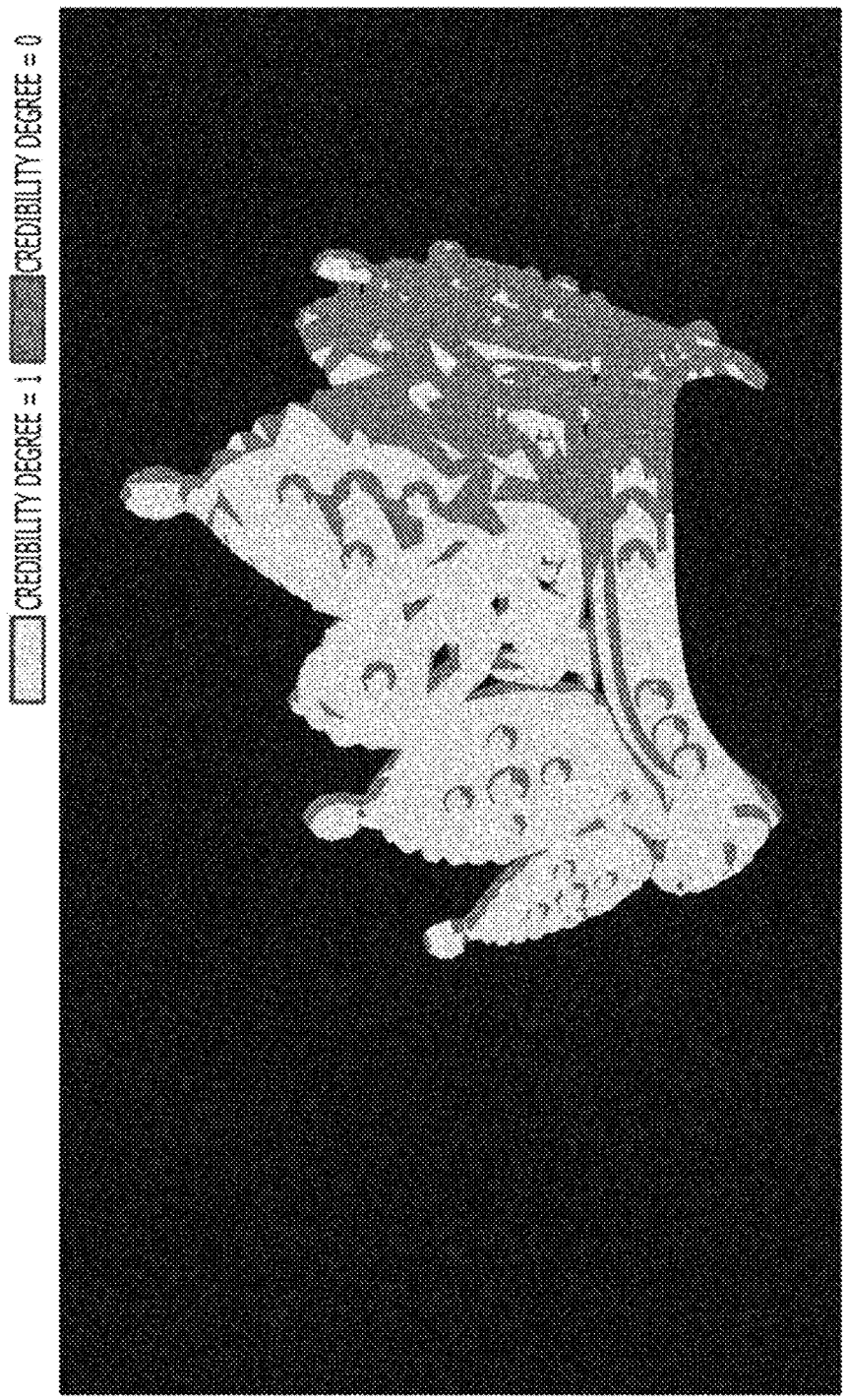
FIG. 38 is a view depicting a credibility degree flag for a map for the left eye in the case where a viewpoint is moved in the rightward direction in the embodiment 1.

FIG. 38 is a view depicting a credibility degree flag for a map for the left eye in the case where the viewpoint is moved in the rightward direction. Pixels whose credibility degree flag is 1 and pixels whose credibility degree flag is 0 are displayed in different colors. It can be recognized that the credibility degree flag of a pixel drawn in an extended state by movement of the viewpoint is set to 0. When pixels of the original image for the right eye are referred to for a blind spot region of the original image for the left eye, for pixels whose credibility degree flag is 0, Z comparison is not performed, and an image reference vector by cross reference is set to the pixel.

Now, a generation procedure of an image reference vector map in which cross reference is used is described. In the following, a generation process of an image reference vector map for the right eye is described.

(1) First, into the image reference vector map for the right eye, an image reference vector calculated from a parallax value of a pixel at position coordinates (ixR, ixR) in the original image for the right eye is written.

(2) Upon writing of the image reference vector, also a credibility degree flag is written in simultaneously while a Z buffer process is performed. At this time, the Z comparison is performed irrespective of the substance of the credibility degree flag, and an image reference vector having a Z value nearer to the viewpoint is set for each pixel on the map.

(3) Then, in regard to pixels whose cross reference flag is "0" from among pixels at position coordinates (ixL, iyL) in the original image for the left eye, an image reference vector for cross reference to the image for the right eye is calculated and is written into a corresponding pixel of the image reference vector map for the right eye.

(4) At this time, in the case where the credibility degree flag of the image reference vector written in already is "1," Z comparison is performed to carry out writing only in the case where the pixel is nearer to the viewpoint. In the case where the credibility degree flag is "0," writing is performed without performing Z comparison.

Also the generation procedure of an image reference vector map for the left eye is similar.

Cases in which an image reference vector for cross reference is set to a map are summarized as follows.
(a) A case in which an image reference vector is not set to a pixel of a setting target
(b) A case in which, although an image reference vector whose reference destination is an original image of a viewpoint same as that of the map is set, the credibility degree flag of the same is "0"
(c) A case in which, although an image reference vector whose reference destination is an original image of a viewpoint same as that of the map is set and the credibility degree flag of the same is "1," it is indicated that the Z value corresponding to an image reference vector to be set is nearer to the viewpoint than the Z value corresponding to an image reference vector set already
(d) A case in which, although an image reference vector for cross reference is already set to a pixel of a setting target, it is indicated that the Z value corresponding to an image reference vector to be set is nearer to the viewpoint than the Z value corresponding to the image reference vector set already However, in order to decide whether an image reference vector set already designates an original image of a viewpoint same as that of the map or is for cross reference, it is necessary to read out the set image reference vector. In order to avoid this wasteful data reading out, when an image reference vector for cross reference is set, the credibility degree flag is set to "1" simultaneously. Consequently, only by referring to the Z value and the credibility degree flag for the same, it can be decided whether or not setting of the image reference vector is to be permitted.

Figure 39:
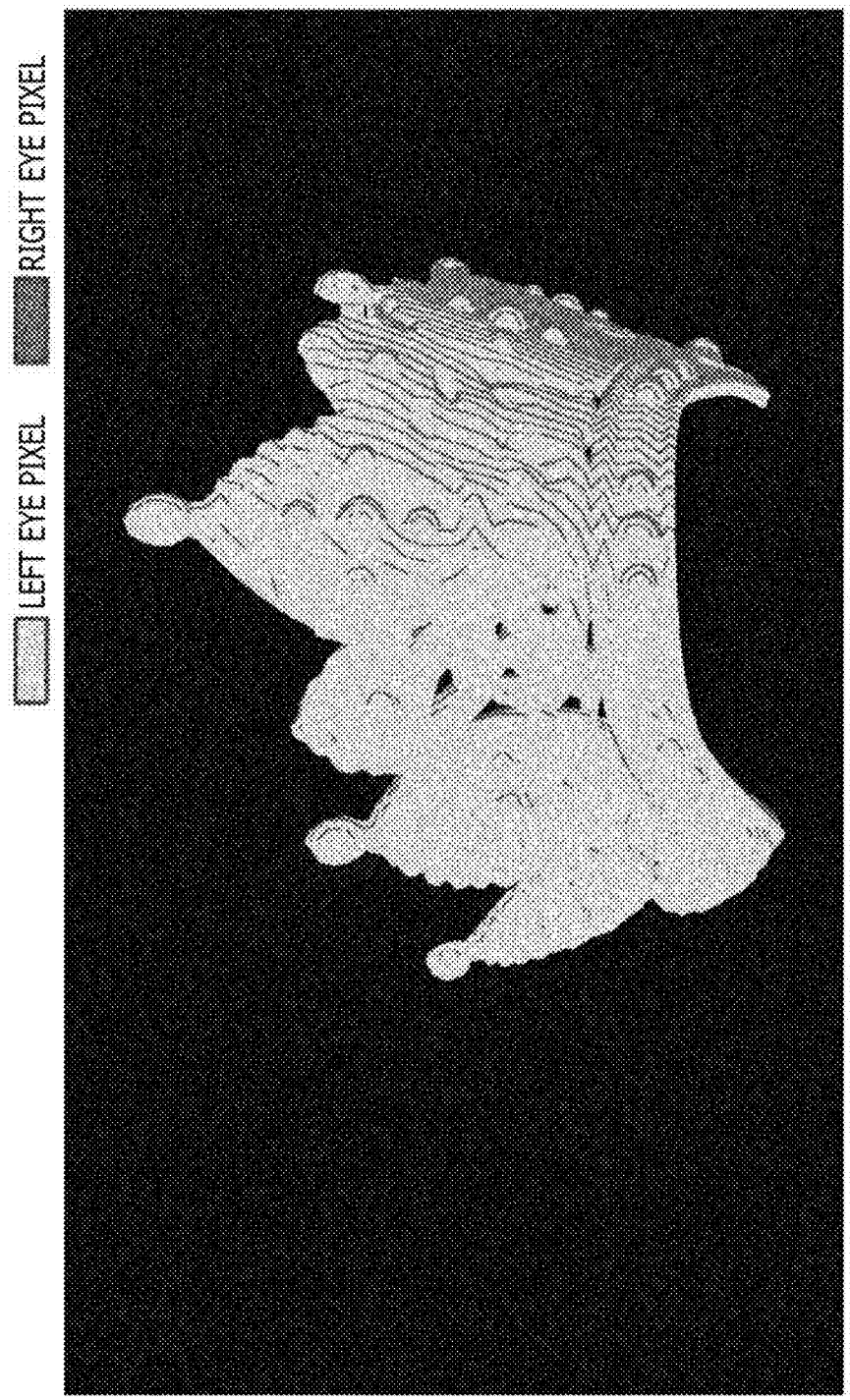
FIG. 39 is a view illustrating an image reference vector for performing cross reference, which is set to a map for the left eye, in the case where a viewpoint is moved in the rightward direction in the embodiment 1.

FIG. 39 is a view illustrating an image reference vector for performing cross reference to be set to a map for the left eye when the viewpoint is moved in the rightward direction. Pixels in which an image reference vector whose reference destination is an original image for the left eye is written and pixels in which an image reference vector whose reference destination is an original image for the right eye by cross reference are depicted in different colors. It can be recognized that, to a pixel whose credibility degree flag is 0, an image reference vector whose reference destination is an original image for the right eye by cross reference is set.

Figure 40:
FIG. 40 is a view illustrating an image reference vector for performing cross reference, which is set to a map for the left eye, in the case where a viewpoint is moved in the downward direction in the embodiment 1.

FIG. 40 is a view illustrating an image reference vector that is to be set to a map for the left eye and performs cross reference in the case where the viewpoint is moved in the downward direction. It can be recognized that, also in the case of movement of a viewpoint in the upward and downward direction, many image reference vectors are set whose reference destination is an original image for the right eye by cross reference.

Figure 41:
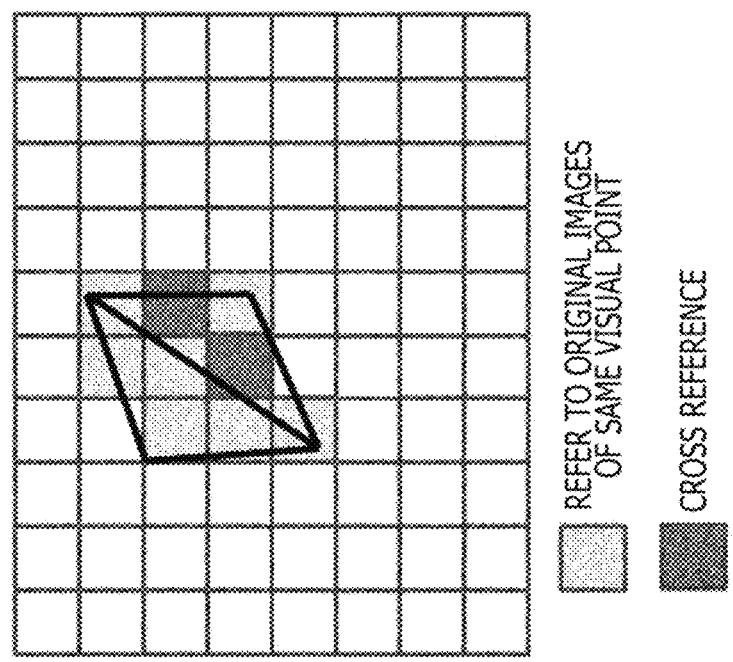
FIG. 41 is a view illustrating an image reference vector in the case where cross reference is introduced in the embodiment 1.

FIG. 41 is a view illustrating an image reference vector in the case where cross reference is introduced. In each pixel of an image reference vector map indicated by a lattice in FIG. 41, an image reference vector is stored. However, as indicated by colored introductory remarks at a lower portion, pixels that refer to an original image of a viewpoint same as that of the map and pixels that perform cross reference exist in a mixed manner. Therefore, when a display image is to be drawn, it is necessary to specify to which one of an original image for the right eye and an original image for the left eye the image reference vector is to refer.

Thus, a flag for identifying an image of the reference destination is provided for an image reference vector to be set to a map. For example, in the case where an image reference vector is retained in the form of a floating point number of 32 bits, a flag bit indicative of validity/invalidity of the image reference vector is provided at the least significant bit of one component while a flag bit for identifying an image of the reference destination is provided at the least significant bit of the other component. For example, in the case where an original image of a same viewpoint is to be referred to, 0 is set, but in the case of cross reference, 1 is set.

Now, a filter process of image reference vectors for cross reference is described. In a drawing process in which an image reference vector map having no cross reference is used, a single original image may always be referred to. Accordingly, by applying extended bilinear filtering to the image reference vector as described above and acquiring corresponding position coordinates of the original image on the basis of the single image reference vector obtained by the extended bilinear filtering, a color value is calculated using a bilinear filter or the like.

On the other hand, in the case where an image reference vector for cross reference is included, since pixels of the reference destination that are used to determine a color value of one pixel of a display image are sometimes divided to two images, separation of cases is required. FIG. 42 is a view illustrating separation of a filtering process of an image reference vector. A sampling point S and four pixels A to D around the sampling point S are depicted. The sampling point S is the center of a pixel of a display image described with reference to (a) of FIG. 27.

(a) of FIG. 42 depicts a case in which all of image reference vectors placed in the peripheral pixels A to D refer to an original image for the left eye, and (b) of FIG. 42 depicts a case in which all of image reference vectors placed in the four pixels A to D refer to an original image for the right eye. In those cases, the extended bilinear filtering in the case where no cross reference is involved can be applied as it is. It is to be noted that, while (a) and (b) exemplify a case in which an image reference vector is set in all of the peripheral pixels A to D, the foregoing similarly applies also in the case in which a pixel for which an image reference vector does not exist is included.

(c) of FIG. 42 depicts a case in which an image reference vector placed in the pixel A refers to an original image for the right eye and image reference vectors placed in the pixels B, C, and D refer to an original image for the left eye. In this case, extended bilinear filtering similar to that in the case where there is no cross reference is performed for each image of the reference destination, and color values obtained from the left and right original images may be blended finally. On the other hand, since it is considered that, in regard to a region that refers to both of the left and right images, the picture quality of the original image is originally low, it is considered sufficient even if filtering of calculation speed priority is performed.

Figure 43:
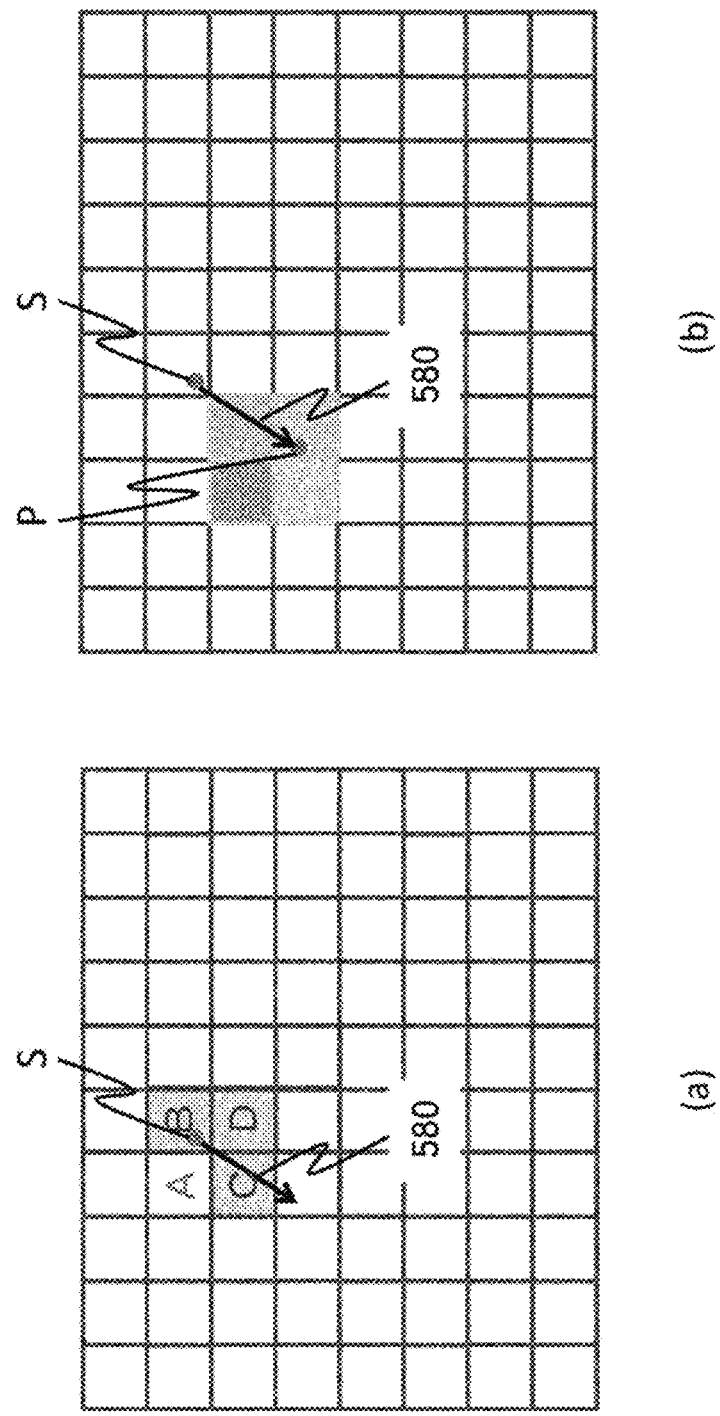
FIG. 43 is a view illustrating a determination process of a color value of a display image in the case where cross reference is not performed in the embodiment 1.

First, for the sake of comparison, a determination process of a color value of a display image in the case where ordinary extended bilinear filtering may be performed, namely, in the case where one of left and right original images may be referred to, is described once again. FIG. 43 is a view illustrating a determination process of a color value of a display image in the case where there is no cross reference. In (a) of FIG. 43, in the case where, from among the four pixels A to D around a sampling point S on a map, the pixel A does not have an image reference vector while an image reference vector exists in the pixels B, C, and D, extended bilinear filtering is applied to the image reference vectors of the three pixels B, C, and D to determine an image reference vector 580 at the sampling point S.

Then, as depicted in (b), the original image of the reference destination is sampled using the determined image reference vector 580 and an alpha blend, an alpha test or the like is performed to calculate a color value at a point P of the reference destination of the image reference vector 580. For this sampling, ordinary bilinear filtering can be used.

Figure 44:
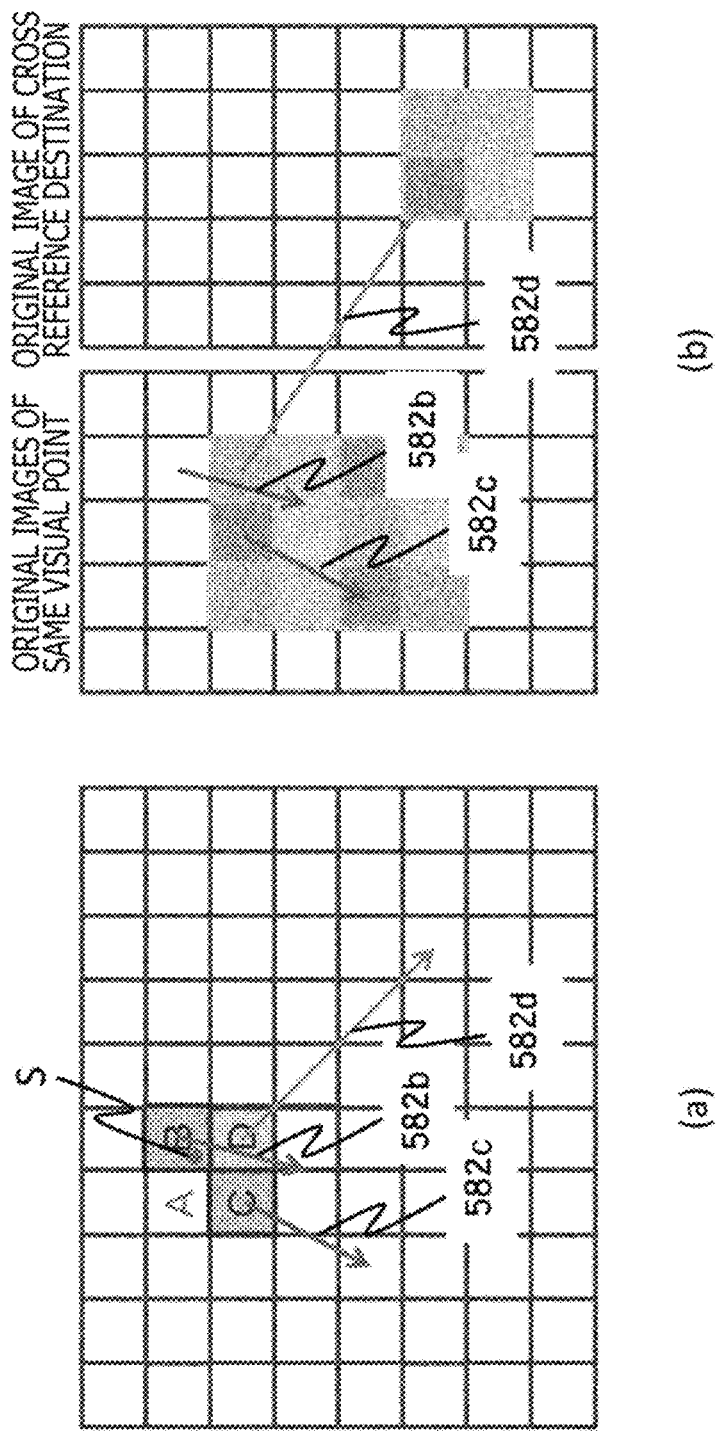
FIG. 44 is a view illustrating a determination process of a color value of a display image in the case where different original images are included in a reference destination in the embodiment 1.

FIG. 44 is a view illustrating a determination process of a color value of a display image in the case where different original images are included in a reference destination. In the case where, as depicted in (a) of FIG. 44, from among the four pixels A to D around the sampling point S on the map, in the pixel A, an image reference vector does not exist while an image reference vector exists in the pixels B, C, and D, the sampling point of the original image is determined using the image reference vectors of the three pixels B, C, and D. Here, it is assumed that, while the image reference vector 582b of the pixel B and the image reference vector 582c of the pixel C refer to an original image of a viewpoint same as that of the map, the image reference vector 582d of the pixel D refers to an original image of the other viewpoint, namely, refers to an original image of the cross reference destination.

(b) depicts a reference destination of the image reference vector 582b of the pixel B in the original image having a viewpoint same as the map, a reference destination of the image reference vector 582c of the pixel C in the original image and a reference destination of the image reference vector 582d of the pixel D in the original image of the cross reference destination. In such a case as just described, it is meaningless to apply extended bilinear filtering to the image reference vectors of the three pixels B, C, and D as in the case where no cross reference is involved. Therefore, for each of the three pixels B, C, and D, pixels of reference destinations of image reference vectors are sampled and color values are obtained by bilinear interpolation or the like. For the pixel A for which no image reference vector exists, a color value is set to zero including an alpha value. Then, a bilinear filter is applied to the color values obtained in regard to the four pixels A to D at a ratio based on the positional relationship between the sampling point S and the peripheral four pixels to determine final color values.

Figure 45:
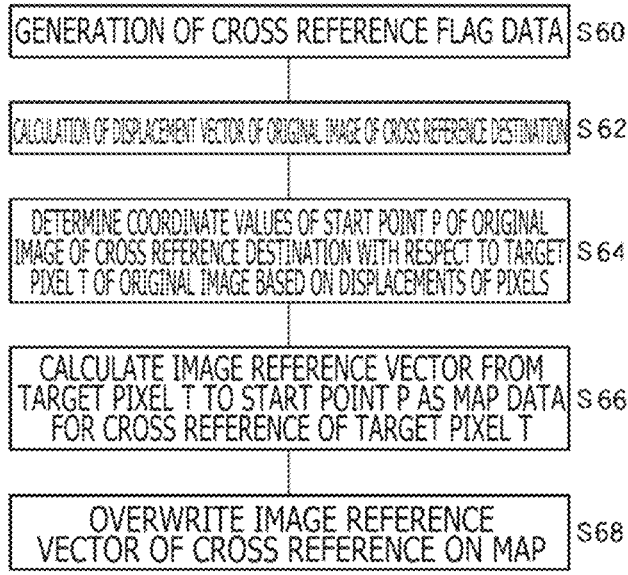
FIG. 45 is a flow chart depicting a processing procedure in which the original image operation unit sets an image reference vector for cross reference to an image reference vector map in the embodiment 1.

FIG. 45 is a flow chart depicting a processing procedure in which the original image operation unit 254 sets an image reference vector for cross reference to an image reference vector map. This process is performed additionally to the process for generating an image reference vector map depicted in FIG. 25. First, using a parallax value image corresponding to an original image of a viewpoint same as that of a target map, coordinates of corresponding pixels of an original image of a cross reference destination are determined, and a flag is set to the determined coordinates of the pixels to generate a cross reference flag array (S60). However, this process may be omitted.

Then, from a parallax value image corresponding to the original image of the cross reference destination and the amounts of movement and the angles of rotation of the viewpoint, a displacement vector (dx, dy) of each pixel in the image is calculated (S62). Then, on the basis of the displacement vectors (dx, dy), coordinate values (px, py) of a start point P of the original image of the cross reference destination with respect to a target pixel T (itx, ity) in the inside of the triangle after the replacement in the original image of the viewpoint same as that of the map is determined (S64). Further, an image reference vector (px-itx, py-ity) from the target pixel T (itx, ity) to the start point P (px, py) is determined as an image reference vector for cross reference (S66).

For pixels of the original image of the cross reference destination in regard to which a flag has not been written into the cross reference flag array, namely, for all pixels positioned in the blind spot in the original image of a viewpoint same as that of the map, the processes at steps S64 and S66 are performed, and image reference vectors for cross reference are overwritten to corresponding pixels of the image reference vector map (S68). The process at S68 is carried out after it is determined on the basis of the credibility degree flag and the Z value whether or not an image reference vector set already is to be overwritten.

Figure 46:
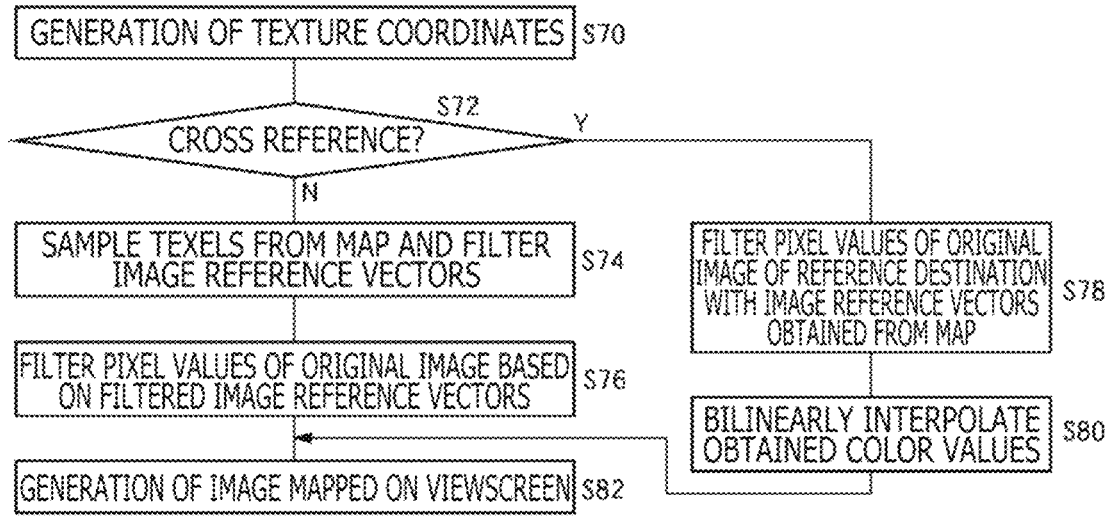
FIG. 46 is a flow chart depicting a processing procedure in which the display image generation unit maps an original image to a viewscreen in the case where cross reference is applied in the embodiment 1.

FIG. 46 is a flow chart depicting a processing procedure by the display image generation unit 268 for mapping an original image to a viewscreen in the case where cross reference is applied. This process is carried out in place of the process depicted in FIG. 26. The display image generation unit 268 first generates texture coordinates (tu, tv) to be mapped to a point (tx, ty) on a viewscreen (S70). This establishes texels in a map. Then, the display image generation unit 268 determines a sampling point on the image reference vector map on the basis of the texture coordinates and acquires image reference vectors of the surrounding pixels of the sampling point.

In the case where all of the image reference vectors of the peripheral pixels are those that refer to the original image of a viewpoint same as that of the map (N at S72), since no cross reference is to be performed, the processing advances to step S74. In the case where the image reference vectors of the peripheral pixels include an image reference vector that refers to the original image of the other viewpoint (Y at S72), since cross reference is required, the processing advances to step S78. In the case where cross reference is not to be performed, an image reference vector at the texture coordinates is determined by bilinear interpolation extended using the image reference vectors sampled at step S72 (S74). In other words, (S74) involves sampling texels from the map and filtering image reference vectors. On the basis of the texture coordinates (u, v) of the reference destination obtained by adding the image reference vector determined in this manner to the texture coordinates (tu, tv), filtering is performed for the pixel values of the original image to generate a color value of the original image to be mapped to each pixel on the viewscreen (S76).

In the case where cross reference is to be performed, the image reference vectors of the peripheral pixels sampled from the image reference vector map at step S72 are used to filter the pixel values of the original image of the reference destination (S78). As the reference destination here, the original image of a viewpoint same as that of the map and the original image of the other viewpoint are applicable. If the former is the reference destination, then the pixel values are filtered from the original image of the same viewpoint, but if the latter is the reference destination, then the pixel values are filtered from the original image of the other viewpoint.

By further bilinearly interpolating the color values obtained by the filtering at step S78, final color values are determined (S80). By generating a color value to be mapped by the procedure of steps S70 to S80 for all pixels on the viewscreen, a display image on which the original image is mapped on the viewscreen is generated (S82).

Figure 47:
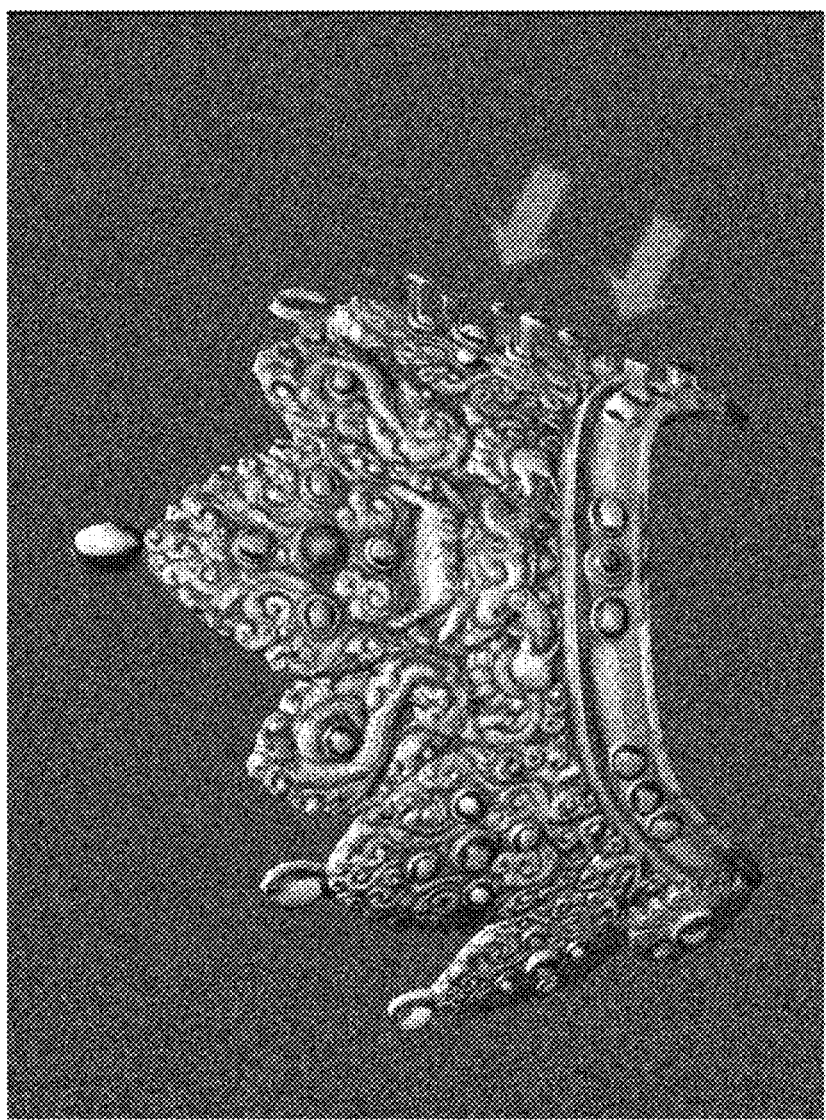
FIG. 47 is a view depicting an example of a display image of a left eye image in the case where cross reference is not performed for the comparison with the embodiment 1.
Figure 48:
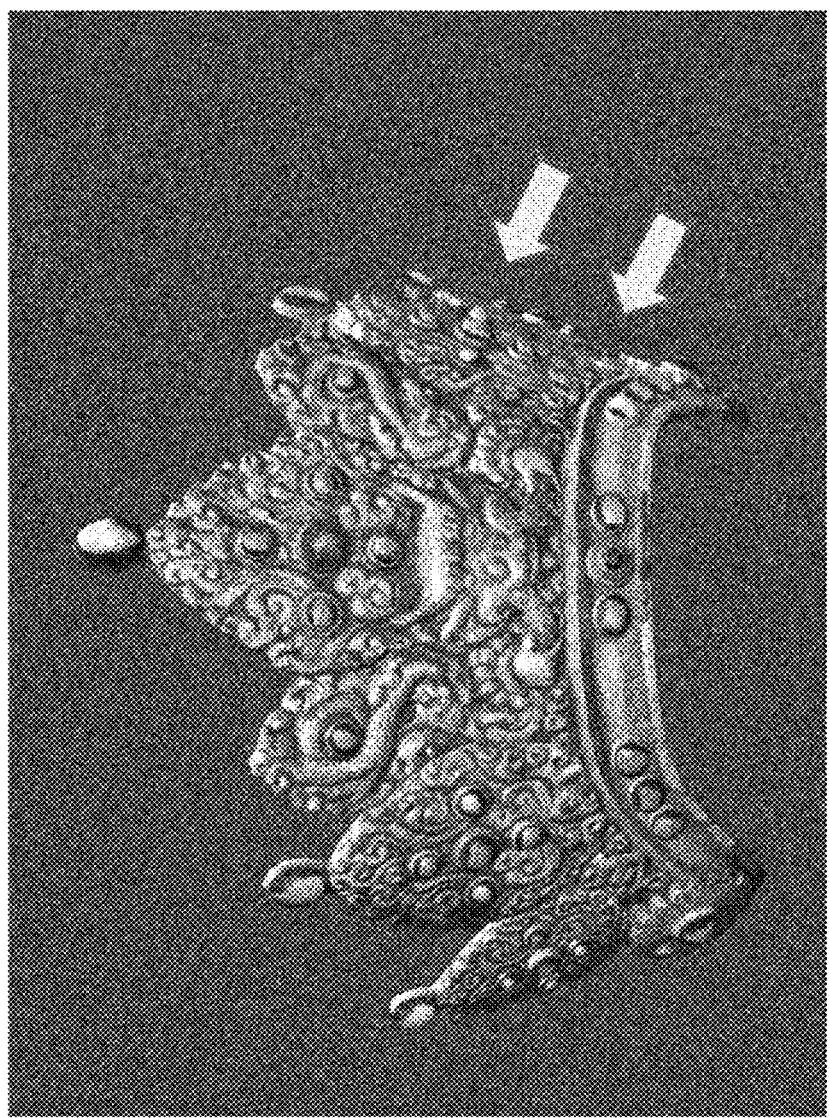
FIG. 48 is a view depicting an example of a display screen image of a left eye image in the case where cross reference is performed in the embodiment 1.

In the following, an example of a display image drawn by cross reference is described. FIG. 47 depicts, for comparison, an example of a display image of a left eye image in the case where cross reference is not performed. This is a result of drawing in the case where a viewpoint is moved in the rightward direction. It is recognized that a portion indicated by arrow marks becomes a blind spot when viewed from the left eye, and by drawing the blind spot region by linear interpolation, the picture quality is degraded. FIG. 48 depicts an example of a display screen image of a left eye image in the case where cross reference is performed. Similarly to FIG. 47, FIG. 48 depicts a result of drawing in the case where the viewpoint is moved in the rightward direction. It is recognized that, by interpolating in the blind spot region indicated by the arrow marks using pixels of the right eye image, degradation of the picture quality is suppressed.

Figure 49:
FIG. 49 is a view depicting another example of a display screen image of a left eye image in the case where cross reference is not performed for comparison with the embodiment 1.
Figure 50:
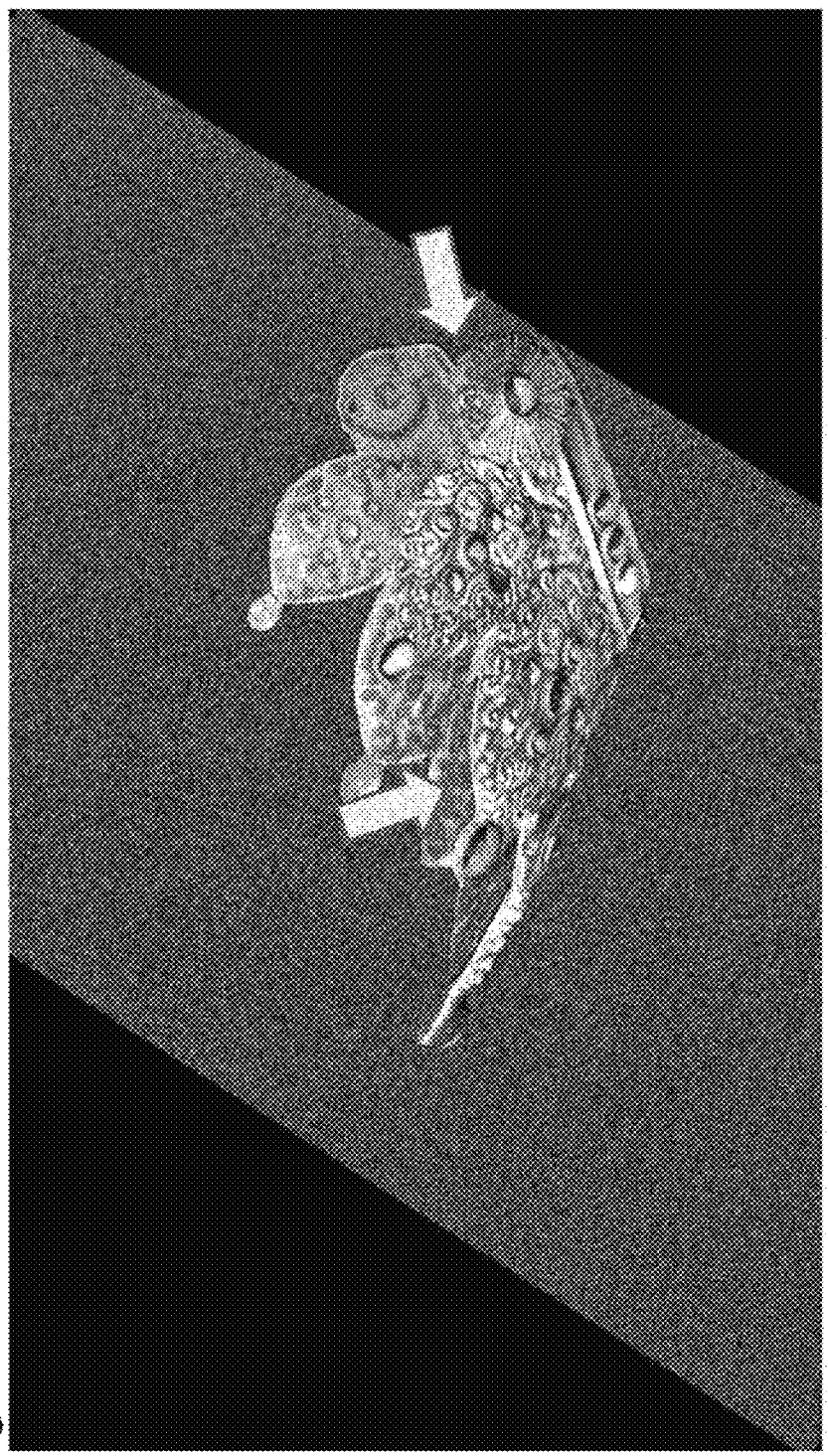
FIG. 50 is a view depicting an example of a display screen image of a left eye image in the case where cross reference is performed in the embodiment 1.

FIG. 49 depicts, for comparison, a different display screen image of the left eye image in the case where cross reference is not performed. This is a result of drawing in the case where the viewpoint is rotated in the clockwise direction. It is recognized that, at a portion indicated by an arrow mark, pixel values are interpolated by expended triangles. FIG. 50 depicts an example of a display screen image of the left eye image in the case where cross reference is performed. Similarly to FIG. 49, a result of drawing in the case where the viewpoint is rotated in the clockwise direction is depicted. By interpolating in the blind spot region indicated by the arrow mark using the pixels of the right eye image, the display image is drawn correctly.

Figure 51:
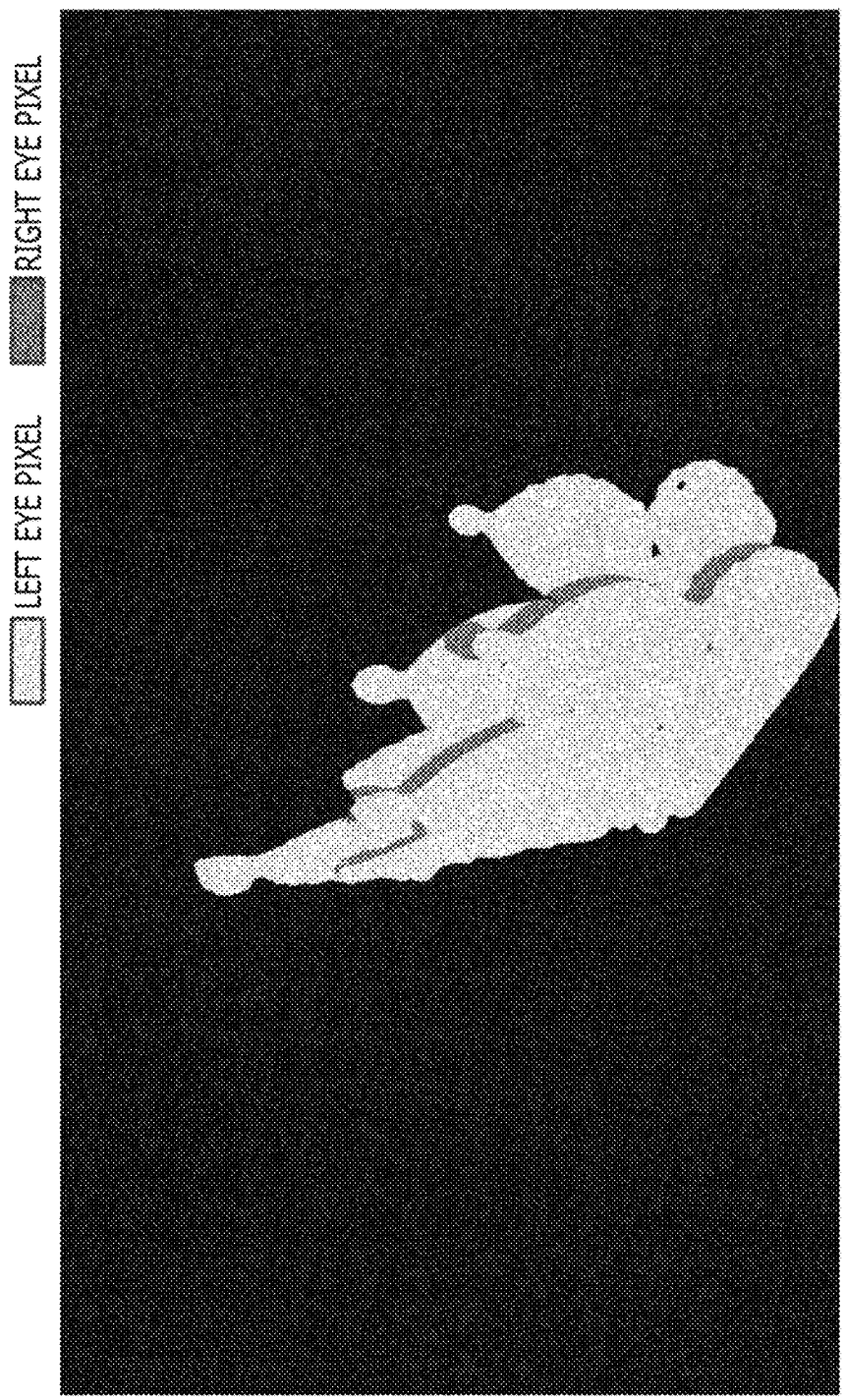
FIG. 51 is a view depicting a left eye pixel and a right eye pixel distinctly from each other in a cross reference drawing image of FIG. 50.

FIG. 51 is a view depicting a left eye image and a right eye image distinctly in the cross reference drawing image of FIG. 50. It is recognized that, in the blind spot region, the left eye pixels of the credibility degree 0 are overwritten with cross referenced right eye pixels.

With the embodiment described above, a three-dimensional stereo image or stereo moving image can be implemented with high quality by performing correction of the image such that, even if a movement of a viewpoint or rotation is involved, a disagreeable feeling of the user is suppressed.

In regard to a natural image picked up by a stereo camera, a stereo video or the like, the present embodiment has such a merit as described below. Generally, from a natural image, it is difficult to extract an accurate parallax value (or distance value) through stereo matching of left and right images. Therefore, a parallax value includes some error. Therefore, with the technique of determining three-dimensional data once by calculation from left and right stereo images and parallax values and performing perspective interpolation for the three-dimensional data to re-generate and display the right eye image and the left eye image in a virtual space, it is difficult to maintain the accuracy of the three-dimensional data and the quality of the display image is likely to degrade.

In contrast, with the present embodiment, in the case where a viewpoint supposed for an original image and an actual viewpoint coincide with each other, stereoscopic viewing with quality of the original image is possible. Further, even in the case where the viewpoint moves, since correction for the original image performed in response to such movement is in the minimum, even for a natural image for which an accurate parallax value does not exist, stereoscopic viewing of a display image of high quality can be achieved.

Embodiment 2

In the description of the embodiment 1, a mode in which principally a flat panel display is supposed as a display apparatus is described. In the description of the present embodiment, a case is described in which a head mounted display is supposed as a display apparatus. However, the display apparatus is not limited to any of them, but also it is possible to introduce a head mounted display into the embodiment 1 or introduce a panel type display into the present embodiment. Also it is possible to apply the configuration of part of the embodiment 1 to the present embodiment or to apply the configuration of part of the present embodiment to the embodiment 1. In the following, description is given paying attention to differences from the embodiment 1.

FIG. 52 is an appearance view of a head mounted display. The head mounted display 100 includes a main body unit 110, a forehead contacting unit 120, and a temporal region contacting unit 130. The head mounted display 100 is a display apparatus that is mounted on the head of a user such that the user appreciates a still picture or a moving picture displayed on the display and enjoys sound or music output from a headphone. By a motion sensor built in or externally mounted on the head mounted display 100, it is possible to measure posture information of the user such as an angle of rotation or a tilt of the head of the user who wears the head mounted display 100. The head mounted display 100 is connected to an image generation apparatus 200 in place of the flat panel display 12 in the image displaying system depicted in FIG. 1 such that it acquires data of left and right display images and displays the display images in front of the left eye and the right eye of the user.

FIG. 53 is a view illustrating a form of display implemented by the image displaying system. Similarly as in the embodiment 1, also in the present embodiment, a state in which a plane representative of an image is disposed in a virtual space is created. In particular, ideally as depicted in (a), an image screen 50 on which an image is displayed is disposed on a field 52 in a virtual space such that a user 54 can appreciate the image through a viewscreen 56. Here, the viewscreen 56 corresponds to the field of view of the image displayed on the head mounted display 100.

If the user 54 moves while viewing the virtual space, then also the appearance of the image screen 50 varies in response to the variation of the relative position to the virtual world. For example, in the case where the user 54 is on the right with respect to the image screen 50 as depicted in (a) of FIG. 53, the image generation apparatus 200 generates such an image as in (b) corresponding to such a line of sight as indicated by an arrow mark and causes the image to be displayed on the head mounted display 100. It is to be noted that the field 52 in the virtual space merely represents a coordinate system of the virtual space and is not for the purpose of limiting the shape or the like. Further, the field 52 may not necessarily be displayed.

Figure 54:
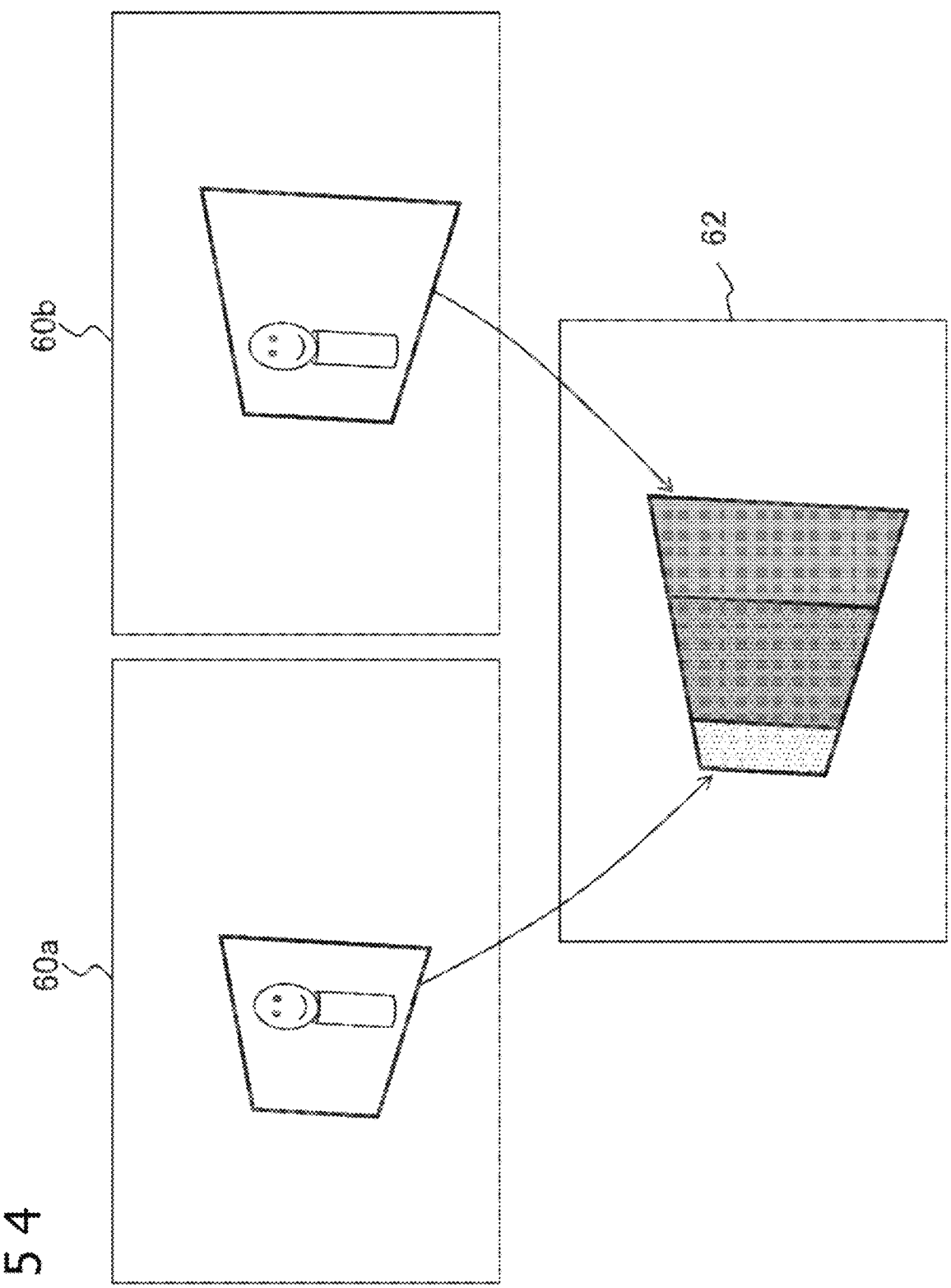
FIG. 54 is a view schematically depicting an image generated by an image generation apparatus of the embodiment 2.

FIG. 54 schematically depicts an image generated by the image generation apparatus 200 in order to implement the form of FIG. 53. In the present embodiment, an image displayed on the image screen 50 is configured from a pair of parallax images for stereoscopic viewing, namely, an image 60a for the left eye and an image 60b for the right eye. In order to allow such an image as depicted in FIG. 53 to be stereoscopically viewed, a same object appears rather rightwardly in the image 60a for the left eye and rather leftwardly in the image 60b for the right eye.

Further, since the position of the viewpoint with respect to the image screen 50 differs between the left and right eyes, it is necessary to perform perspective transformation from each of the viewpoints. For example, in the case where the user is on the right with respect to the image screen 50 as depicted in FIG. 53, the right eye is nearer to the image screen 50 than the right eye and is greater in angle with respect to an axis perpendicular to the plane of the image screen 50. As a result, the shape and the position of the frame of the image screen 50 differs between the image 60a for the left eye and the image 60b for the right eye, and if they are represented in an overlapping state on the same plane, then they have such a positional relationship as depicted on a plane 62.

By generating such an image 60a for the left eye and an image 60b for the right eye as described above and causing, from between regions obtained by dividing the screen image of the head mounted display 100 to the left and the right, the region corresponding to the left eye to display the former and causing the region corresponding to the right eye to display the latter, the object appearing on the image screen 50 becomes stereoscopically visible to the user in a state depicted in (b) of FIG. 53. It is to be note that actually a lens is provided individually between screen images of the head mounted display 100 and the eyes of the user such that an image appears over an overall field of view of the left and right eyes. To this end, the image 60a for the left eye and the image 60b for the right eye are subject to such lens distortion correction that the original image is viewed when the user sees through the lens.

Data of an original image and data of a parallax value (or a distance value) prepared in the present embodiment are similar to those described hereinabove in connection with the embodiment 1. In order for such an original image to be viewed stereoscopically specifically permitting movement of the viewpoint by a comparatively great amount like the head mounted display 100, it is conceivable to inversely project a given two-dimensional image to an initial virtual space once and then project the inversely projected image to a viewscreen again. For example, only one of left and right original images is divided into very small triangles each having vertices at the centers of pixels and each of the very small triangles is disposed according to a distance Zp thereof in the virtual three-dimensional space. Then, the very small triangles are projected to the left and right viewscreens corresponding to the viewpoints of the viewer and the inside of them is drawn by texture mapping.

However, in this case, such a problem as described below occurs. In particular, in the case where an original image is divided into very small triangles and the very small triangles are disposed in a virtual three-dimensional space, it cannot be avoided to select one of the left and right original images. Therefore, also depth information is limited only to information based on the selected image. As a result, even if parallax values or distance values have information of subpixel accuracy as described hereinabove with reference to FIG. 11, such high definition information cannot be reflected on the display image. Further, although generally images acquired from different viewpoints are ordinarily different in component of specular reflection of light or in component of refracted light, if an object is represented as a sole point cloud or a collection of very small triangles, then such information as described above becomes missing, resulting in degradation of the texture of the object.

Further, by two stages of processes including the process of inversely projecting divisional very small regions to a three-dimensional space and projecting the very fine regions in the three-dimensional space to a viewscreen, the quality of a final display image is likely to degrade. Even if the viewpoint of a viewer is at such an appropriate position as depicted in FIG. 5 and originally there is no necessity for conversion of an image, intervention of such processes as described above degrades the picture quality uselessly. Further, even if, for example, a memory of a large capacity is prepared and information inversely projected to a three-dimensional virtual space is stored as point groups or collections of very small triangles, perspective transformation of the points to the viewscreen again is required, and the load of processing is high.

Therefore, in the case where the original image is a moving picture or the use moves fast, this gives rise to latency that especially cannot be overlooked. Therefore, by associating an original image and a display image directly with each other using an image reference vector, degradation of the picture quality or latency is suppressed to the minimum. This simplifies a perspective transformation process using a 4×4 perspective transformation matrix at each point and makes it possible to calculate a displacement for each pixel by a small amount of arithmetic operation. Further, although perspective transformation of a corrected image to a viewscreen finally becomes necessary, since only it is necessary for this to be executed for one triangle that covers the entire corrected image, this can be processed with a very high efficiency using conventional graphics hardware.

An approximate processing procedure of the image generation apparatus 200 for generating a display image from an original image in the present embodiment may be similar to that depicted in FIG. 7. It is to be noted that, at S10, a direction of a line of sight is acquired together with a position of a viewpoint. Along with this, the posture of the head of the user can be acquired by the motion sensor built in the head mounted display 100. Further, the position or the posture of the head of the user can be acquired on the basis of a picture or the like of a light emitting marker provided on the surface of the head mounted display 100 by picking up an image of the user by an image pickup apparatus not depicted.

Alternatively, an image pickup not depicted for picking up an image corresponding to the field of view of the user is provided on the head mounted display 100 side such that the position or the posture of the head is acquired by such a technology as simultaneous localization and mapping (SLAM). If the position or the posture of the head can be acquired in this manner, then the position of the viewpoint and the direction of the line of sight of the user can be specified approximately. Depending upon the setting, the image screen on which an image reference vector map is generated at step S12 may be translated in the Z axis direction from the plane of the original image in response to the movement of the viewpoint. Further at step S14, the viewscreen on which a display image is drawn at S14 is set so as to correspond to the position of the viewpoint and the direction of the line of sight.

Figure 55:
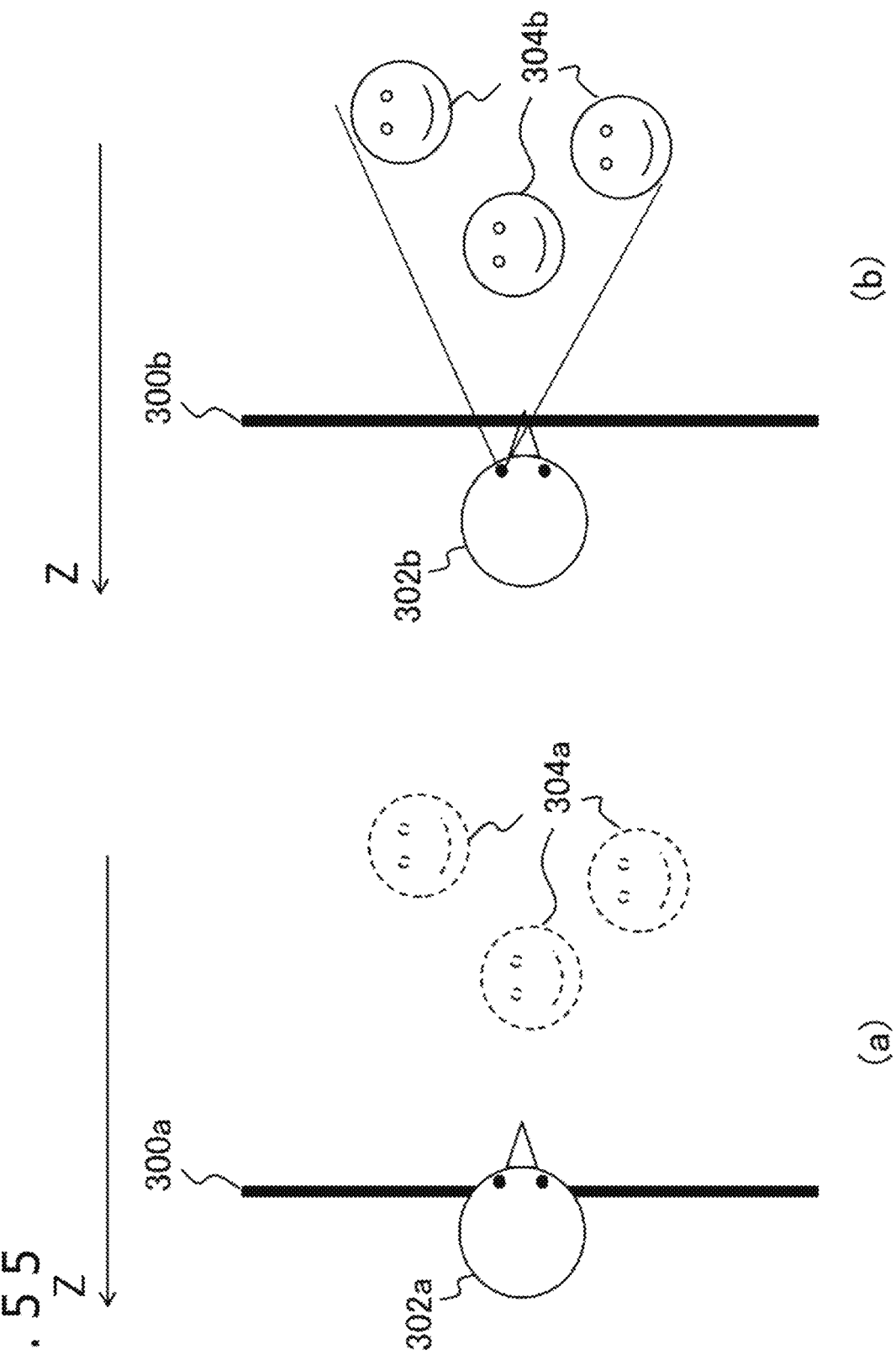
FIG. 55 is a view schematically depicting an appearance of an image when the position of an image screen is fixed in a virtual space and a user moves toward the image side in the embodiment 2.

Now, an effect in the case where the image screen is translated in response to the movement of the viewpoint at S12 is described. FIG. 55 schematically depicts an appearance of an image when the position of the image screen is fixed in such a virtual space as in FIG. 5 and the user moves to the image side. Such disposition of the cameras 70a and 70b and the image screen 76 as depicted in FIG. 5 is that assumed when the original image is acquired and the user who appreciates the image is not conscious of this.

Accordingly, it is considered that, if the user approaches the image screen, then the user 302a soon moves forwardly beyond the image screen 300a as depicted in (a) of FIG. 55. In this case, the perspective transformation fails and the original image including the object 304a disappears from the user. Further, as depicted in (b), even if the user 302b does not move forwardly beyond the image screen 300b, the magnification of the original image by the perspective transformation increases as the user 302b comes nearer to the image screen 300b, and the resolution of the object in the display image decreases. This is especially remarkable in the case of the head mounted display 100 with regard to which the range of movement of the user is great.

Figure 56:
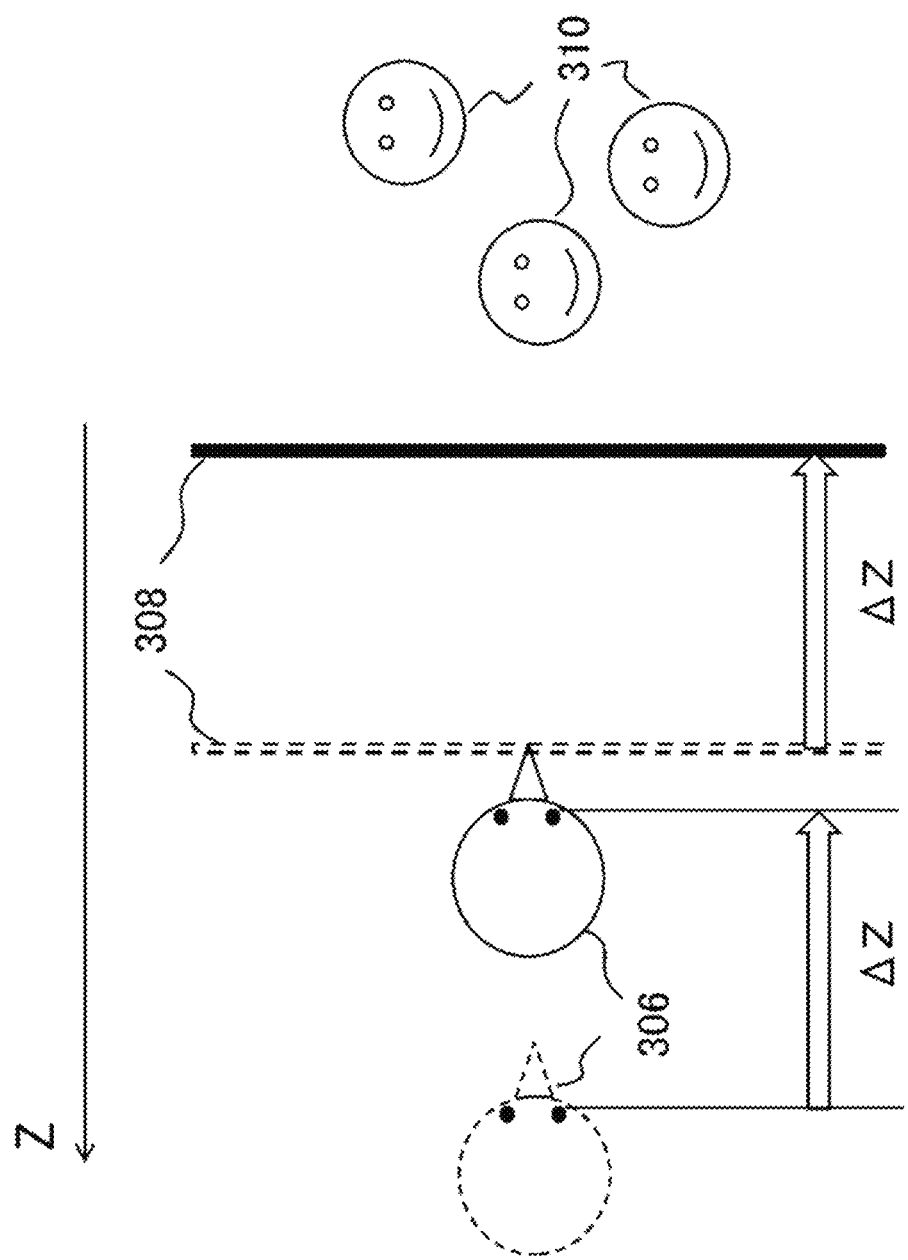
FIG. 56 is a view illustrating a technique for changing an original image in response to the position of a viewpoint in the embodiment 2.

FIG. 56 is a view illustrating a technique for moving an image screen in response to the position of a viewpoint. In one embodiment, in order to avoid such a disadvantage as described above, if the user 306 moves by ΔZ in the opposite direction as depicted in FIG. 56, then also the image screen 308 is moved by ΔZ in the same direction. In other words, by translating the image screen in a same direction by an amount equal to the amount of movement of a Z component of the viewpoint, the distance between the user 306 and the image screen 308 is kept fixed.

Simultaneously, pixels that configure the picture of the original image are moved such that the object 310 may seem to be fixed in the virtual space. Consequently, it is not recognized by the user 306 that the image screen 308 is moved. As a result, no influence is had on the appearance status, and such a situation as depicted in FIG. 55 can be avoided. It is to be noted that, although the foregoing description is directed to the movement in the opposite direction to the Z axis, also when the viewpoint moves in the Z-axis direction, the image screen may be translated in the same direction.

Figure 57:
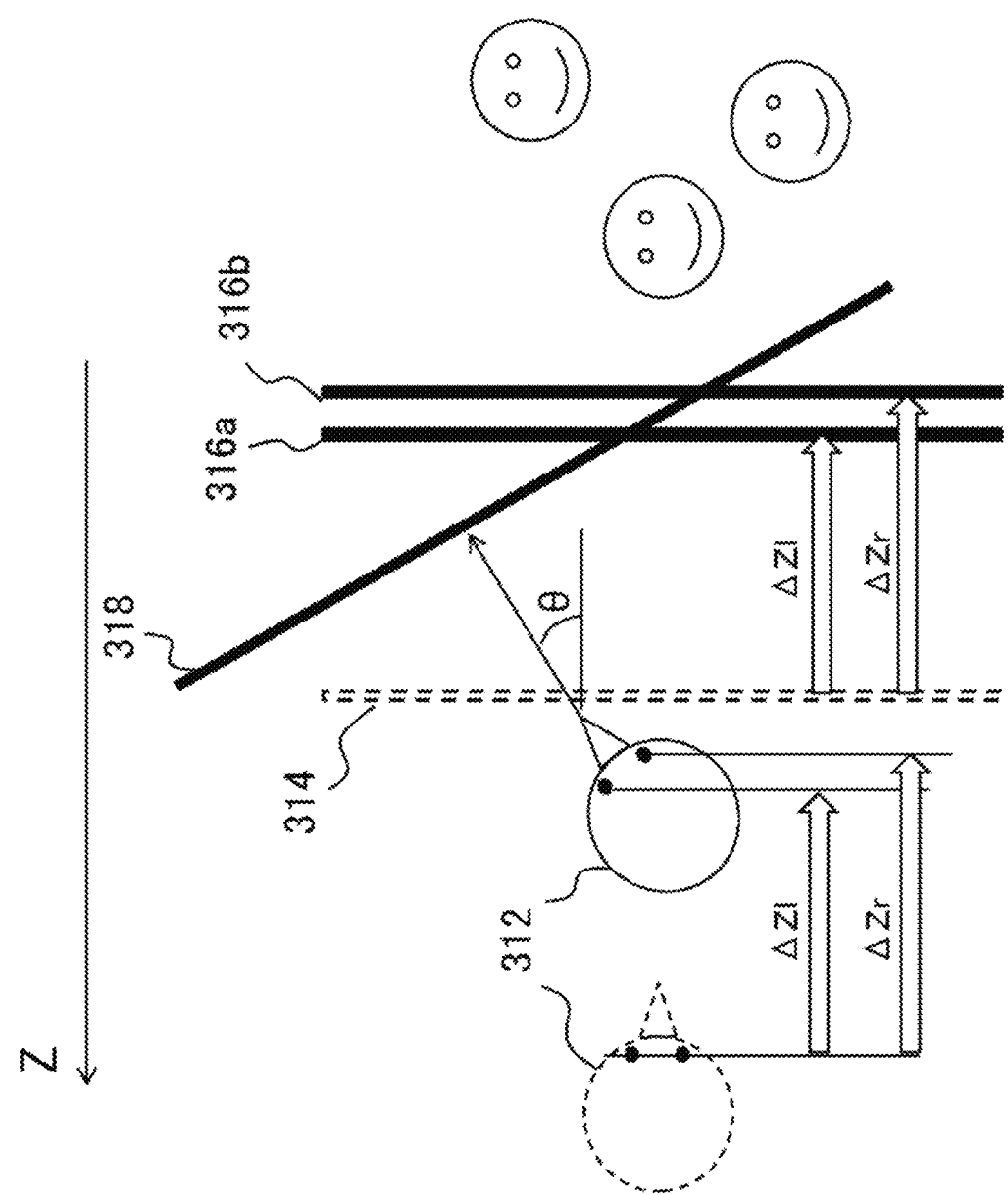
FIG. 57 is a view depicting a manner in which an original image is drawn on a viewscreen taking the direction of a line of sight into account in the embodiment 2.

FIG. 57 depicts a manner in which an original image is drawn on a viewscreen taking the direction of a line of sight into account. Also in this case, similarly as in the description given with reference to FIG. 56, the image screen is translated in a same direction by a distance equal to that of the Z component of the amount of movement of the user 312. However, if the line of sight after the movement has an angle θ with respect to the Z axis as depicted in FIG. 57, then the amount ΔZl of movement of the viewpoint of the left eye and the amount ΔZr of movement of the viewpoint of the right eye are different from each other.

Accordingly, the image screen after the movement is different in position between the image screen 316a for the left eye and the image screen 316b for the right eye. In the example depicted, since the user faces the left front, the image screen 316a for the left eye is positioned nearer to the user. Thus, the left and right original images are changed in accordance with the images screens 316a and 316b and are projected to the viewscreen 318 set so as to correspond to the position of the viewpoint and the direction of the line of sight of the user 312 after the movement.

It is to be noted that movement of the image screen as indicated by FIGS. 56 and 57 is a process necessary in the case where the viewpoint of the user moves by a great amount. On the other hand, in the case where the principal purpose of display is appreciation of an object or a moving image and it is considered that the movement of the viewpoint is not great, the movement of the image screen may be omitted to generate an image reference vector map on the image screen at a position same as that of the original image. However, in the following description, a form in which the calculation amount is greater and an image screen is translated is exemplified mainly. Even with this, it is possible to calculate the displacement amount of each pixel by a small amount of arithmetic operation in comparison with that by general three-dimensional perspective transformation.

The internal circuit configuration and the functional blocks of the image generation apparatus 200 of the present embodiment may be similar to those described hereinabove with reference to FIGS. 8 and 9 in connection with the embodiment 1. However, the view screen setting unit 252 determines the position of a viewpoint or the direction of a line of sight of a user on the basis of the position or the posture of the head acquired by the position and posture acquisition unit 250. Consequently, a display image drawn on the viewscreen is such as, for example, the image 60a for the left eye and the image 60b for the right eye depicted in FIG. 33.

Further, the original image operation unit 254 may generate an image reference vector map after the image screen is translated in response to the position of the viewpoint as described hereinabove. In this case, the image reference vector becomes information representative of to which position of the original image each pixel on the screen after the movement corresponds. It is to be noted that, in the case where the line of sight has an angle with respect to the Z axis, the position of the screen after the movement differs between the left and right eyes as depicted in FIG. 11. However, in the following description, they are collectively represented by one screen. Furthermore, the original image operation unit 254 may prepare, by expanding parallax values held by a parallax value image to the outer side of the picture in addition to the cross reference described hereinabove, image reference vectors for the expansion portion. Details are hereinafter described.

Further, in the present embodiment, original image data 258 stored in the original image data storage unit 256 may be data of a plurality of resolutions such that the resolution to be used for drawing is changed over in response to the degree of the reduction ratio by perspective transformation. A technique of changing over the resolution of the original image to perform texture mapping to suppress a flicker of the original image is known as mipmapping. However, in the present embodiment, the LOD is calculated on the basis not of the reduction ratio of very small regions into which an image is divided but of the amount of movement of a viewpoint experienced before the pixels on the screen transit from those of the initial original image to select an appropriate resolution. Consequently, in whatever manner the very small regions of the original image are deformed by perspective transformation, a resolution appropriate for the pixels can be determined independently of the deformation. Further, when the outputting unit 270 outputs data of a display image to the head mounted display 100, it may output the display image after it performs lens distortion correction for the display image.

Figure 58:
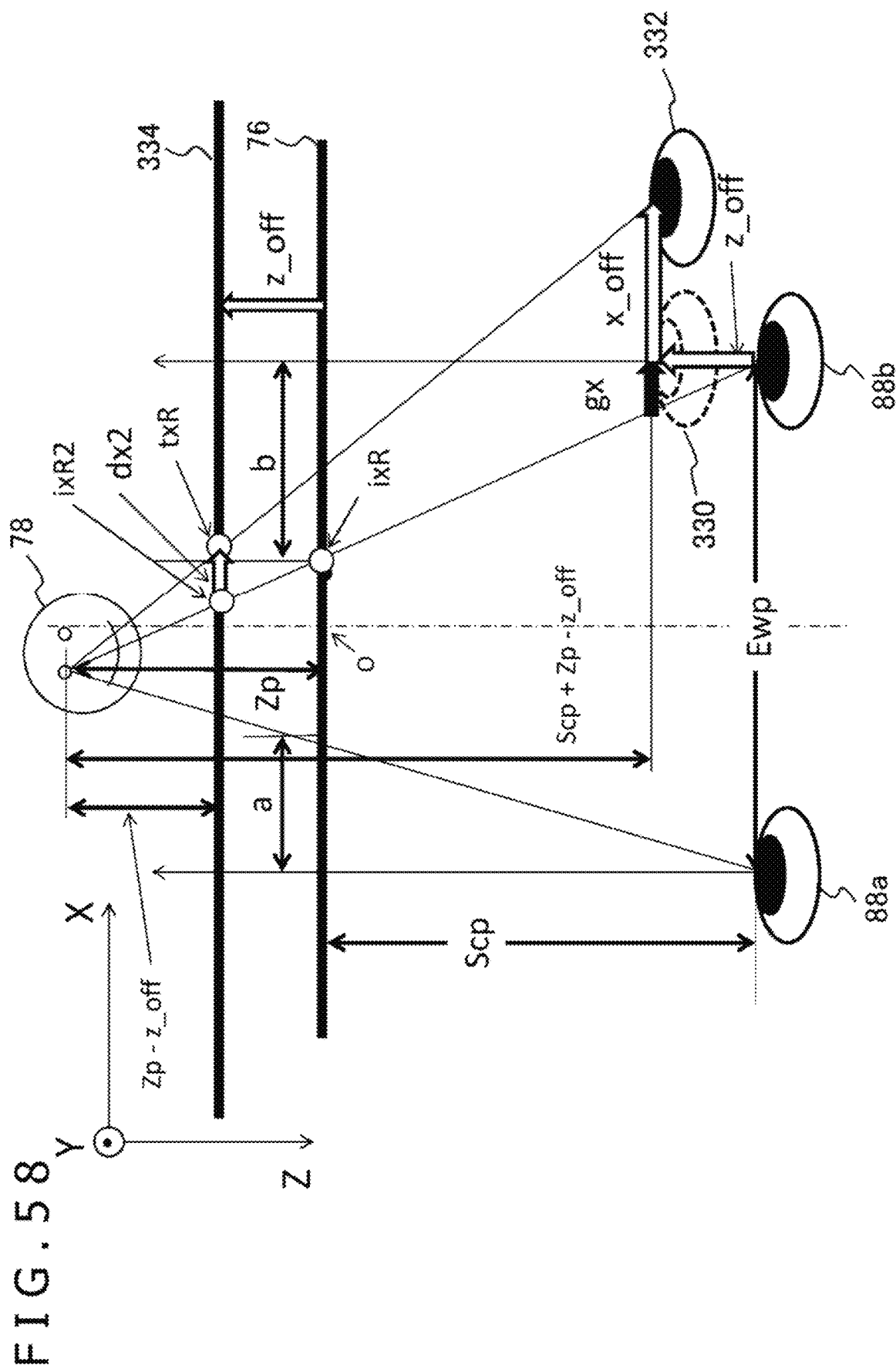
FIG. 58 is a view illustrating a relationship between movement amount components in a Z axis direction and an X axis direction of an amount of movement of a viewpoint and an amount of movement of a pixel of an original image in response to the movement of the viewpoint in the embodiment 2.

Now, a technology of the original image operation unit 254 for calculating an image reference vector in the present embodiment is described. FIG. 58 is a view illustrating a relationship between movement amount components of the amount of movement of the viewpoint in the Z axis direction and the X axis direction and the amount of movement of the pixels of the original image in response to the movement amount components. In FIG. 58, the viewpoints after movement by −z_off in the Z axis direction and x_off in the X axis direction from the viewpoints 88*a* and 88*b* in the state depicted in FIG. 5 are depicted represented by the viewpoint 332 of the right eye.

In response to this movement, the image screen 76 is moved by −z_off in the Z axis direction as described hereinabove, and an image reference vector is generated for each pixel on the plane of the image screen 76. The image screen after the movement is hereinafter referred to as "map screen" 334. The image reference vector is information representative of a correspondence relationship of pixels when the object 78 in the virtual space looks fixed when the original image is viewed from the viewpoint 88*b* and when the map screen 334 is viewed from the viewpoint 332 after the movement. For example, if a picture that looks at the position ixR in the X axis direction of the original image for the right eye as viewed from the viewpoint 88*b* is moved to the position txR on the map screen 334 and is viewed from the viewpoint 332, then the object 78 looks fixed.

It is to be noted that a point of intersection between a line in the Z axis direction passing the midpoint of a line segment interconnecting the viewpoints 88*a* and 88*b*, which becomes a base point, and the image screen 76 is determined as an origin O of the image irrespective of whether the image is for the left eye or the right eye. Further, a movement of the viewpoint 88*b* in the Z axis direction is extracted and studied. At this time, by translating, while the relationship between the viewpoint 88*b* and the image screen 76 is maintained, them by x_off in the negative direction of the Z axis, a viewpoint 330 and a map screen 334 after the movement are obtained. In the meantime, since the object 78 is fixed, the line of sight in viewing them substantially moves in the X axis direction by the movement of the viewpoint in the Z axis direction. The amount of movement at this time is represented by gx.

From the similarity of triangle, $b:gx=Scp:z\_off$.

Accordingly, the movement amount gx is determined in the following manner.

$gx=b*z\_off/Scp$

On the other hand, the position ixR2 on the map screen 334 corresponding to the position ixR on the image screen 76 by the movement of the screen by z_off is determined in the following manner.

$ixR-ixR2:z\_off=b:Scp$

Therefore, $ixR2=ixR-b*z\_off/Scp=ixR-gx$.

If the movement amount x_off in the X axis direction to the final viewpoint 332 is taken into consideration for gx described above, then the movement amount dx2 from the position ixR2 on the map screen 334 is determined in the following manner.

$dx2:x\_off+gx=Zp-z\_off:Scp+Zp-z\_off$

Therefore, $dx2=(x\_off+gx)*(Zp-z\_off)/(Scp+Zp-z\_off)$.

If the position txR on the map screen 334 corresponding to the position ixR on the image screen 76 by the movement of the viewpoint by z_off and x_off is represented using dx2 described above, then the following expression is obtained.

$txR=ixR2+dx2=ixR-gx+dx2$

In particular, the difference between txR and ixR relies upon the position of the picture of the object on the original image, the parallax value of the object given to the original image (or the distance to the image screen), and the amount of movement of the viewpoint.

Also to the movement of the viewpoint of the left eye, similar calculation can be applied in the following manner.

$gx=a*z\_off/Scp$ $ixL2=ixL+gx$ $dx2=(x\_off-gx)*(Zp-z\_off)/(Scp+Zp-z\_off)$ $txL=ixL2+dx2=ixL+gx+dx2$ Here, ixL, ixL2, and txL are the position in the horizontal direction in the original image for the left eye on the image screen 76, the corresponding position when the image screen is moved by z_off and the position on the map screen 334 for causing the object 78 not to be changed even if the left viewpoint moves by z_off and x_off, individually.

Figure 59:
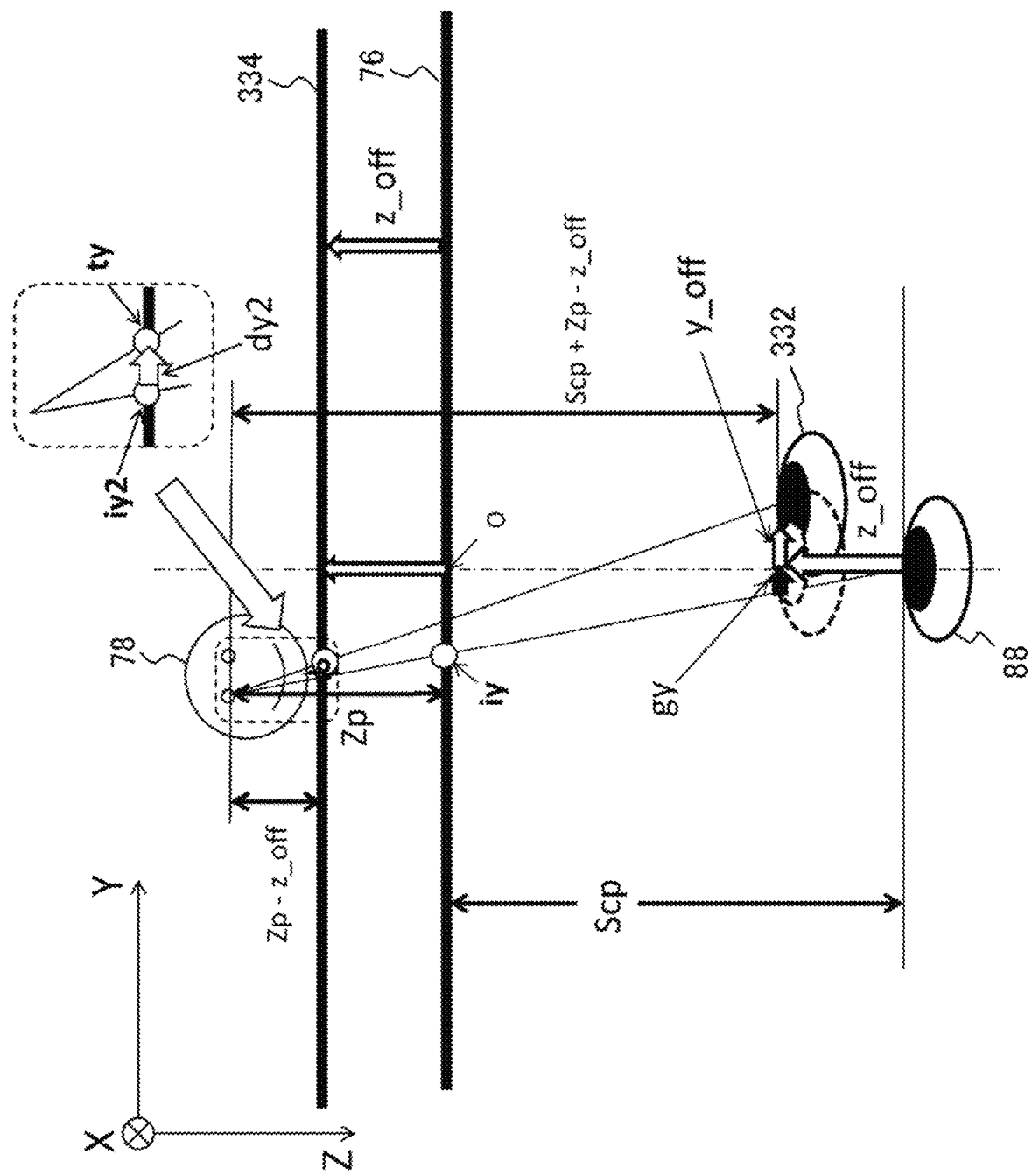
FIG. 59 is a view illustrating a relationship between movement amount components in a Z axis direction and a Y axis direction of an amount of movement of a viewpoint and an amount of movement of a pixel of an original image in response to the movement of the viewpoint in the embodiment 2.

FIG. 59 is a view illustrating a relationship between movement amount components in the X axis direction and the Y axis direction of the amount of movement of the viewpoint and an amount of movement of pixels of the original image according to the movement of the viewpoint. The directions of the coordinate axes are different from those in FIG. 58 and the axis of abscissa of FIG. 59 is the Y axis. In short, since the relationship is a state when the virtual space is viewed from sidewardly, the viewpoints 88 of both eyes overlap to one. The calculation technique is basically similar to that described hereinabove with reference to FIG. 58. In particular, the picture visible at the position iy in the Y axis direction of the original image on the image screen 76 is moved to the position ty on the map screen 334 such that the object 78 looks fixed.

In FIG. 59, a figure in the proximity of ty is depicted in an enlarged scale separately. First, the movement amount gy of the line of sight in the Y axis direction by movement of the viewpoint 88 by −z_off in the Z axis direction is determined in the following manner.

$gy=-iy*z\_off/Scp$

The reason why the negative sign is applied is that, in the example depicted, iy is in the negative region below the origin O. On the other hand, the position iy2 on the map screen 334 corresponding to the position iy on the image screen 76 by the movement of the screen by z_off is determined in the following manner.

$iy2=iy-iy*z\_off/Scp=iy+gy$

Although this arithmetic operation includes division, since Scp is a constant, the division may be executed only once for the entire processing.

If the movement amount y_off in the Y axis direction toward the final viewpoint 332 is further taken into consideration to gy described hereinabove, then the movement amount dy2 from the position iy2 on the map screen 334 is given in the following manner.

$dy2=(y\_off+gy)*(Zp-z\_off)/(Scp+Zp-z\_off)$

If the position ty on the map screen 334 corresponding to the position iy on the image screen 76 by the movement of the viewpoint by z_off and y_off is represented using dy2 described above, then the following expression is obtained.

$ty=iy2+dy2=iy+gy+dy2$

This calculation is same for both of the left and right images. It is to be noted that it is pointed out that division by (Scp+Zp−z_off) in the arithmetic operation of dy2 corresponds to perspective division in a common perspective transformation process.

In this manner, a correspondence relationship between the position (tx, ty) on an image reference vector map and the position (ix, iy) on an original image according to components (x_off, y_off, z_off) of an amount of movement of a viewpoint can be derived by a small amount of arithmetic operation. It is to be noted that the positions txR and txL in the X direction of the left and right images are collectively referred to as tx, and ixR and ixL are collectively referred to as ix.

Figure 60:
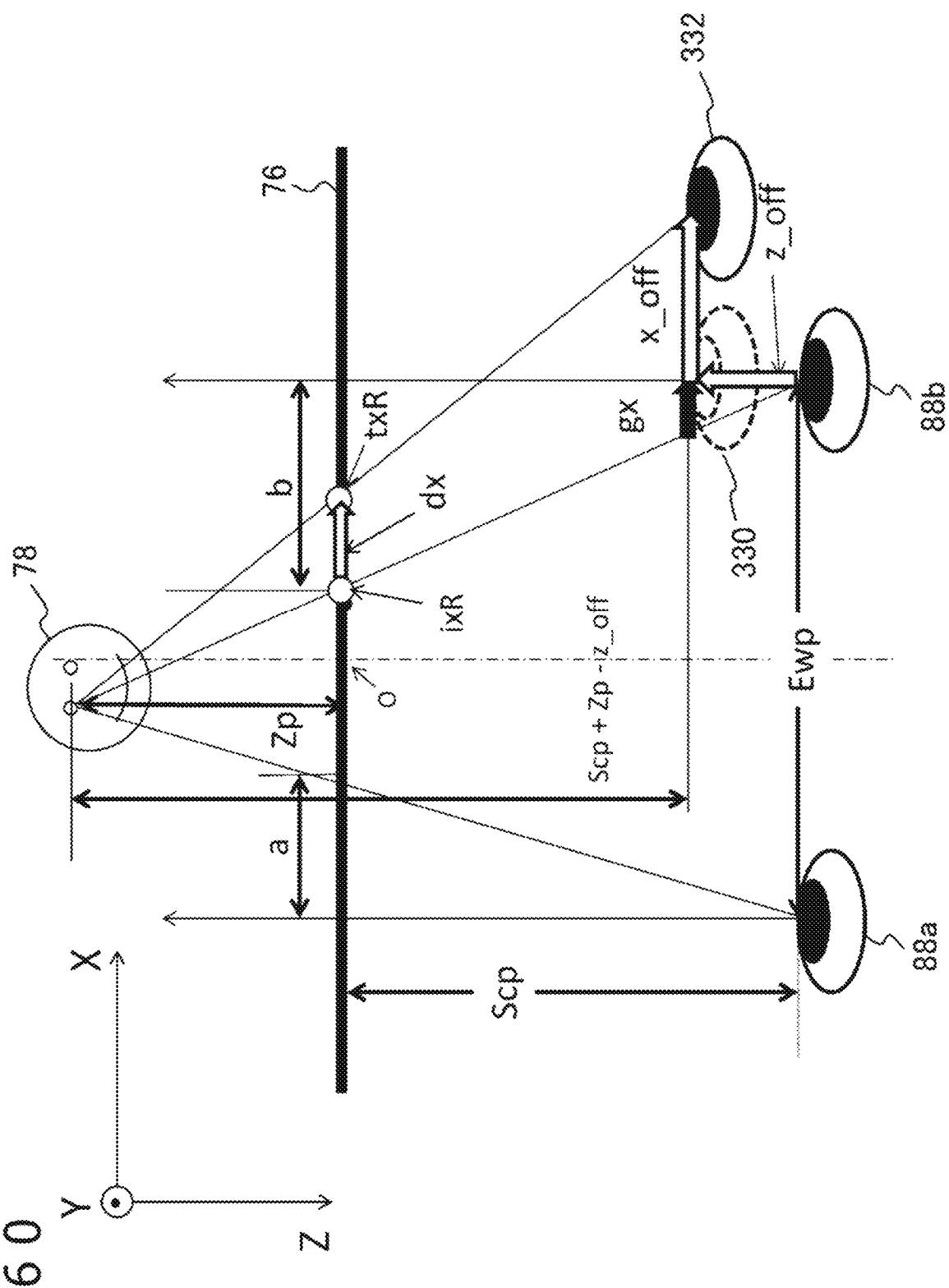
FIG. 60 is a view illustrating an amount of movement of a pixel in the case where an image screen is not moved in the embodiment 2.

Here, also a case in which the map screen is not moved from the image screen 76 of the original image is exemplified. FIG. 60 is a view illustrating an amount of movement of a pixel in the case where the image screen 76 is not moved in response to movement of a viewpoint similar to that in FIG. 58. In particular, the viewpoint moves by −z_off in the Z axis direction and by x_off direction in the X axis direction. At this time, for example, if the picture visible at the position ixR in the X axis direction of the original image for the right eye as viewed from the viewpoint 88b is moved to the position txR on the same image screen 76 and is viewed from the viewpoint 332, the object 78 looks fixed.

The movement amount gx of a pixel by the movement of the viewpoint in the Z axis direction is given in the following manner similarly as in FIG. 58.

$$gx=b*z\_off/Scp$$

Further, if the movement amount x_off in the X axis direction toward the final viewpoint 332 is taken into consideration, then the movement amount dx from the position ixR on the image screen 76 is determined in the following manner.

$$dx:x\_off+gx=Zp:Scp+Zp-z\_off$$

Therefore, $$dx=(x\_off+gx)*Zp/(Scp+Zp-z\_off).$$

If the position txR after movement of the position ixR on the image screen 76 by movement of the viewpoint by z_off and x_off is represented using dx described above, then it is given in the following manner.

$$txR=ixR+dx$$

Also in regard to the movement of the viewpoint of the left eye and the movements in the Z axis direction and the Y axis direction, the positions can be calculated readily by transforming the calculation technique described above for moving the image screen.

In order to determine an image reference vector, it is further necessary to take pixel divisions of both images into consideration. FIG. 61 schematically depicts a correspondence relationship between divisions and positions of pixels in an original image and an image reference vector map. As regards a lattice depicted in FIG. 61, (a) represents pixel divisions in the original image, and (b) represents pixel divisions of an image reference vector map. It is assumed that the position coordinates of the center of each pixel in the pixel divisions are represented by integral values such as (0, 0), (1, 0), (2, 0), . . . . Where (ix, iy) in the original image are such integral values as depicted in (a), (tx, ty) calculated by the foregoing in most cases have decimal values. In other words, (tx, ty) are frequently displaced from the center of a pixel of the image reference vector map.

Therefore, as depicted in (b), the position (tx, ty) of the end point obtained in such a manner as described above is rounded to integral values (tx', ty'), and a vector in the opposite direction whose start point is given by (tx', ty') is determined as image reference vector V. In particular, the image reference vector V (inv_x, inv_y) to be associated with a pixel having a pixel center at (tx', ty') is given in the following manner.

$$tx'=(int)(tx+0.5)$$

$$ty'=(int)(ty+0.5)$$

$$inv\_x=(float)ix-tx$$

$$inv\_y=(float)iy-ty$$

By this, most of the end points (ix', iy') of the image reference vectors V are displaced from the center of a pixel of the original image. Even in this case, by going through such processes as interpolation of an image reference vector based on the position on a map sampled upon drawing of a display image and interpolation of a color value based on the position on an original image indicated by the image reference vector, an image of high picture quality by subpixel accuracy can be displayed. A process relating to drawing in which an image reference vector is referred to is hereinafter described. It is to be note that a vector whose start point is (ix, iy) and whose end point is (tx, ty) is referred to as "displacement vector."

Figure 62:
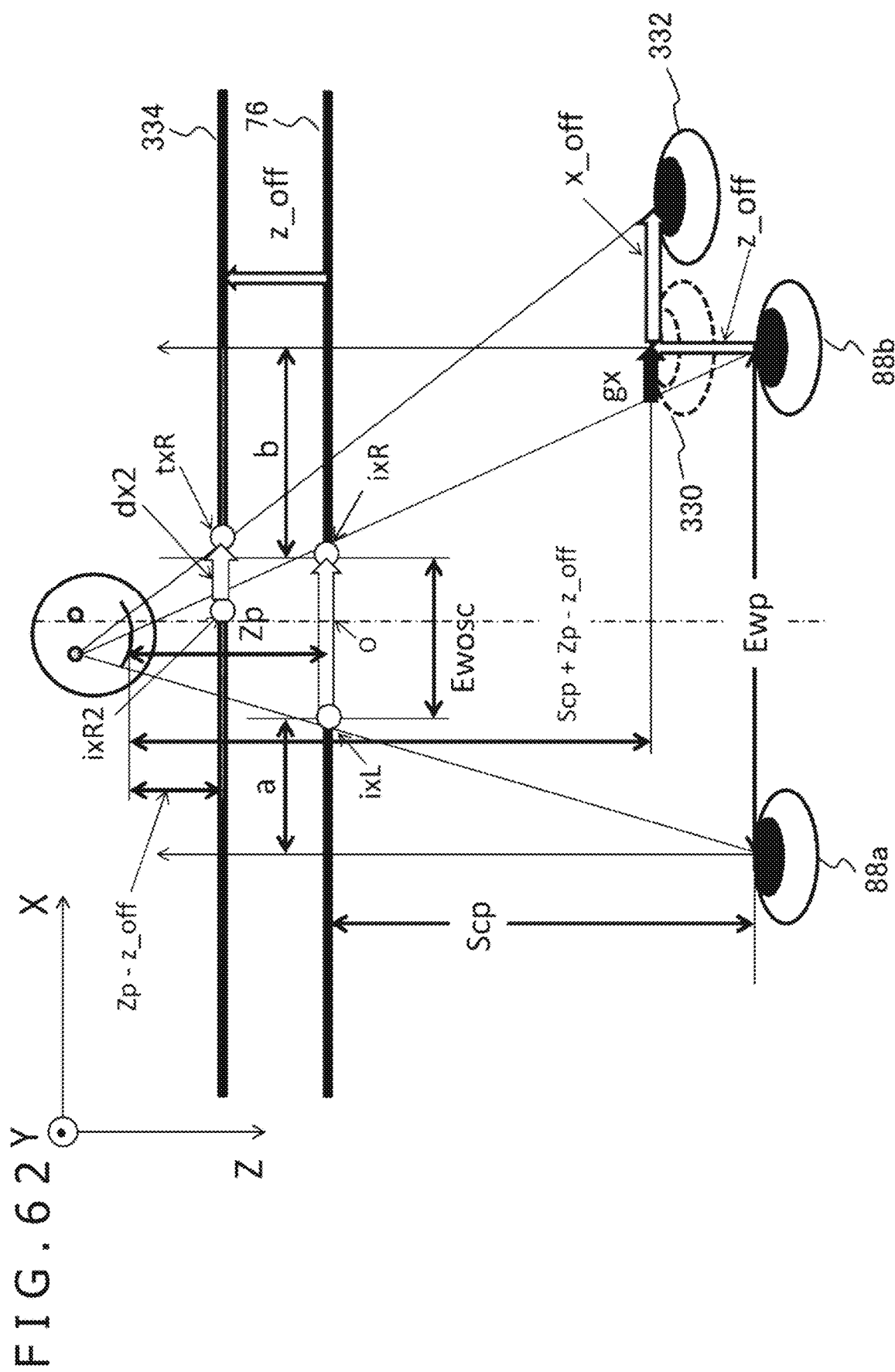
FIG. 62 is a view illustrating a relationship between movement amount components in the Z axis direction and the X axis direction of an amount of movement of a viewpoint and an amount of movement of a pixel when an original image for the left eye is referred to in an image reference vector map for the right eye in the embodiment 2.

Now, a calculation method in the case where cross reference of a parallax image is applied in the present embodiment is described. FIG. 62 is a view illustrating a relationship between movement amount components in the Z axis direction and the X axis direction from within an amount of movement of a viewpoint and an amount of movement of pixels when an original image for the left eye is referred to in an image reference vector map for the right eye. Although the way of thinking upon calculation is similar to that depicted in FIG. 58, this is different in that the position ixL in the image for the left eye corresponding to ixR that is an original start point becomes a start point.

In particular, if attention is paid to the movement of the viewpoint of the right eye similarly as in FIG. 58, then the position txR on the map screen 334 corresponding to the position ixR on the image screen 76 by movement of the viewpoint by z_off and x_off is given by $$txR=ixR2+dx2=ixR-gx+dx2$$

as described hereinabove. The position ixR on the original image for the right eye and the position ixL of the original image for the left eye corresponding to the position ixR have the following relationship.

$$ixR=ixL+Ewosc$$

Here, Ewosc is given from the distance Ewp between the viewpoints 88a and 88b and the parallax Dp=a+b in the original image by the following expression.

$$Ewosc=Ewp-Dp$$

As a result, txR is determined, if the position ixL on the original image for the left eye is a start point, in the following manner.

$$txR=ixL+Ewosc-gx+dx2$$

It is to be noted that the parallax Dp used for calculation of Ewosc is a value given to the pixels of the original image for the left eye and held by the parallel value image for the left eye. The parallax can be calculated similarly also in regard to a movement of the viewpoint of the left eye. In particular, since the position txL on the map screen 334 corresponding to the position ixL on the image screen 76 is $$txL=ixL2+dx2=ixL+gx+dx2$$

if the position ixR on the original image for the right eye is a start point, then the position txL is given by $$txL=ixR\text{-}Ewosc+gx+dx2$$

It is to be noted that the parallax Dp used for calculation of Ewosc is a value given to the pixels of the original image for the right eye and held by the parallel value image for the right eye. In regard to movement of the position in the Y axis direction by movement of the viewpoint, the position ty is given, similarly as in the case where cross reference is not involved, by the following expression.

$$ty=iy2+dy2=iy+gy+dy2$$

By the calculation described above, an image reference vector can be set for each pixel of the image reference vector map similarly as in the case where cross reference is not involved. It is to be noted that, also in the present embodiment, the cross reference flag may be set similarly as in the embodiment 1 on the basis of the parallax value image. Although the foregoing is a technique for cross reference between the left and right original images, by separately acquiring original images whose viewpoints are on the outer sides of the left and right cameras when the original images are acquired, also it is possible to supplement pixels that cannot be supplemented by cross reference between the initial left and right original images. Here, a technique that uses an original image acquired from a viewpoint on the outer side as a reference destination is referred to as extended reference.

Figure 63:
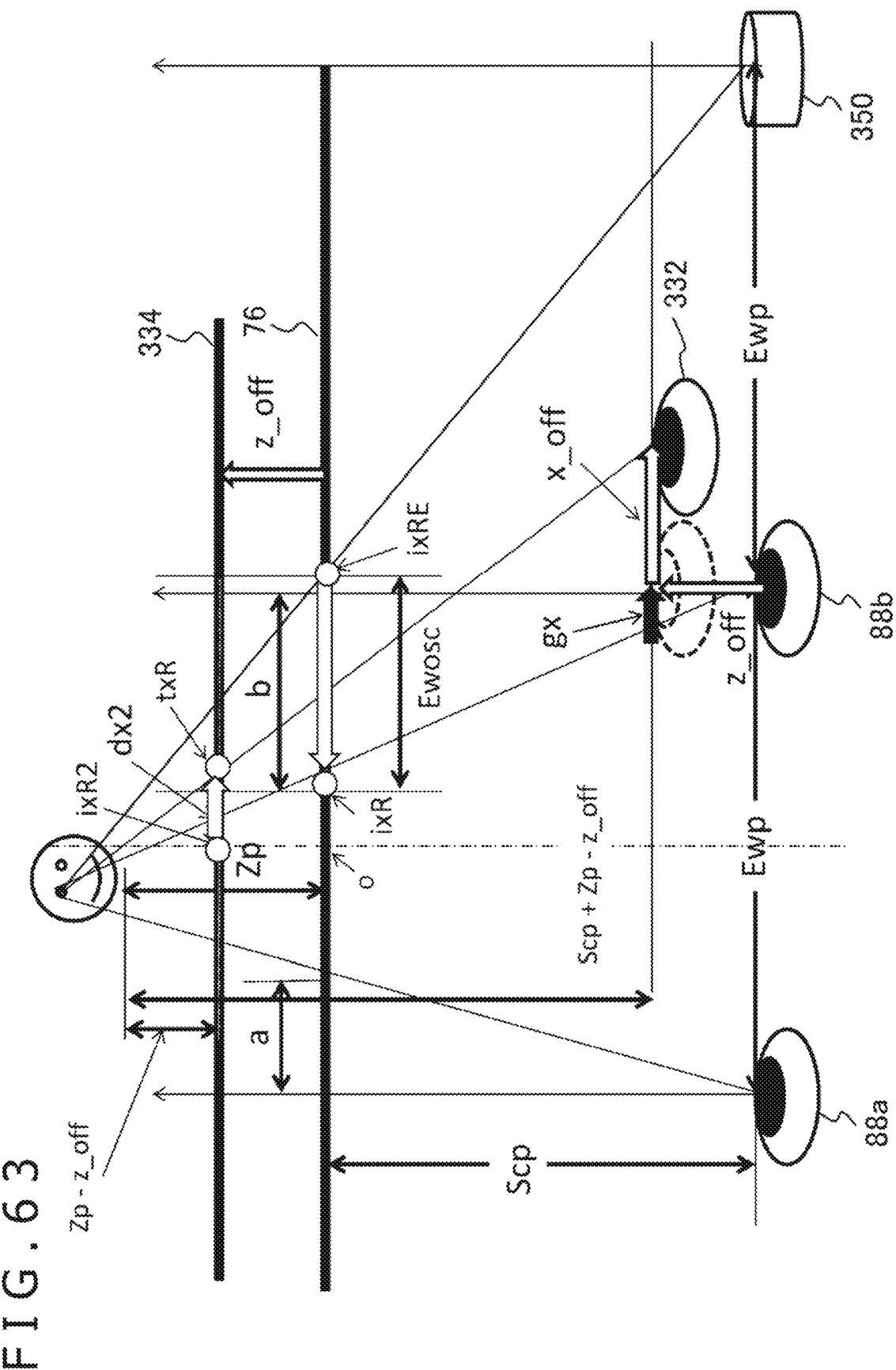
FIG. 63 is a view illustrating a calculation technique of an image reference vector in extended reference in the embodiment 2.

FIG. 63 is a view illustrating a calculation technique for an image reference vector according to extended reference. In this example, a camera 350 is set in a spaced relationship by a distance Ewp on the right side from the right viewpoint 88b from between the viewpoints 88a and 88b supposed when the initial left and right original images are acquired such that a third original image is acquired. Then, if it becomes necessary as a result of movement of the viewpoint to perform drawing in regard to a portion that is a blind spot from the viewpoint 88b and is not represented by the original image for the right eye, then an image reference vector is set so as to refer to the third original image. Although the way of thinking upon calculation is similar to that in the case of cross reference depicted in FIG. 62, in place of the start point at ixL in the original image for the left eye, a corresponding position ixRE on the third original image is determined as a start point.

In particular, if attention is paid to the movement of the viewpoint of the right eye similarly as in FIG. 62, then the position txR on the map screen 334 corresponding to the position ixR on the image screen 76 by the movement of the viewpoint by z_off and x_off is $$txR=ixR2+dx2=ixR\text{-}gx+dx2$$

as described hereinabove. The position ixR on the original image for the right eye and the position ixRE of the third original image corresponding to the original image for the right eye have the following relationship.

$$ixR=ixRE\text{-}Ewosc$$

Here, Ewosc is given, from the distance Ewp between the viewpoints and the parallax Dp corresponding to the pixel at the position ixRE in the parallax value image generated corresponding to the third original image, in the following manner.

$$Ewosc=Ewp\text{-}Dp$$

As a result, txR is determined, if the position ixRE on the third original is a start point, in the following manner.

$$txR=ixRE\text{-}Ewosc\text{-}gx+dx2$$

Also in the case where a fourth original image is acquired by a camera provided further on the left side with respect to the left viewpoint 88a and is referred to upon drawing of a display image for the left eye, similar calculation can be applied. In particular, since the position txL on the map screen 334 corresponding to the position ixL on the image screen 76 is given by $$txL=ixL2+dx2=ixL+gx+dx2$$

if the position ixLE on the fourth original image is a start point, then the position ixLE is determined by $$txL=ixLE+Ewosc+gx+dx2.$$

The movement of the position in the Y axis direction by the viewpoint movement is, similarly as in the case where cross reference is not involved, such as given below.

$$ty=iy2+dy2=iy+gy+dy2$$

By the calculation given above, an image reference vector can be set for each pixel of the image reference vector map.

Since an original image to be used for extended reference has luminance information from a viewpoint different from those of the original images for the right eye and the left eye, basically it is natural to set the priority degree for display lower than those of the original images for the right eye and the left eye. In particular, for a region in which an image reference vector whose reference destination is the original image from a viewpoint same as that of the image reference vector map or an image reference vector for cross reference is set, an image reference vector for extended reference is not written irrespective of the Z value. It is to be noted that, although also it is possible to set an equivalent element to the credibility degree flag in cross reference viewing, in many cases, it is considered that the necessity for this is low.

After the image reference vectors are acquired by the calculation described above, the data are written into the image reference vector map. Along with this, a Z buffer process is performed using the Z values obtained when the image reference vectors are calculated, and Z values comparatively near to the viewpoints are written and stored into the map. By this process, only one image reference vector is stored for one pixel of the map.

It is to be noted that, although, in the technique for drawing a point group or very small triangles obtained from different viewpoint images on a viewscreen, alpha blend drawing for hiding discontinuity of the luminance between pixels by a difference of a specular reflection component or a transmission component of light or the like, this gives rise to a problem that the resolution of the image degrades or the load of processing increases. According to the present embodiment, by restricting alpha blend between pixels only to pixels on the boundary between different images as hereinafter described, it becomes possible to perform processing at a high speed while keeping the resolution feeling of the initial image.

Further, as described above, an image reference vector is obtained by first determining a displacement vector from a start point given by each pixel of an original image to an end point given by a corresponding position on a map screen determined by movement of a viewpoint and then moving an inverse vector to the displacement vector by a very small amount in accordance with the center of the pixel of an image reference vector map. According to such a procedure as just described, it is conceivable that end points of displacement vectors from start points given by pixels adjacent each other on the original image are spaced away from each other and pixels to which no image reference vector is set (such pixels are hereinafter referred to sometimes as "hole") appear between the end points. This arises from that the movement of the viewpoint expands part of the original image on the pixel level and so forth. Therefore, the original image operation unit 254 detects such a hole as described above and supplements appropriate image reference vectors.

In order to prevent appearance of such a hole as described above, it is conceivable to represent an image by very small triangles and perform a rasterization process for each triangle. However, rasterization of very small triangles is high in load of processing also in graphics hardware at present and frequently makes a bottle neck to the entire processing. Therefore, in the present embodiment, the rasterization process of very small triangles is omitted to implement interpolation for a hole by a small amount of arithmetic operation.

From a similar reason, interpolation is performed also in regard to the Z buffer. Here, the Z buffer is required in a generation process of an image reference vector map. For example, in the case where a plurality of pixels of an original image correspond to positions in same pixels of the image reference vector map, a correspondence relationship closer to the viewpoint is adopted by a Z test thereby to set appropriate image reference vectors to the pixels. The Z value is determined for each pixel of the original image from a parallax value image corresponding to the original image. It is to be noted that, as described hereinabove, the Z value is used also for calculation of a displacement vector when an image reference vector is determined.

Figure 64:
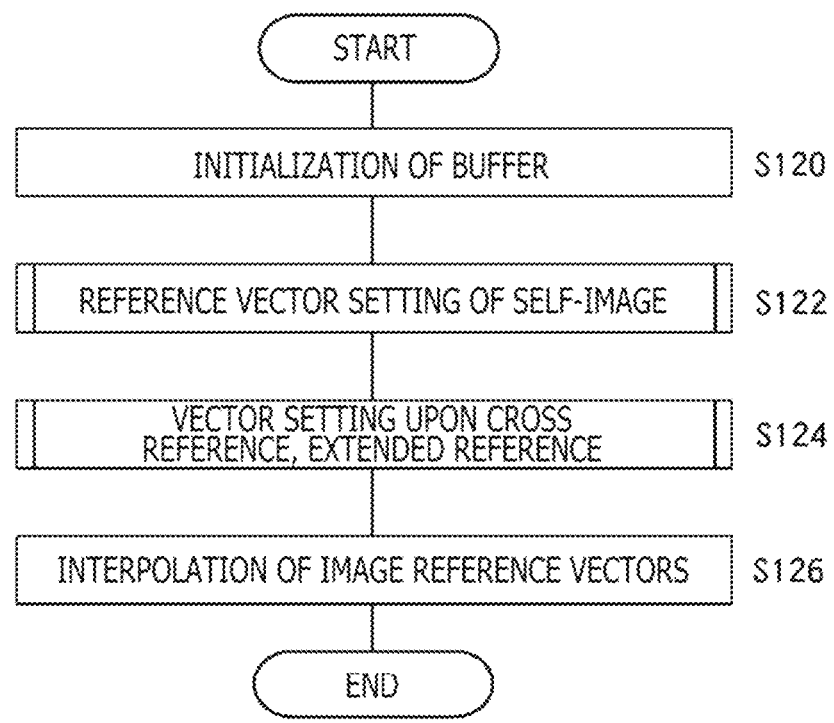
FIG. 64 is a flow chart depicting a processing procedure in which the original image operation unit generates an image reference vector map at S12 of FIG. 7.

FIG. 64 is a flow chart depicting a processing procedure of the original image operation unit 254 for generating an image reference vector map at S12 of FIG. 7. First, the original image operation unit 254 initializes the Z buffer and the buffer for an image reference vector map (S120). Then, the original image operation unit 254 sets image reference vector vectors whose reference destination is a self-image (S122). Here, the self-image points, in regard to the map for the right eye, to the original image for the right eye and points, in regard to the map for the left eye, to the original image for the left eye. Then, the original image operation unit 254 sets image reference vectors whose reference destination is an original image other than the self-image by cross reference and extended reference (S124).

In the processes at S122 and S124, writing into the Z buffer and interpolation of image reference vectors are performed in parallel. In those processes, interpolation of an image reference vector is not performed. Then, a hole of the image reference vectors is interpolated (S126). The processes depicted in FIG. 64 are performed in regard to both the left eye and the right eye to complete image reference vector maps for both eyes. It is to be noted that, since no object exists at pixels in which no data is held in the parallax value image, an image reference vector that points to such pixels does not exist either. As a result, the image reference vector maps may include a region, in which no image reference vector map exists, on the outer side of a picture of an object or the like.

Figure 65:
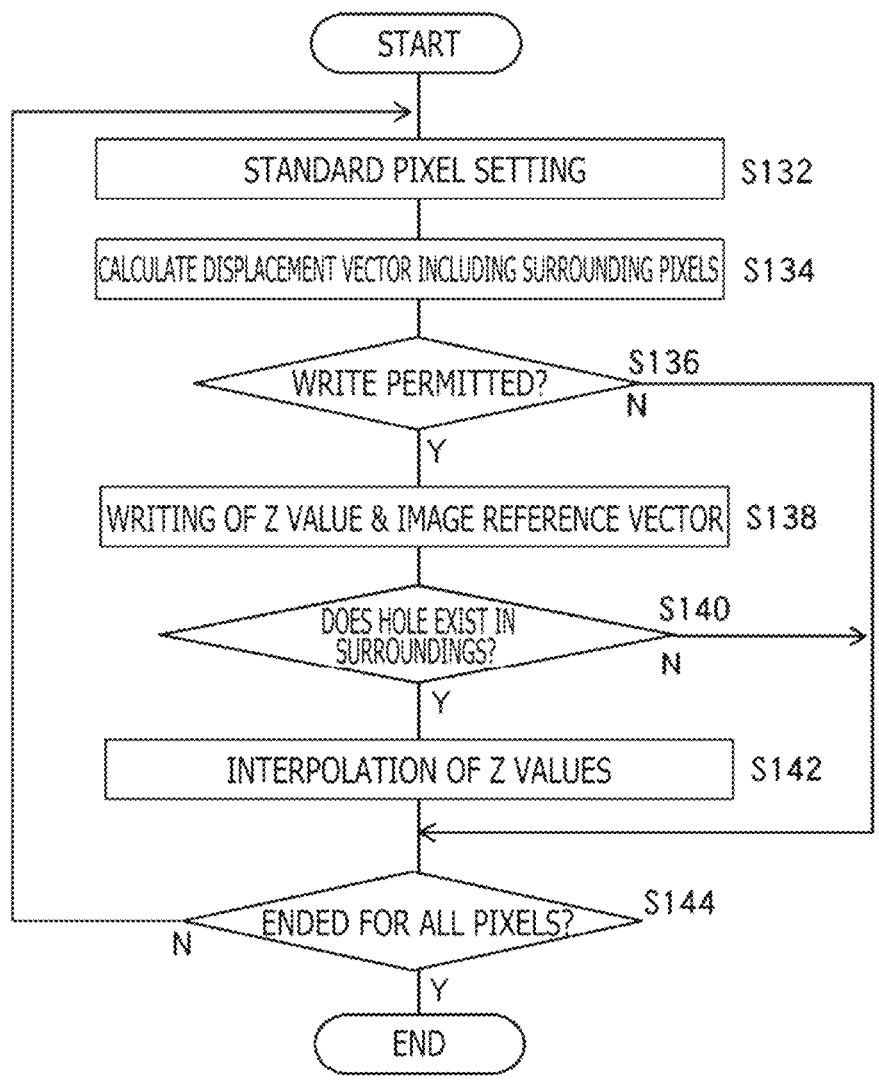
FIG. 65 is a flow chart depicting a processing procedure for setting an image reference vector in which a self-image is made a reference destination at S122 of FIG. 64.

FIG. 65 is a flow chart depicting a processing procedure for setting an image reference vector whose reference destination is a self-image at S122 of FIG. 64. First, one standard pixel is determined in the original image (S132). Then, a displacement vector is calculated in regard to the reference pixel and the center positions of a plurality of reference images adjacent the standard pixel (S134). The displacement vector calculated in regard to an adjacent pixel may be temporarily stored such that it is used when it becomes a standard pixel later. Then, from within the Z buffer configured from a pixel array of the image reference vector map, data of pixels including an end point of the displacement vector whose start point is the standard pixel are confirmed and it is confirmed whether or not a Z value and an image reference vector can be written in (S136).

In the case where a Z value is not written in the pixel previously or in the case where, even if a Z value is written previously, it can be confirmed from the Z value that the data to be written in is nearer to the viewpoint, it is decided that the Z value can be written in (Y at S136). Then, the Z value of the standard pixel is written into the Z buffer and the image reference vectors determined from the displacement vectors are written into the corresponding pixel of the map (S138). If a Z value is written in the same pixel previously, then this is overwritten. It is to be noted that also identification information of an image indicating that the reference destination is the self-image is written into the Z buffer such that the data has higher priority than data of cross reference or extended reference.

Then, it is confirmed whether or not, in the Z buffer, a pixel adjacent the pixels including the end point of the displacement vector of the standard pixel makes a hole, and if the pixel makes a hole, a Z value is supplemented (Y at S140, S142). At this time, also a flag representing that the Z value is a supplemented one is written in simultaneously. An interpolation technique of a Z value is hereinafter described. If it is decided at S136 that writing of data is disabled by comparison with the Z value written in previously, then writing or confirmation of a hole is not performed (N at S136). If no hole is formed by the adjacent pixels at step S140, then it is a matter of course that interpolation of a Z value is not performed (N at S140). A standard pixel is successively set, for example, in the raster order (S132) until all pixels of the original image become a standard pixel (N at S144), and the processes at steps S134 to S142 are repeated. If all pixels become a standard pixel, then the processing is ended (Y at S144).

Figure 66:
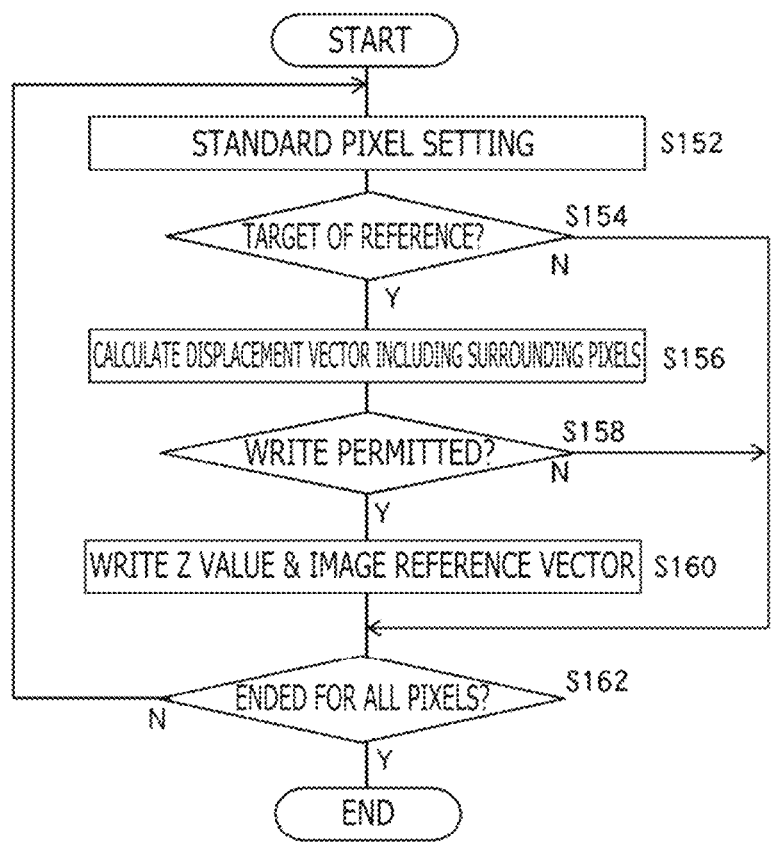
FIG. 66 is a flow chart depicting a processing procedure for setting an image reference vector upon cross reference and extended reference at S124 of FIG. 64.

FIG. 66 is a flow chart depicting a processing procedure for setting an image reference vector upon cross reference and extended reference at S124 of FIG. 64. Although this process is basically similar to that in the case where the self-image is determined as a reference destination described hereinabove with reference to FIG. 65, it is different principally in that calculation of a displacement vector and writing are restrictive and that interpolation of a Z value is not performed. This is because cross reference and extended reference are auxiliary processes for supplementing pixels that cannot be drawn with the self-image and, even if they are simplified to increase the speed, in most cases, a problem does not become obvious. Accordingly, if there is processing time to spare, then an interpolation process of a Z value may be performed similarly to drawing of the self-image. First, one standard pixel is determined in the original image (S152). The self-image here is, in regard to an image reference vector map for the right eye, an image acquired from the original image for the left eye or a viewpoint on the further right side with respect to the right eye. In regard to the image reference vector map for the left eye, the self-image is the original image for the right eye or an image acquired from a viewpoint further on the left side.

Then, in the case where a cross reference flag is generated, it is confirmed from the flag whether or not the standard pixel can become a reference destination (S154). In the case where the standard pixel cannot become a reference destination, a process relating to an image reference vector by which the standard pixel becomes a reference destination is not performed (N at S154). In the case where the standard pixel can become a reference destination (Y at S154), a displacement vector is calculated for the standard pixel and the center positions of a plurality of reference pixels adjacent the standard pixel (S156). Then, data of the pixels including the end point of the displacement vector whose start point is given by the standard pixel are confirmed from the Z buffer, and it is confirmed whether or not a Z value and an image reference vector can be written in (S158).

In this case, if a Z value written previously is that of the self-image, then writing in is disabled. On the other hand, in the case where the Z value written in is set by interpolation, writing in is enabled. Consequently, if legitimate reference to the self-image is enabled, this is prioritized, but in the case where only a Z value is written in by interpolation, cross reference or extended reference is prioritized. In the case where writing is enabled (Y at S158), then the Z value of the standard pixel is written into the Z buffer and the image reference vector determined from the displacement vector is written into the corresponding pixel of the map (S160).

Along with this, identification information of the image is written also into the Z buffer and the image reference vector map such that it can be recognized which image the original image to be referred to is other than the self-image. If it is decided at step S158 that writing is disabled, then writing is not performed (N at S158). A standard pixel is successively set, for example, in the raster order (S152) until all pixels of the original image have become a standard pixel (N at S162), and the processes at S154 to S160 are repeated. If all pixels have become a standard pixel, then the processing is ended (Y at S162).

Now, an interpolation process of a Z value is described. It is to be noted that the interpolation process for a Z value and an image reference vector is preconditioned such that the size of a hole is at most one pixel. In the present embodiment, since it is supposed that the planes of the original image and the image reference vector map extend in parallel and the resolutions of them are comparable with each other, such a precondition as described above may be applied. In interpolation of a Z value, a hole for interpolation is specified first as depicted at S140 of FIG. 65. Qualitatively, adjacent pixels in the original image are extended on the image reference vector map to increase the distance therebetween, and a state in which, where a pixel of the map is taken as a unit, a gap corresponding to one pixel appears is detected.

Figure 67:
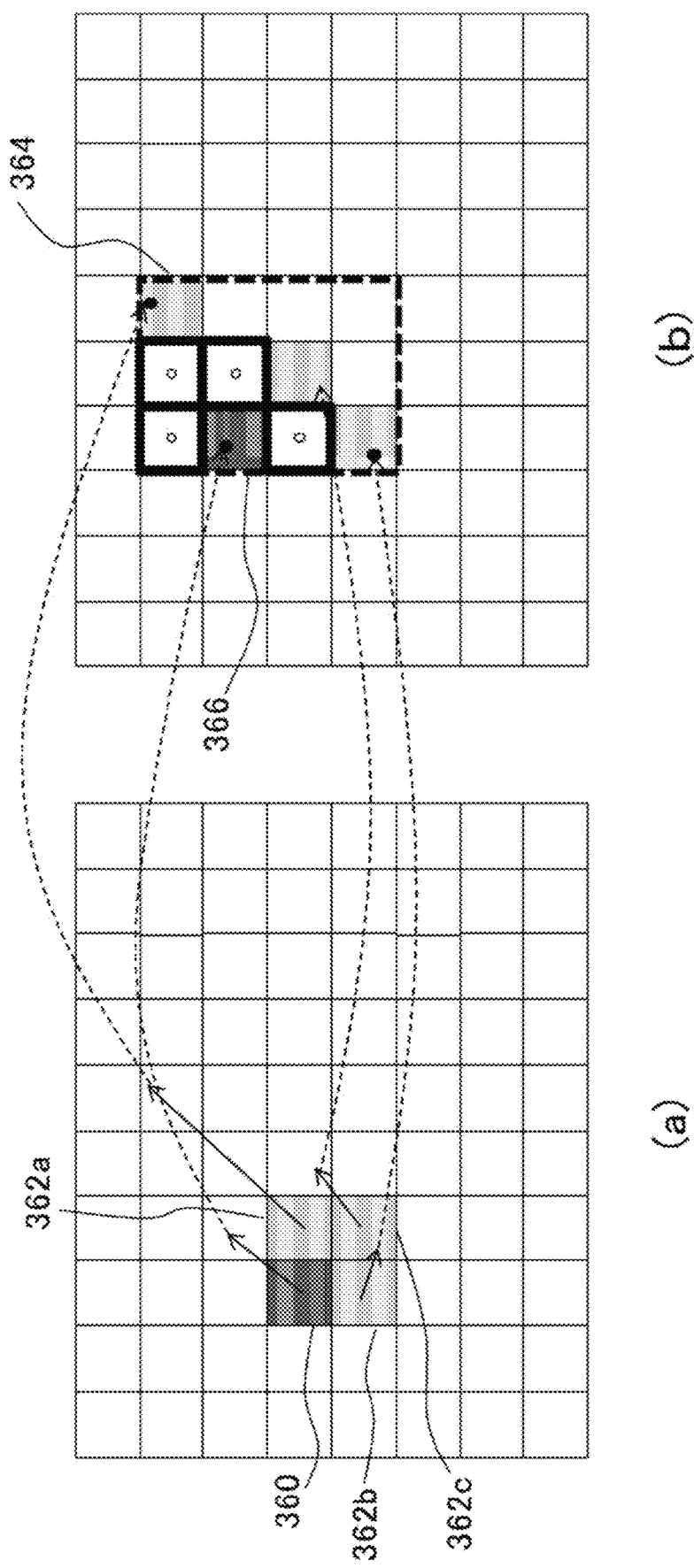
FIG. 67 is a view schematically depicting an example of a relationship between a pixel center of an original image and a corresponding position on an image reference vector map in the embodiment 2.

FIG. 67 schematically depicts an example of a relationship between the center of a pixel of the original image and the corresponding position on the image reference vector map. As regard a lattice depicted in FIG. 67, (a) represents pixel divisions in the original image, and (b) represents pixel divisions of an image reference vector map. If displacement vectors are determined which have start points at the centers of four shaded pixels depicted in (a) are determined, then they becomes such, for example, as indicated by solid line arrow marks. At pixels that include the end of the arrow marks, image reference vectors directed in the opposite direction to the arrow marks are set.

In this example, since the four shaded pixels depicted in (b) include the end point of the displacement vectors as indicated by correspondence relationships represented by broken line arrow marks, image reference vectors can be set without the necessity for interpolation. In such a situation as just described, a pixel indicated by a thick shadow is set as standard pixel 360. Further, the right, lower, and right lower pixels with respect to the standard pixel 360 are reference pixels 362a, 362b, and 362c, respectively. Then, the positions on the image reference vector map pointed to by displacement vectors whose start point is given by the centers of the pixels are specified.

A region 364 of a minimum pixel matrix including the positions of the standard pixel 360 and the three points corresponding to rightwardly and downwardly adjacent reference pixels 362a and 362b is determined. From within the region 364, a pixel that is positioned adjacent the standard pixel 360 and does not include the positions corresponding to the standard pixel 360 and the reference pixels 362a, 362b, and 362c is determined as a hole in which a Z value is to be interpolated. In the case of FIG. 67, pixels surrounded by thick frames are extracted. It is to be noted that, since there is the possibility that accurate values may be written into such pixels from different standard pixels or interpolation values may not be written in by a Z test, strictly the pixels are candidates for a pixel to be interpolated.

Thereafter, a Z value is supplemented into the determined pixel as indicated by S142 of FIG. 65. Although it is conceivable that, as the simplest method, the pixel is interpolated by an average value or the like of the Z values of adjacent pixels, averaging may possibly cause such a situation that an article initially existing behind the pixel may become visible and represented. Such a risk as just described may be high at a location at which a sudden change occurs with the Z value at a profile portion of an object or the like. Accordingly, the Z value to be supplemented is adjusted in response to the magnitude of the change of the Z value from surrounding pixels from which a Z value is obtained. Qualitatively, the Z value is adjusted such that the distance from the viewpoint increases as the difference from surrounding pixels increases.

Taking FIG. 67 as an example, Z values at the standard pixel 360 and the reference pixels 362a, 362b, and 362c positioned rightwardly, downwardly, and rightwardly downwards with respect to the standard pixel 360 are calculated upon calculation of a displacement vector on the basis of the parallax value image. The Z value of the standard pixel 360 is represented by Zsc0, and the Z values of the reference pixels 362a, 362b, and 362c are represented by Zsc1, Zsc2, and Zsc3, respectively.

From within the image reference vector map, to the pixel 366 including the position corresponding to the standard pixel 360, Zsc0 obtained in regard to the standard pixel 360 is given as the Z value. To a pixel in a thick line frame that is positioned adjacent the pixel 366 and is determined as a pixel to which a Z value is to be interpolated, a Z value obtained by adjusting Zcs0 in such a manner as described above is given. Zsafe that is the Z value after the adjustment is calculated, for example, in the following manner.

$$Zsafe = Zsc0 + |Zsc1 - Zsc0| + |Zsc2 - Zsc0| + |Zsc3 - Zsc0|$$

or $$Zsafe = Zsc0 + \max(|Zsc1 - Zsc0| + |Zsc3 - Zsc0|, |Zsc2 - Zsc0| + |Zsc3 - Zsc0|)$$

It is to be noted that the coordinate axis for the Z value is taken such that the Z value increases in value in accordance with the distance from the viewpoint. By such calculation, even in the case where the Z value of a pixel around the standard pixel is very high in comparison with the Z value (Zsc0) of the standard pixel, the Z value to be used for filling up a hole can be roughly adjusted to the pixel around the standard pixel, and such a situation that an article behind standard looks unnaturally forwardly is eliminated. By adjusting Zsafe in a direction in which it increases from Zsc0, also it is possible to prevent, even if a wrong pixel is determined as a writing destination by a calculation error or the like, the Z value to be given to the pixel from being overwritten.

Figure 68:
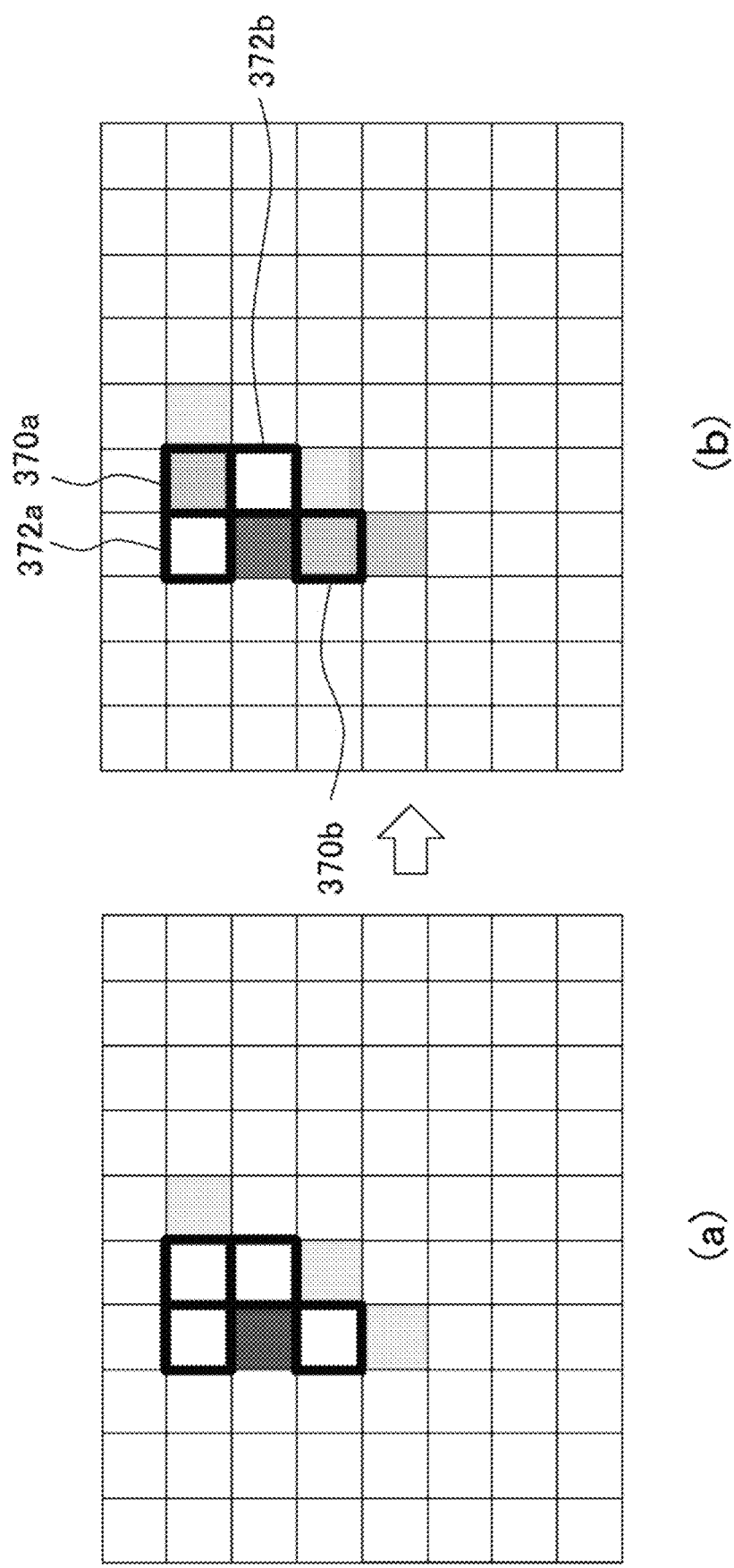
FIG. 68 is a view illustrating a relationship between a pixel that is made an interpolation target of a Z value and a pixel for which cross reference or extended reference is performed.

As described with reference to FIG. 64, after a hole of the Z buffer is filled up at the stage of setting of an image reference vector whose reference destination is the self-image, an image reference vector to be cross referenced or to be extended referenced is set. FIG. 68 is a view illustrating a relationship between a pixel that is made an interpolation target of the Z value and a pixel to be cross referenced or extended referenced. Both of (a) and (b) of FIG. 68 represent a pixel array of an image reference vector map, and (a) corresponds to the view depicted in (b) of FIG. 67. In particular, in a shaded pixel, an original Z value calculated from a parallax value is written, and in a pixel of a thick line frame, an interpolated Z value is written.

However, to those pixels, an image reference vector is not set as yet. If the process of FIG. 66 is started from this state, then there is the possibility that an image reference vector to be cross referenced or extended referenced may be set to a pixel to which a Z value is given by interpolation. Shaded pixels 370*a* and 370*b* from among pixels of a thick line frame in (b) of FIG. 68 are pixels in which data are written in such a manner as just described. After image reference vectors are determined as far as possible including those in the case of cross reference and extended reference by the processes described above, interpolation of an image reference vector is performed for the remaining pixels 372*a* and 372*b*.

Figure 69:
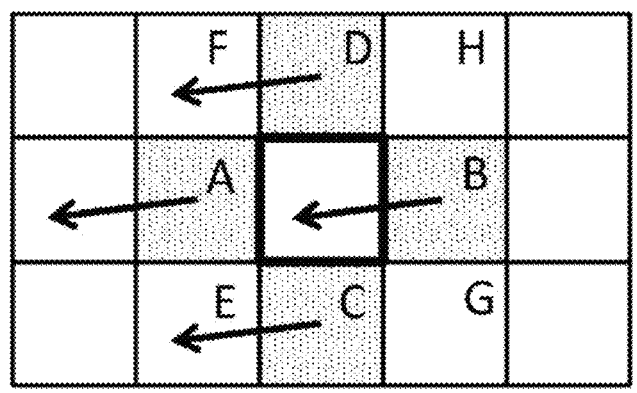
FIG. 69 is a view illustrating an interpolation technique of an image reference vector in the embodiment 2.

An image reference vector to be supplemented is set so as to have a value proximate to those of image reference vectors of surrounding pixels. FIG. 69 is a view illustrating an interpolation technique of an image reference vector. It is assumed that, in a pixel array depicted in FIG. 69, a hole of an image reference vector exists at a pixel surrounded by a thick line frame. In this case, most simply, it is conceivable to interpolate with an average value of image reference vectors set to surrounding pixels. However, it is assumed that an image reference vector to be used for interpolation is that obtained from a displacement vector based on movement of the viewpoint and it is avoided to use a vector obtained by interpolation for further interpolation.

For example, if image reference vectors are given to upper, lower, left, and right pixels (pixels D, C, D, A, B) with respect to the pixel of a thick line frame to be made a target, then an average vector of the four image reference vectors is determined as an image reference vector of the target. Alternatively, the weights may be changed in response to the positions with respect to the pixel of the target to perform averaging. For example, doubled weights are applied to the upper, lower, left, and right pixels (pixels D, C, D, A, B) from among eight surrounding pixels to weighted average the image reference vectors of the eight pixels A to H.

Alternatively, a pixel or weight to be used for interpolation may be determined in response to the directivity of an image reference vector. For example, in the example depicted, all of the image reference vectors of the surrounding pixels are directed close to a horizontal direction. From this, it is estimated that the portion is extended in the horizontal direction from the original image and the hole is generated from this. Accordingly, in this case, from among the pixels around the target, the left and right pixels A and B are used for linear interpolation or higher weights are applied to them in averaging, by which interpolation of high accuracy according to a situation can be implemented.

For example, an average vector of image reference vectors of the four upper, lower, left, and right pixels with respect to the pixel of the target is determined, and when the angle θ defined by the average vector and the horizontal direction (X axis direction) of the image satisfies $-30°<θ<30°$ or $150°<θ<210°$, an average vector of the image reference vectors of the left and right pixels A and B is determined as an image reference vector of the target. When the angle θ satisfies $60°<θ<120°$ or $240°<θ<300°$, the image reference vectors of the upper and lower pixels D and C are averaged to determine an image reference vector of the target vector. When the angle θ is any other angle, the image reference vectors of the upper, lower, left, and right pixels are averaged to determine an image reference vector of the target.

It is to be noted that such various combinations of a threshold value for an angle and a mode of whether a pixel or weight to be used for interpolation is to be changed depending upon the threshold value are conceivable. It is considered that the movement of the head of the user frequently is horizontal movement rather than upward or downward movement and, as a result, also the displacement of pixels is frequently performed in the horizontal direction. Accordingly, image reference vectors of left and right images may always be used for interpolation without performing a decision of an angle as described above to increase the speed of processing while the accuracy is maintained.

In the present embodiment, even if local extension of an image is caused by movement of a viewpoint, selection of a formula based on the directivity is possible by setting a vector as an interpolation target in this manner. Further, since an actual operation for a color value is limited to a stage at which a display image is drawn finally, a bad influence of the interpolation process to be had on the quality of a display image is suppressed. For example, in the case where a color image is interpolated directly without introducing an image reference vector, such adjustment as based on the directivity cannot be performed.

For example, even if a hole is generated as a result of extension in one direction, since the color image does not have information related to this, similar interpolation calculation is performed irrespective of the direction of the extension. As a result, a surplus color is mixed and a bad influence can be provided also to the quality of the display image. From a characteristic that an image reference vector represents movement of a pixel by movement of a viewpoint, a great variation does not occur in a unit of a pixel as depicted in FIG. 69. As a result, even if pixels around a target are used for interpolation irrespective of the directivity, this is less likely to cause a significant error and also degradation of the picture quality by color mixture can be prevented.

It is to be noted that the interpolation technique described above presupposes that a so to speak legitimate image reference vector derived from displacement vector calculation is given to a surrounding pixel. Meanwhile, in the case where a hole is formed from two or more successive pixels, image reference vectors not by interpolation may be searched around the hole such that searched out image reference vectors are used as they are for interpolation. For example, in FIG. 69, a rule for priority ranking in search is used for eight pixels around a target. As an example, such an order as the pixels A, B, C, D, E, F, G, and H may be applied. Then, a search is performed in this order, and an image reference vector not by interpolation that is detected first in the search is adopted as a vector of the target. Whichever interpolation technique is applied, since a color value is not finally determined at the stage of generation of an image reference vector, a color value can be determined finally with position accuracy of a subpixel.

Figure 70:
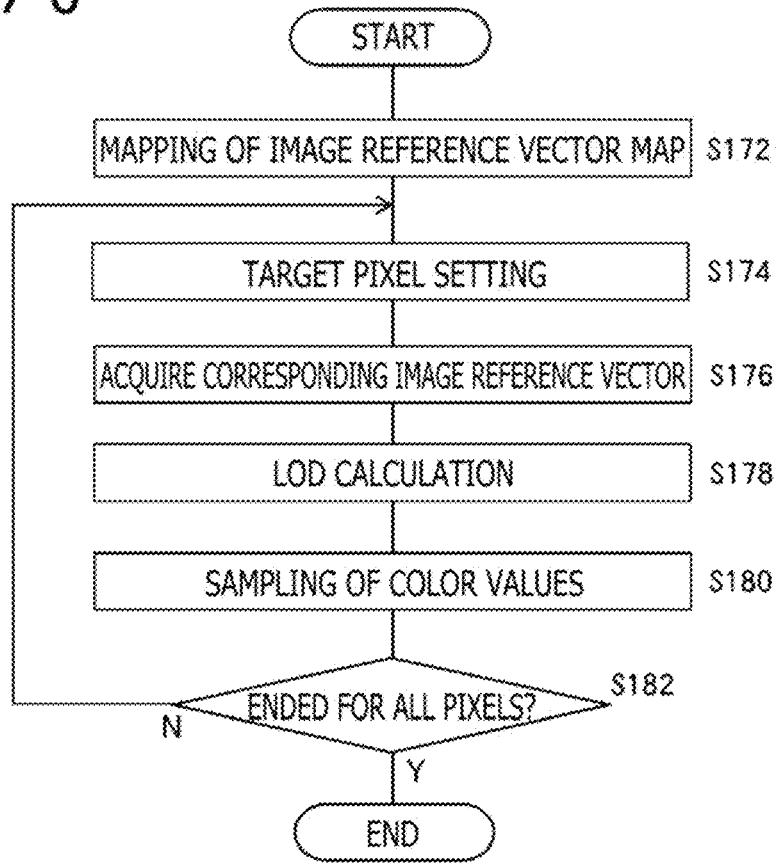
FIG. 70 is a flow chart depicting a procedure in which the display image generation unit generates a display image using an image reference vector map at S14 of FIG. 7.

Now, a technique for generating a final display image using an image reference vector map is described. FIG. 70 is a flow chart depicting a procedure of the display image generation unit 268 for generating a display image using an image reference vector map at step S14 of FIG. 7. First, the display image generation unit 268 acquires the position or the posture of a viewscreen according to the position of the viewpoint or the direction of the line of sight at the current point of time from the viewscreen setting unit 252 and maps an image reference vector map to the acquired position or posture (S172). Then, the display image generation unit 268 sets a target pixel to be drawn (S174).

Then, a sampling point of the image reference vector map corresponding to the target pixel is specified and the image reference vector at the position is acquired (S176). Basically, an interpolation filter is applied to the image reference vectors set to a predetermined number of pixels including the sampling point, for example, four pixels in two rows and two columns to determine the image reference vector at the position. Then, in the case where the original image is a mipmap, an LOD that determines a mipmap level of the reference destination is calculated (S178). At this time, in addition to an LOD obtained when the image reference vector map is mapped to the viewscreen, scaling performed upon conversion from the original image to the image reference vector map is taken into account.

Then, a color value of a position indicated by the image reference vector acquired at S176 in the original image is acquired and a target pixel is drawn (S180). In the case of a mipmap, a color value is acquired from the original image at a level corresponding to the LOD calculated at S178. The processes at S174 to S80 are repeated until after all pixels of the display image are drawn (N at S182). If all pixels are drawn, then the processing is ended (Y at S182). By performing the process depicted in FIG. 70 for both the left and the right, display images for the left eye and the right eye can be generated.

Figure 71:
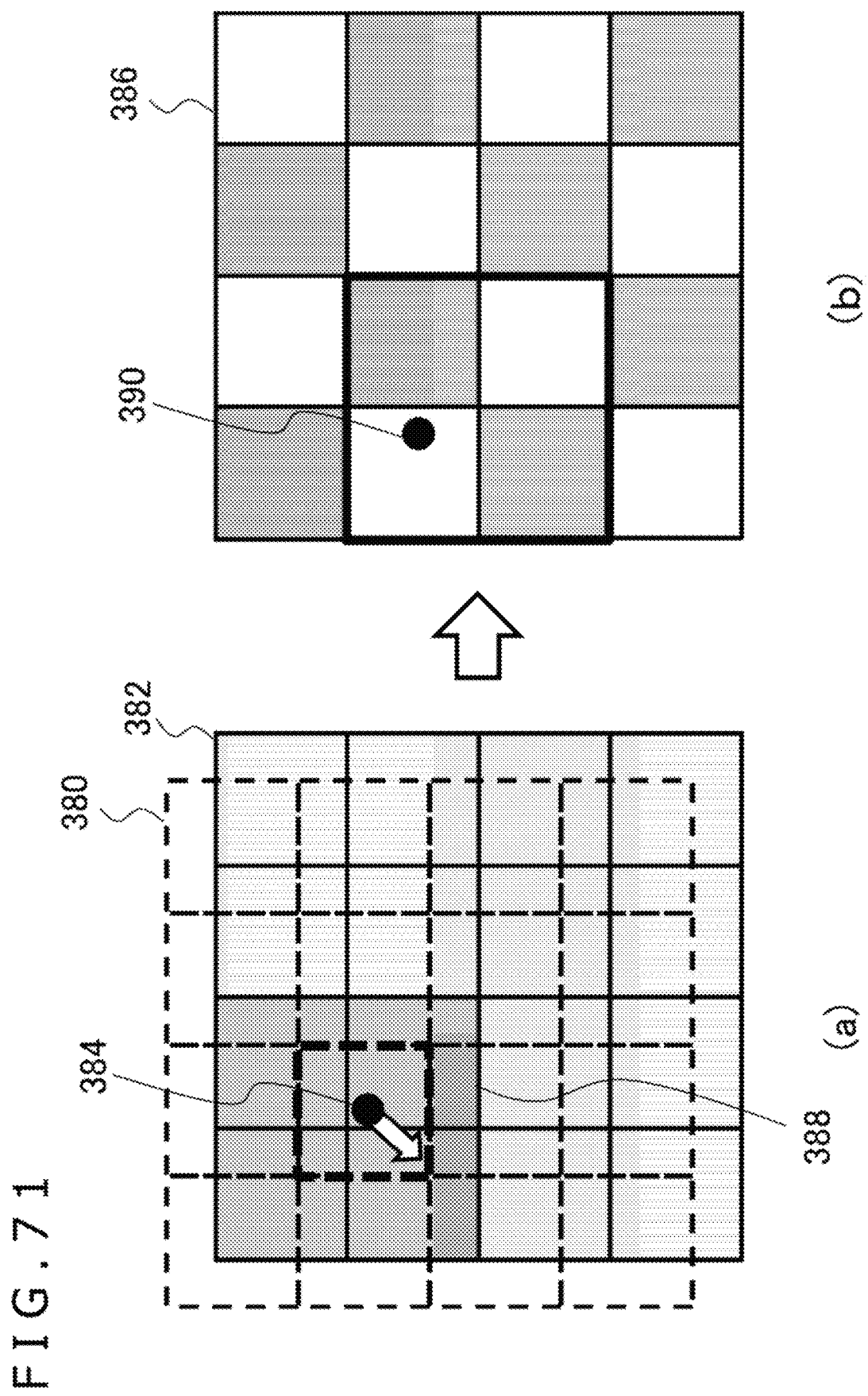
FIG. 71 is a view illustrating a relationship among a display image, an image reference vector map, and an original image in the embodiment 2.

FIG. 71 is a view illustrating a relationship among a display image, an image reference vector map, and an original image. A pixel array indicated by a broken line of (a) is part of a display image 380, and a shaded pixel array is part of an image reference vector map 382, and they are depicted in an overlapping relationship such that correspondence between positions is indicated. It is to be noted that, although the image reference vector map 382 may be distorted in shape by perspective transformation, for clarity, each pixel is represented by a square in (a). The pixel array of (b) is part of the original image 386.

If, in the display image 380, pixels indicated by a thick line frame are determined as drawing target pixels, then a position in a pixel 388 on the image reference vector map 382 corresponding to the position of the center of the drawing target pixel is made a sampling point 384. An image reference vector indicated by a white arrow mark at the sampling point 384 is determined, for example, on the basis of image reference vectors of four pixels in two rows and two columns indicated by dark shading, which are config-ured from the pixel 388 including the sampling point 384 and three pixels adjacent the pixel 388 and near to the sampling point 384. Basically, the image reference vector can be determined by bilinearly interpolating the image reference vectors of the four pixels.

However, in the case where the four image reference vectors do not indicate a same original image as a reference destination, when the Z values of the four pixels are much different from each other and it is doubtful that they lie across an offset of an object, or in the case where an image reference vector that is not suitable for interpolation is mixed, interpolation is not performed regarding them as an exception. After an image reference vector of the sampling point 384 is determined in this manner, a position indicated by the image reference vector in the original image 386 is determined as a sampling point 390 for a color value. Then, by interpolating four pixels in two rows and two columns including the sampling point 390 for a color value, a color value of the drawing target pixel of the display image is determined. It is to be noted that the interpolation at this time is actually performed by trilinear filtering for interpolating using mipmaps of two levels according to reduction ratios.

FIG. 72 is a view illustrating bilinear interpolation of an image reference vector. FIG. 72 depicts a pixel array including a sampling point 400 in an image reference vector map. Of the pixel array, four pixels indicated by a thick line frame are used to determine an image reference vector at the sampling point 400. The image reference vector is a vector indicative of the position on the original image to be referred to at the center of the pixel of the map. However, the image reference vector initially is formed by translating a displacement vector determined setting the center of the pixel of the original image as a start point such that the coordinates (tx, ty) of the end point of the displacement vector comes to the pixel center (tx', ty') of the image reference vector map and reversing the direction as depicted in FIG. 61.

Accordingly, by a process inverse to the process just described, an initial displacement vector can be determined readily from the image reference vector held by each pixel of the map. In particular, the direction for translation may be reversed such that the end point of the image reference vector comes to the center of a pixel of the original image. Therefore, in one form of the present embodiment, an initial displacement vector (for example, a displacement vector 404) is determined from the image reference vectors held by the four pixels around the sampling point 400, and a coefficient for bilinear interpolation is determined on the basis of the positional relationship between the position of the end point (for example, a position 406a or 406b) and the sampling point 400. It is to be noted that the relationship described here is satisfied in the case where the image reference vector is determined directly from the initial displacement vector, and attention is to be paid to that, for example, in the case of an image reference vector generated by an interpolation process for a hole, the initial displacement vector cannot be determined correctly by the interpolation method described above.

In particular, in the case where the displacement vector 404 or the like is obtained as a result of such calculation of the amount of movement of a pixel according to movement of a viewpoint, an inverse displacement vector obtained by reversing the direction of the movement is used for interpolation. At a right lower portion of FIG. 72, the inverse displacement vectors are indicated as v0, v1, v2, and v3. Further, when a coefficient is to be determined, a rectangle 408 to which end points of displacement vectors indicated by white circles are approximated is used to simplify the calculation. In particular, between pixels lined up in the horizontal direction and between pixels lined up in the vertical direction among four pixels, a midpoint of a line segment interconnecting the end portions of the displacement vectors is determined individually. The midpoints are indicated by dark circles. Further, the rectangle 408 having sides extending in the horizontal direction and the vertical direction of the image and passing the centers is defined.

The ratios at which the sides in two directions of the rectangle 408 are internally divided by the corresponding coordinate components of the sampling point 400 are used as coefficients for bilinear interpolation. In the example depicted, the side in the horizontal direction is internally divided to $\alpha:1-\alpha$ and the side in the vertical direction is internally divided $\beta:1-\beta$. Using them, an image reference vector Vtgt to be determined is determined, where the inverse displacement vectors of the left lower, left upper, right lower, and right upper pixels from among the four pixels are represented by v0, v1, v2, and v3, respectively, in the following manner.

$$Vtgt = v0*(1-\alpha)*\beta + v1*\alpha*\beta + v2*(1-\alpha)*(1-\alpha) + v3*\alpha*(1-\beta)$$

It is to be noted that, in the case where a vector whose reference destination is a different original image by cross reference or the like is mixed in the image reference vectors set to the four pixels, interpolation of an image reference vector is not performed as exception handling. Instead, color values are acquired from the original image that is a reference destination of the image reference vectors, and an interpolation process is performed for the color values. Also in this case, interpolation according to the distance from the sampling point 400 is performed using the internal division ratios $\alpha$, $\beta$ and so forth of the rectangle 408 depicted in FIG. 72. In the case where the original image is a mipmap, interpolation is performed by a trilinear filter taking also the reduction ratio into account. This similarly applies also to other cases in which interpolation of an image reference vector is not appropriate such as a case in which the Z values of the four pixels have a difference thereamong.

As described hereinabove, in a region in which no object exists, an image reference vector does not exist either. Also in the case where such a pixel as just described is mixed in the four pixels, color values may be acquired directly using image reference vectors set to the remaining pixels to perform interpolation. At this time, in regard to a pixel in which no image reference vector exists, the color value is set to 0 for calculation. In order to distinguish that an image reference vector does not exist in this manner from that a component of an image reference vector is 0, a flag storage region indicating absence of an image reference vector is provided in data of the image reference vector.

It is to be noted that, according to the bilinear interpolation depicted in FIG. 72, initial displacement vectors are determined once from image reference vectors around the sampling point 400 and an image reference vector of the sampling point 400 is determined on the basis of a positional relationship between end points of the four image reference vectors and the sampling point 400. Consequently, interpolation of high accuracy in which a relationship between image reference vectors and displacement vectors is used can be implemented. On the other hand, common bilinear interpolation based on a positional relationship between the sampling point 400 and the centers of surrounding pixels may be adopted without determining the end points of displacement vectors. For example, in the case where the surrounding pixels have no great difference in Z value, or in the case where an image reference vector that is obtained by an interpolation process for a hole of an image reference vector and from which an initial displacement vector cannot be regenerated accurately is included in an interpolation target as described hereinabove, by performing common bilinear interpolation, it is possible to reduce the processing time period and prevent degradation of the accuracy caused by an error in a regeneration process.

FIG. 73 is a view illustrating a relationship between an original image and a display image in the case where the original image is a mipmap texture. In the case where the head mounted display 100 is used, since the viewscreen moves together with movement of the user, arbitrary perspective transformation is applied to the image plane of an image reference vector map. As a result, also the reduction ratio from the original image varies depending upon the location. In the example depicted in FIG. 73, the reduction ratio is much different between a region 424a and a region 424b in a display image 420 to which an image plane (map screen) 422 is mapped.

In the case where an original image is prepared with one resolution, aliasing occurs with the display image in 424b in which the reduction ratio is high, and a significant flicker is caused by movement of the viewpoint. Therefore, data of an original image are prepared as a mipmap texture in which the resolution is changed stepwise. For example, for the region 424a in which the reduction ratio is low, original image data having a low mipmap level are used, but for the region 424b in which the reduction ratio is high, original image data having a high mipmap level are used to determine a pixel value by a trilinear filter.

At this time, it is necessary to calculate the LOD that determines of which level a mipmap is to be used. In the present embodiment, since substantially two stages of conversion including conversion from an image screen to a map screen and conversion from a map screen to a viewscreen are performed, also in calculation of the LOD, it is necessary to take both of them into consideration. In particular, the LOD is calculated as the sum of LOD1 representative of the magnitude of the reduction ratio at the first stage and LOD2 representative of the magnitude of the reduction ratio at the second stage.

Figure 74:
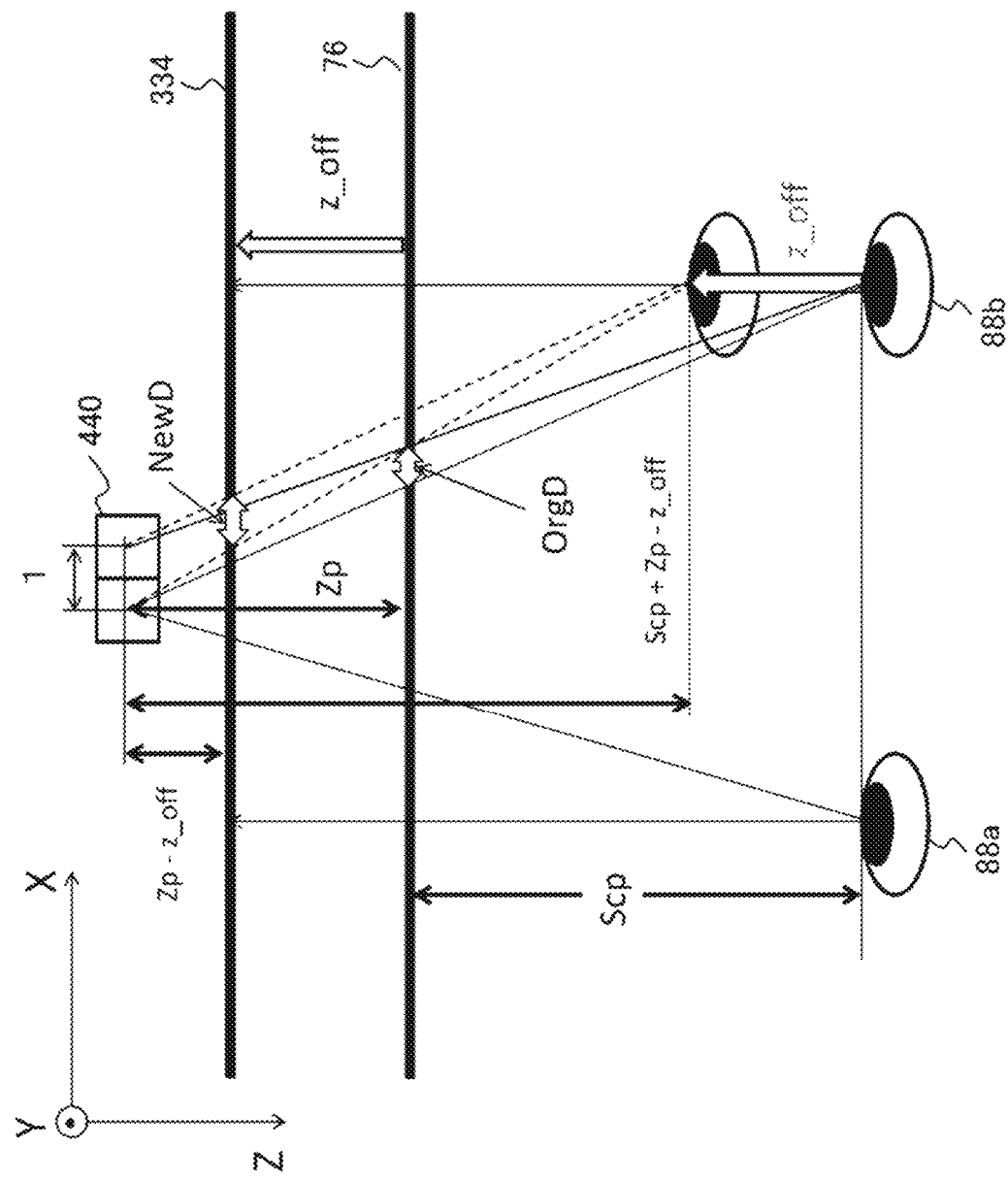
FIG. 74 is a view illustrating a technique for calculating a level of detail (LOD) upon conversion from an image screen to a map screen in the embodiment 2.

FIG. 74 is a view illustrating a technique for calculating LOD1 upon conversion from an image screen into a map screen. In this conversion, the reduction ratio changes depending upon the direction of movement and the amount of movement of the viewpoint in a three-dimensional space. However, since, in the movement in the X axis and Y axis directions, the variation of the reduction ratio is various depending upon the position on the image plane, it is considered that, if this variation is used for selection of a mipmap, then the image looks rather unnatural. Accordingly, only movement of the viewpoint in the Z axis direction is taken into consideration, and a general reduction ratio of the image caused by the movement is reflected on LOD1.

First, the distance between pixels 440 supposed at a position at which an object exists and whose distance from the image screen 76 is Zp is assumed to be 1. It is to be noted that, in FIG. 74, the size of a rectangle representative of each pixel 440 is represented in an exaggerated manner for the description. The width OrgD of the picture of the pixel on the original image is determined through the similarity of triangle in the following manner.

OrgD:Scp=1:Scp+Zp

Therefore,

OrgD=Scp/(Scp+Zp).

In the case where the viewpoint moves by −z_off in the Z axis direction, the width NewD of the picture of the pixel on the map screen 334 is determined through the similarity of triangle in the following manner.

NewD:Scp=1:Scp+Zp−z_off

Therefore,

NewD=Scp/(Scp+Zp−z_off).

In particular, LOD1 by the present conversion process is determined in the following manner.

$$LOD1 = \ln2(OrgD/NewD) = \ln2((Scp + Zp - z\_off)/(Scp + Zp))$$

Here, Zp is acquired from the Z buffer generated when the image reference vector is generated. LOD2 based on the conversion at the second stage is determined similarly as upon common texture mapping. In particular, when an image reference vector map is mapped to a viewscreen, the reduction rate determined by perspective transformation is calculated as LOD. For this calculation, a function of common hardware that performs rendering including texture mapping can be used.

If the LOD at each stage is acquired by the foregoing, then the sum LOD1+LOD2 of them is used as final LOD to determine a mipmap level of the original image of the reference destination, and color values of the pixels are acquired by a trilinear process. It is to be noted that the image reference vector itself may be made mipmap data. However, since the difference in image reference vector between pixels is small, a sufficient function can be exhibited by a technique for bilinearly interpolating vectors of four pixels around a sampling point as described hereinabove.

Figure 75:
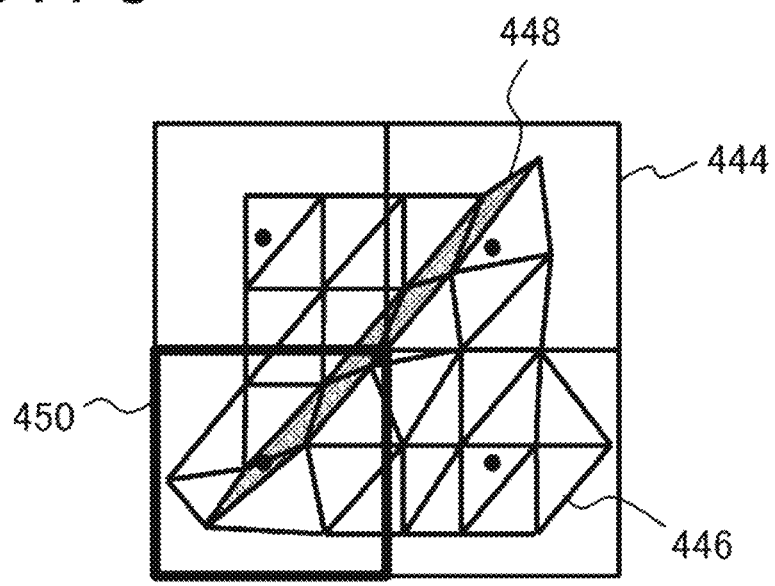
FIG. 75 is a view illustrating a problem in mipmapping in the case where a picture of an object is directly mapped in a unit of a very small triangle when the image is divided into very small triangles without using the technique of the embodiment 2.

FIG. 75 is a view illustrating a problem in mipmapping in the case where a picture of an object is directly mapped in a unit of a very small triangle when it is divided into very small triangles without using the technique of the present embodiment. In the present example, to four pixels (for example, pixels 444) in two rows and two columns represented by squares, a large number of very small triangle (for example, triangles 446) smaller than the pixels are mapped. According to the common technique, while the LOD is calculated in a unit of a very small triangle at a stage of mapping, the LOD to be reflected on selection of a mipmap level is calculated in a unit of a pixel.

In the example depicted, from such a surface shape of an object that an offset appears across a shaded triangle group 448, the triangle group 448 apparently has a reduced width. Therefore, the LOD of triangles belonging to the triangle group 448 is higher than the LOD of the other triangles. Where an LOD to be used for selection of a mipmap level for the pixels is the LOD of the triangle at the center of a pixel, only for a pixel 450 at the center of which the triangle group 448 lies, an LOD higher than those for the other pixels is adopted, and a texture having a high reduction ratio is selected.

It is considered that, if the resolution of a texture to be mapped is made various by accidental variation of the LOD in this manner, effects of mipmapping such as suppression of a flicker may not be exhibited. In the present embodiment, since displacements of pixels are calculated in response to viewpoints in advance and an overall image reference vector map that is conceptual images representing them is mapped, mapping for each very small triangle is not required. Accordingly, such accidental deflection of the LOD as described above does not occur. Further, since the image reference vector at the center of a pixel is determined taking image reference vectors of surrounding pixels into account, texture mapping with high accuracy can be anticipated.

Further, in a technique for texture mapping an image itself, it is necessary to rasterize internal regions of very small triangles to acquire texture coordinates. As depicted, if the number of pixels included in one triangle decreases, the execution efficiency of hardware decreases significantly. Further, if the Z values of vertices configuring one very small triangle are much different from each other, then the number of pixels of triangles to be drawn increases, and as a result, a long period of time is sometimes required for mapping over the overall image. In the present embodiment, the load of processing for mapping an overall image is significantly low and also the fluctuation of the load by change of the viewpoint position is small. As a result, image drawing of high quality with lower load can be anticipated. This is a very effective nature to VR apparatus on which reflection of viewpoint movement on a display screen image must be performed normally in low latency.

Figure 76:
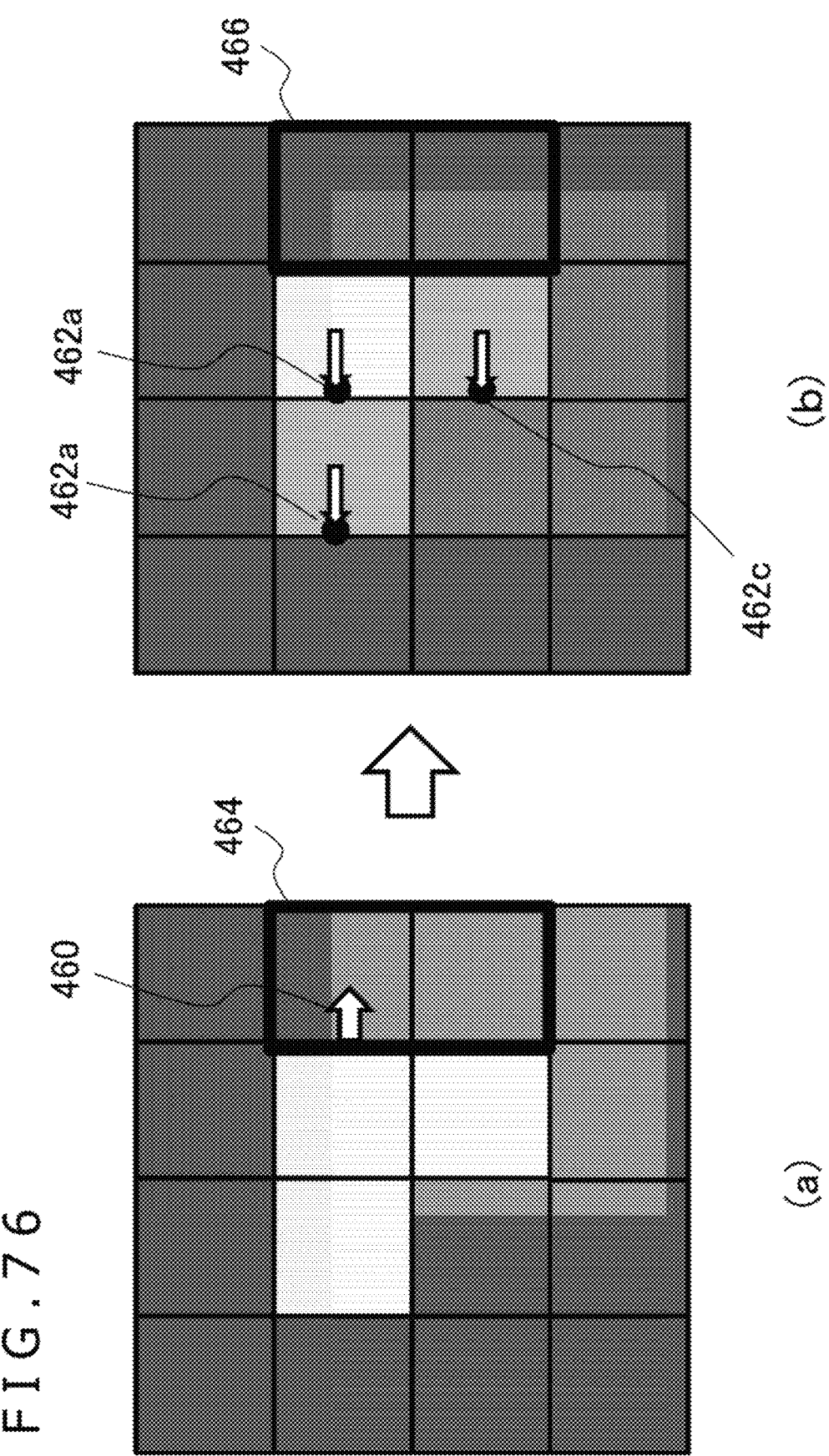
FIG. 76 is a view schematically depicting a change of an image when a picture is moved on the subpixel level by movement of the viewpoint in the embodiment 2.

Now, a technique for drawing a peripheral edge of a picture of an object with high accuracy by the original image operation unit 254 of the present embodiment expanding parallax data. FIG. 76 schematically depicts a change of an image when the picture is moved on the subpixel level by movement of a viewpoint. (a) indicates a pixel array of an original image, and thinly shaded pixels surrounding the picture represent a picture of an object and thickly shaded pixels surrounding the picture represent a region in which the a value is 0 and the picture does not exist. In the present embodiment, a sampling point is determined in subpixel accuracy to determine a color value. However, since data does not exist in the parallax value image outside the picture of the object, an image reference vector that points to such data does not exist either.

In the case where the centers of the pixels of the original image coincide with the centers of the pixels of the image reference vector map, also an image substantially represented by the image reference vectors becomes such as depicted in (a). Here, in the case where it becomes necessary to move pixels on the subpixel level as indicated by an arrow mark 460, a component in the opposite direction is added to the image reference vector of each pixel, and sampling points 462*a* to 462*c* on the original image are displaced from the centers of the pixels.

As a result, by the color values determined by interpolation with adjacent pixels in the original image, the image substantially represented by the image reference vectors reflects the displacement of a subpixel as depicted in (b). However, since, in a region in which a picture of the object does not exist in the original image (for example, in a region 464), an image reference vector pointing to this does not exist as described hereinabove, a displacement of a subpixel cannot be reflected. As a result, a corresponding region 466 remains in its initial state.

Therefore, the peripheral edge of an image in a parallax value image is expanded by one pixel or the like to the outer side on a buffer or the like such that an image reference vector indicating the expansion amount is generated. FIG.

77 schematically depicts image reference vectors before and after expansion of a parallax value image. (a) depicts a pixel array of an image reference vector map when the parallax value image is not expanded, and a shaded region indicates pixels in which the image reference vector map is stored because a picture of the object appears on the corresponding pixels of the original image. Since a white region corresponds to the outside of the picture, it indicates pixels in which the image reference vector map does not exist.

(b) depicts a pixel array of an image reference vector map when the parallax value image is expanded, and a pixel represented by gray stores an image reference vector generated using data of an expanded parallax. Even if an image reference vector is generated in this manner, if the a value of a pixel at an end indicated on the original image is 0, then since the image reference vector does not change on the image, the picture itself is not expanded unnaturally. For the expansion process, expanded filtering is performed using a kernel 468 depicted at an upper portion of (b) or the like.

Figure 78:
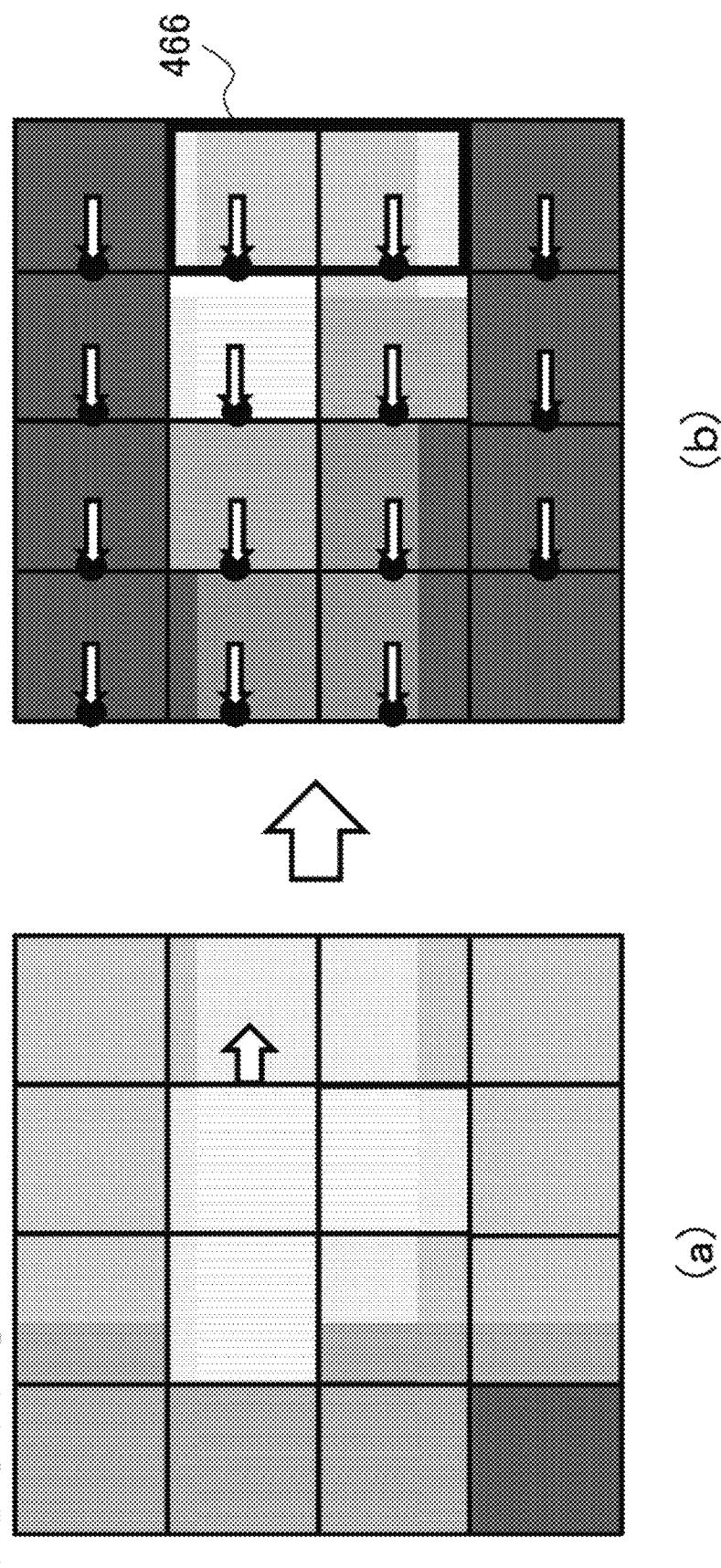
FIG. 78 is a view schematically depicting a change of an image involved in movement on the subpixel level when a parallax value image is extended in the embodiment 2.

FIG. 78 schematically depicts a change of an image together with movement on the subpixel level in the case where a parallax value image is expanded. While (a) corresponds to (a) of FIG. 76, pixels around the picture are indicated by gray where an image reference vector is set thereto by expansion of parallax data. By this, displacement of the subpixel level can be reflected also on the surrounding pixels as depicted in (b). As a result, also on pixels in the region 466 in which no change is exhibited in (b) of FIG. 76, a color value determined by interpolation with the adjacent pixels appears. By such a process as described above, also the profile of an object looks moving more smoothly together with movement of the viewpoint.

Figure 79:
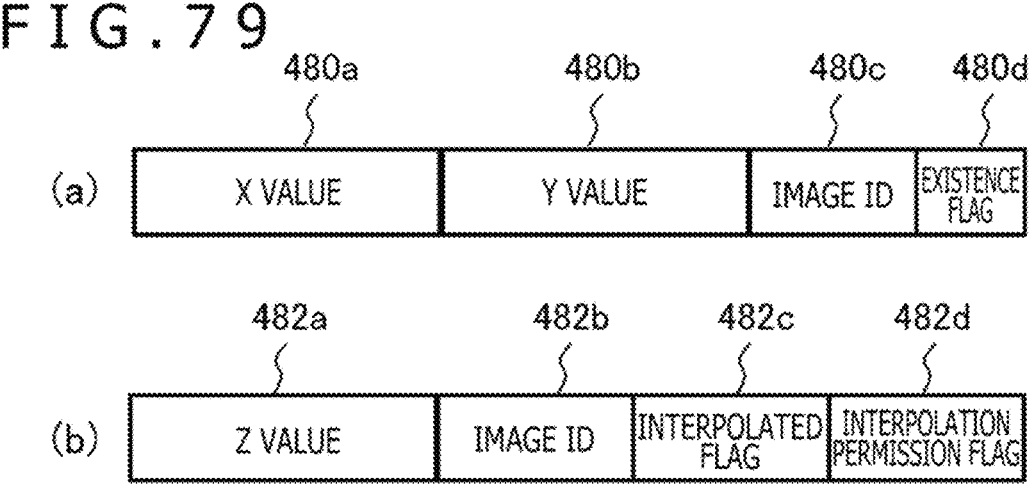
FIG. 79 is a view exemplifying a structure of data retained in a unit of a pixel by an image reference vector map and a Z buffer in the embodiment 2.

FIG. 79 exemplifies a structure of data held in a unit of a pixel by an image reference vector map and a Z buffer. Data of the image reference vector map of (a) are configured from an X value field 480a, a Y value field 480b, an image identification (ID) field 480c, and an existence flag field 480d. In the X value field 480a and the Y value field 480b, an X component and a Y component of an image reference vector are stored. In the image ID field 480c, identification information of an image for identifying whether the reference destination is a self-image, the other original image upon cross reference, or an original image from a viewpoint on the outer side upon extended reference is stored.

In the existence flag field 480d, a flag indicative of whether or not an image reference vector exists is stored. This flag distinguishes that an image reference vector exists and components of the same are (0, 0) and that an object does not exist at the position and there is nothing to be set as an image reference vector. The data of the Z buffer of (b) are configured from a Z value field 482a, an image ID field 482b, an interpolated flag field 482c, and an interpolation permission flag field 482d.

The Z buffer has, upon generation of an image reference vector map, data stored therein, which have been written in latest through a Z test or the like, but has, upon drawing of a display image, information stored therein, which corresponds to the vectors retained in the image reference vector map. Into the Z value field 482a, the Z value of an object represented by the pixel is stored. Into the image ID field 482b, identification information of the image is stored similarly as described hereinabove. The image ID field 482b is used to store data for self-image reference preferentially to data for cross reference or extended reference.

In the interpolated flag field 482c, a flag indicating that the Z value stored in the Z value field 482a is data supplemented later by hole filling up. By this flag, it is indicated that an image reference vector for performing cross reference or extended reference can be set. In the interpolation permission flag field 482d, a flag indicating whether or not bilinear interpolation with surrounding image reference vectors can be performed upon drawing of a display image is stored. For example, in the case where the Z value with a pixel adjacent on the map is great, a flag indicating that interpolation is not permissible is stored. Consequently, it can be prevented that an image reference vector that is not suitable interpolation because the offset is great is mixed and the offset is represented unclearly.

Now, a technique for performing viewpoint correction with high accuracy using an image reference vector map is described. In the case where this mode is to be implemented, the original image operation unit 254 depicted in FIG. 9 is incorporated at a preceding stage to the lens distortion correction function in the outputting unit 270. The head mounted display 100 is frequently configured such that lenses are provided in front of the left and right eyes in order to expand the field of view as described hereinabove such that a screen image is viewed through the lenses. Therefore, at a stage for displaying a screen image, a nonlinear distortion correction process is performed for the drawn original display image such that the distortion by the lenses is cancelled.

Figure 80:
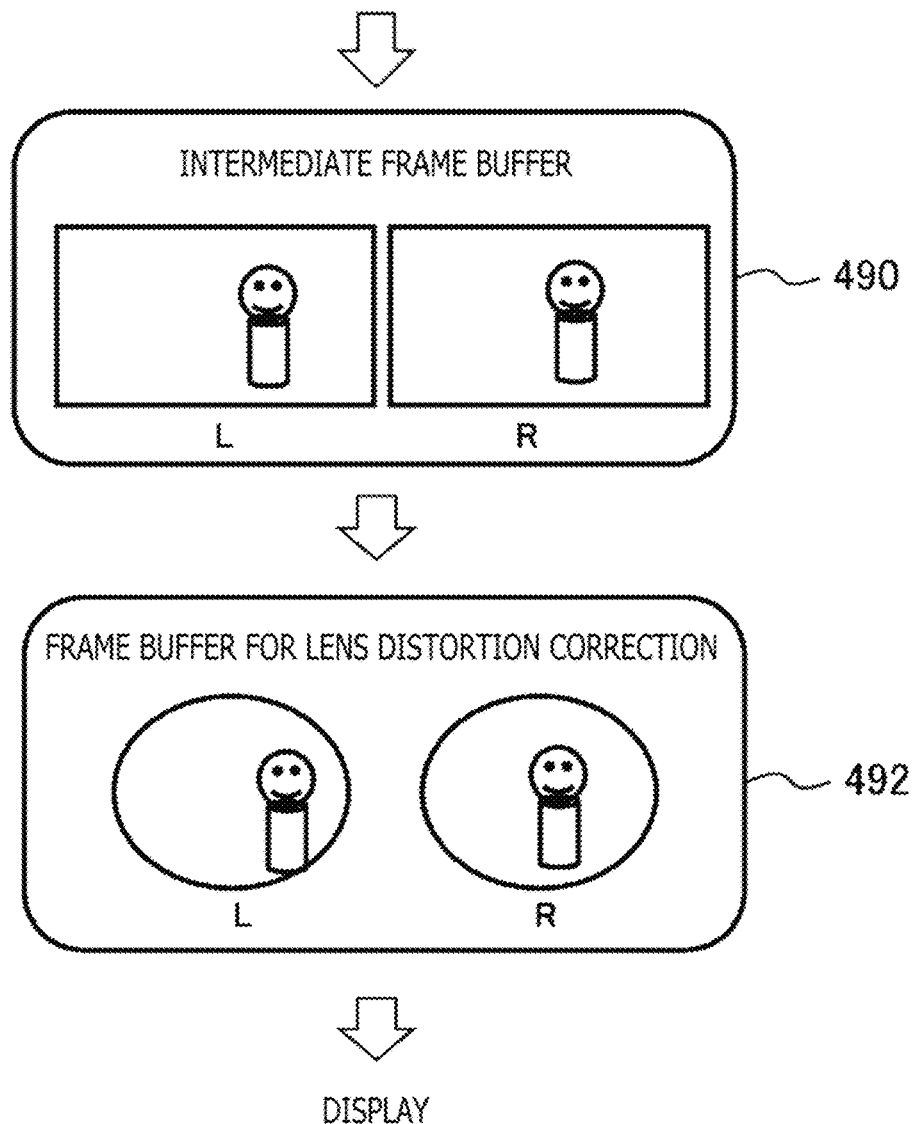
FIG. 80 is a view schematically depicting a transition of an image including a lens distortion correction process.

FIG. 80 schematically depicts a transition of an image including a lens distortion correction process. Both an intermediate frame buffer 490 and a lens distortion correction frame buffer 492 include a frame buffer for the left eye and a frame buffer for the right eye. First, into the intermediate frame buffer 490, display images according to viewpoints at the point of time are written by the display image generation unit 268. The outputting unit 270 samples the data of the display image written in the intermediate frame buffer and writes the sample data into the lens distortion correction frame buffer 492 while re-disposing them at appropriate positions. By successively outputting the data to a display, images that look normally through the lenses can be displayed.

On the other hand, for the head mounted display 100, it is demanded to display an image in response to the viewpoint of the user on the real time basis. However, since the timing at which a viewscreen according to the viewpoint and the timing at which lens distortion correction is performed have a displacement of approximately several milliseconds therebetween, it is conceivable that the position or the direction of the viewpoint has varied in the period of the displacement. In this case, if the display image is subjected as it is to lens correction and is output, then an image delayed from the actual movement of the viewpoint may be displayed, which may possibly give an uncomfortable feeling to the user.

Therefore, it is conceivable to perform distortion correction after an image written in the intermediate frame buffer is shifted by a very small amount in a fixed direction such that the image may artificially follow up the movement of the viewpoint. However, this technique fails to reflect the movement of the viewpoint (movement in the X, Y, and Z axis directions) accurately. Since pixels having Z values different from each other are different in variation amount involved in movement of the viewpoint as described hereinabove, accurate calculation cannot be achieved by a shift of the image plane. For example, also in the case where the user rotates the head, not only the direction of the line of sight rotates, but one of the eyes moves relative to the other eye.

In other words, the movement of the viewpoint that can be regenerated by a shift of the image plane is very approximate and restrictive. Therefore, it is made possible to perform lens distortion correction for an image changed taking the movement of the viewpoint into account using an image reference vector map. FIG. 81 is a view illustrating a technique for reflecting later movement of the viewpoint on an image drawn once. Similarly as in the description given with reference to FIG. 80, a display image according to the viewpoint at certain time t is written into the intermediate frame buffer 490. The display image may be or may not be an image that utilizes an image reference vector map if a parallax value or a Z value is known.

Meanwhile, as an image reference vector map 500, a map according to the viewpoint at time t+Δt delayed from time at which the display image is drawn. The viewpoint may be that based on an actual measurement result or may be that predicted from movement of the viewpoint before then. Then, data for which, determining the display image written in the intermediate frame buffer 490 as an original image, distortion correction is performed after a color value is sampled from a position indicated by an image reference vector on which movement of the viewpoint for Δt is reflected are written into the lens distortion correction frame buffer 492.

By this, an image drawn once can be displayed in a state time-shifted accurately, and real time image expression following up the movement of the viewpoint can be implemented. It is to be noted that, in the case where an image reference vector map is used also for drawing of a display image to be written into the intermediate frame buffer 490, for the Z value to be used for generation of an image reference vector map 500, the Z buffer generated in the process for generation of a map at the preceding stage can be used.

With the present embodiment described above, in a system that implements stereoscopic viewing using left and right parallax images, an original image generated in advance is changed in response to a movement or a direction of a viewpoint to form a display image. A displacement amount of each pixel is calculated in a state in which the position of an object in a virtual space is fixed in response to the movement of the viewpoint at the time to determine an accurate correction amount. As occasion demands, the plane of the original image may be translated in a same direction in response to the movement of the viewpoint in the Z axis direction. By such a configuration as described above, a natural three-dimensional shape that does not have distortion even if the user moves by a great amount can be presented to the user.

For perspective transformation that reflects such movement of the viewpoint, the original image itself is not used, but an image reference vector map indicative of a difference from the position on the original image. Consequently, since a conversion operation for the original image is performed only when the pixel values of the display image are finally determined, degradation of the picture quality from the original image can be suppressed. Furthermore, vertex data necessary for mapping to a viewscreen are only four vertices of an image reference vector map, the load of rendering can be suppressed significantly.

Further, since rasterization is omitted and interpolation is performed on an image reference vector map, the load of processing is reduced also by this, and a viewpoint conversion process can be implemented at a high speed while the accuracy is maintained. Further, where the original image is given as mipmap data, a flicker of the screen image in response to the movement of the viewpoint can be suppressed. Along with this, since the LOD that determines a mipmap level is determined by reduction by the movement of the viewpoint in the Z axis direction and reduction by perspective transformation of an image reference vector map, the accuracy of the LOD is high and an effect of mipmapping is likely to be exhibited in comparison with a common process that uses mapping in a unit of a very small triangle.

Further, it can be performed readily to partly utilize an original image of one eye for a display image of the other eye or to use an original image from a different viewpoint. Consequently, a portion that is a blind spot upon generation of an original image can be regenerated with high accuracy, and a stereoscopic image with less breakdown can be presented without restricting the movement of the user. Further, by preparing image reference vectors also for a peripheral portion that originally is not a picture of an object, a displacement of a pixel of the subpixel level can be reflected accurately also on a profile portion of the picture.

The present invention has been described on the basis of embodiments. The embodiments described above are exemplary and it is recognized by those skilled in the art that various modifications can be made in the combination of the components or the processes of the embodiments and that also such modifications fall within the scope of the present invention.

REFERENCE SIGNS LIST

12 Flat panel display, 100 Head mounted display, 200 Image generation apparatus, 222 CPU, 224 GPU, 226 Main memory, 250 Position and posture acquisition unit, 252 Viewscreen setting unit, 254 Original image operation unit, 256 Original image data storage unit, 258 Original image data, 260 Parallax value image data, 262 Reference data storage unit, 264 Z buffer, 266 Image reference vector map, 268 Display image generation unit, 270 Outputting unit.

INDUSTRIAL APPLICABILITY

As described above, the present invention can be utilized in various information processing apparatus such as a game apparatus, an image display apparatus, an image reproduction apparatus, and a personal computer and an information processing system or the like that includes one of them.

The invention claimed is:

1. An image generation apparatus configured to generate an image in a virtual space that uses an original image acquired from a plurality of viewpoints to generate a display image that allows stereoscopic viewing of an object in the virtual space, said apparatus comprising:

an original image operation unit configured to calculate a displacement to be generated for each pixel of the original image in response to movement of a viewpoint of a user and generate, for each of left and right viewpoints, a vector map in which reference vectors having both vertical and horizontal components for referring to positions before the displacement on the original image from pixel center positions after the displacement are lined up on an image plane after the displacement;

a display image generation unit configured to determine, based on the reference vector at a position on the vector map corresponding to each pixel of the display image, a color value of the display pixel by referring to color values around a corresponding position on the original image, to generate display images corresponding to the left and right viewpoints; and an outputting unit configured to output data of the display image to a head mounted display (HMD), wherein the display image corresponding to the left viewpoint and the display image corresponding to the right viewpoint are independently displayed to a left and right eye of a user, respectively, by the HMD, said left and right viewpoint images being different parallax images for stereoscopic viewing, wherein, from a perspective of the user, the object's position in the virtual space does not change and is not distorted in response to the movement.

2. The image generation apparatus according to claim 1, wherein the original image operation unit sets, for a pixel region that becomes a blind spot on the original image acquired from the one viewpoint, the reference vector whose reference destination is the original image acquired from the different viewpoint.

3. The image generation apparatus according to claim 1, wherein the original image operation unit uses one of the original images acquired from left and right viewpoints in stereoscopic viewing as the original image acquired from the different viewpoint.

4. The image generation apparatus according to claim 1, wherein the original image operation unit uses the original image acquired from the viewpoint different from left and right viewpoints in stereoscopic viewing as the original image acquired from the different viewpoint.

5. The image generation apparatus according to claim 1, wherein the original image operation unit specifies, based on parallax values of the pixels in the original image acquired from the one viewpoint, a corresponding pixel of the original image acquired from the different viewpoint and includes the reference vector whose reference destination is a pixel other than the specified pixel of the original image into the vector map for the one viewpoint.

6. The image generation apparatus according to claim 1, wherein the original image operation unit performs, when the reference vector whose reference destination is the original image acquired from the different viewpoint is set to the vector map, in the case where the different reference vector is already set to a pixel of a setting destination, comparison based on distance values of the object at the pixels individually determined as reference destinations, and updates the setting in the case where the distance value is smaller.

7. The image generation apparatus according to claim 6, wherein the original image operation unit sets, when the reference vector whose reference destination is the original image acquired from the one viewpoint is to be set to the vector map, a flag representative of high-low of a credibility degree of a distance value of the object at the pixel whose reference destination is the set reference vector in an associated relationship with the reference vector and updates, when the reference vector whose reference destination is the original image acquired from the different viewpoint is to be set, in the case where the flag corresponding to the reference vector set already to the pixel of the setting destination indicates a low credibility degree, the setting omitting the comparison based on the distance values.

8. The image generation apparatus according to claim 7, wherein the original image operation unit evaluates a degree of displacement of a pixel in the original image acquired from the one viewpoint and determines the high-low of the credibility degree.

9. An image generation method for generating an image in a virtual space that uses an original image acquired from a plurality of viewpoints to generate a display image that allows stereoscopic viewing of an object in the virtual space, said method comprising:

acquiring information relating to a viewpoint of a user;

calculating a displacement to be generated for each pixel of the original image in response to movement of the viewpoint and generating, for each of left and right viewpoints, a vector map in which reference vectors having both vertical and horizontal components for referring to positions before the displacement on the original image from pixel center positions after the displacement are lined up on an image plane after the displacement;

determining, based on the reference vector at a position on the vector map corresponding to each pixel of the display image, a color value of the display pixel by referring to color values around a corresponding position on the original image, to generate display images corresponding to the left and right viewpoints; and outputting data of the display image to a head mounted display (HMD), wherein the display image corresponding to the left viewpoint and the display image corresponding to the right viewpoint are independently displayed to a left and right eye of a user, respectively by the HMD, said left and right viewpoint images being different parallax images for stereoscopic viewing, wherein, from a perspective of the user, the object's position in the virtual space does not change and is not distorted in response to the movement.

10. A non-transitory, computer readable storage medium containing a computer program, which when executed by a computer, causes the computer to use an original image acquired from a plurality of viewpoints to generate an image in a virtual space that allows stereoscopic viewing of an object in the virtual space, the computer program comprising:

acquiring information relating to a viewpoint of a user;

calculating a displacement to be generated for each pixel of the original image in response to movement of the viewpoint and generating, for each of left and right viewpoints, a vector map in which reference vectors having both vertical and horizontal components for referring to positions before the displacement on the original image from pixel center positions after the displacement are lined up on an image plane after the displacement;

determining, based on the reference vector at a position on the vector map corresponding to each pixel of the display image, a color value of the display pixel by referring to color values around a corresponding position on the original image, to generate display images corresponding to the left and right viewpoints; and outputting data of the display image to a head mounted display (HMD), wherein the display image corresponding to the left viewpoint and the display image corresponding to the right viewpoint are independently displayed to a left and right eye of a user, respectively, by the HMD, said left and right viewpoint images being different parallax images for stereoscopic viewing, wherein, from a perspective of the user, the object's position in the virtual space does not change and is not distorted in response to the movement.

* * * * *